US008312200B2

(12) United States Patent
Vorbach et al.

(10) Patent No.: US 8,312,200 B2
(45) Date of Patent: Nov. 13, 2012

(54) PROCESSOR CHIP INCLUDING A PLURALITY OF CACHE ELEMENTS CONNECTED TO A PLURALITY OF PROCESSOR CORES

(76) Inventors: Martin Vorbach, Munich (DE); Armin Nückel, Neupotz (DE)

(*) Notice: Subject to any disclaimer, the term of this patent is extended or adjusted under 35 U.S.C. 154(b) by 0 days.

(21) Appl. No.: 12/840,477

(22) Filed: Jul. 21, 2010

(65) Prior Publication Data

US 2010/0287324 A1 Nov. 11, 2010

Related U.S. Application Data

(63) Continuation of application No. 12/720,898, filed on Mar. 10, 2010, which is a continuation of application No. 10/009,649, filed as application No. PCT/DE00/01869 on Jun. 13, 2000, now Pat. No. 8,230,411.

(30) Foreign Application Priority Data

| Jun. 10, 1999 | (DE) | 199 26 538 |
| Jan. 9, 2000 | (DE) | 100 00 423 |
| Apr. 12, 2000 | (DE) | 100 18 119 |

(51) Int. Cl.
*G06F 13/20* (2006.01)
(52) U.S. Cl. ..................... 710/313; 710/311
(58) Field of Classification Search ........... 710/305–313
See application file for complete search history.

(56) References Cited

U.S. PATENT DOCUMENTS

| 2,067,477 A | 1/1937 | Cooper |
| 3,242,998 A | 3/1966 | Gubbins |
| 3,564,506 A | 2/1971 | Bee at al. |
| 3,681,578 A | 8/1972 | Stevens |
| 3,753,008 A | 8/1973 | Guarnaschelli |
| 3,754,211 A | 8/1973 | Rocher et al. |
| 3,757,608 A | 9/1973 | Willner |
| 3,855,577 A | 12/1974 | Vandierendonck |
| 3,956,589 A | 5/1976 | Weathers et al. |
| 4,151,611 A | 4/1979 | Sugawara et al. |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,594,682 A | 6/1986 | Drimak |
| 4,623,997 A | 11/1986 | Tulpule |

(Continued)

FOREIGN PATENT DOCUMENTS

DE 42 21 278 1/1994

(Continued)

OTHER PUBLICATIONS

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

(Continued)

*Primary Examiner* — Raymond Phan
(74) *Attorney, Agent, or Firm* — Kenyon & Kenyon LLP

(57) ABSTRACT

Programming of modules which can be reprogrammed during operation is described. Partitioning of code sequences is also described.

42 Claims, 41 Drawing Sheets

U.S. PATENT DOCUMENTS

| | | |
|---|---|---|
| 4,646,300 A | 2/1987 | Goodman et al. |
| 4,663,706 A | 5/1987 | Allen et al. |
| 4,667,190 A | 5/1987 | Fant et al. |
| 4,682,284 A | 7/1987 | Schrofer |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,760,525 A | 7/1988 | Webb |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Stolfo et al. |
| 4,870,302 A | 9/1989 | Freeman |
| 4,873,666 A | 10/1989 | Lefebvre et al. |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,939,641 A | 7/1990 | Schwartz et al. |
| 4,959,781 A | 9/1990 | Rubinstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,031,179 A | 7/1991 | Yoshida et al. |
| 5,034,914 A | 7/1991 | Osterlund |
| 5,036,473 A | 7/1991 | Butts et al. |
| 5,036,493 A | 7/1991 | Nielsen |
| 5,041,924 A | 8/1991 | Blackborow et al. |
| 5,043,978 A | 8/1991 | Nagler et al. |
| 5,047,924 A | 9/1991 | Fujioka et al. |
| 5,055,997 A | 10/1991 | Sluijter et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,119,290 A | 6/1992 | Loo et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,245,616 A | 9/1993 | Olson |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,435,000 A | 7/1995 | Boothroyd et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,493,663 A | 2/1996 | Parikh |
| 5,497,498 A | 3/1996 | Taylor |
| 5,502,838 A | 3/1996 | Kikinis |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,568,624 A | 10/1996 | Sites et al. |
| 5,570,040 A | 10/1996 | Lytle et al. |
| 5,572,710 A | 11/1996 | Asano et al. |
| 5,574,927 A | 11/1996 | Scantlin |

| | | | | | |
|---|---|---|---|---|---|
| 5,574,930 A | 11/1996 | Halverson, Jr. et al. | 5,778,439 A | 7/1998 | Trimberger et al. |
| 5,581,731 A | 12/1996 | King et al. | 5,781,756 A | 7/1998 | Hung |
| 5,581,734 A | 12/1996 | DiBrino et al. | 5,784,313 A | 7/1998 | Trimberger et al. |
| 5,583,450 A | 12/1996 | Trimberger et al. | 5,784,630 A | 7/1998 | Saito et al. |
| 5,584,013 A | 12/1996 | Cheong et al. | 5,784,636 A | 7/1998 | Rupp |
| 5,586,044 A | 12/1996 | Agrawal et al. | 5,794,059 A | 8/1998 | Barker et al. |
| 5,587,921 A | 12/1996 | Agrawal et al. | 5,794,062 A | 8/1998 | Baxter |
| 5,588,152 A | 12/1996 | Dapp et al. | 5,801,715 A | 9/1998 | Norman |
| 5,590,345 A * | 12/1996 | Barker et al. ............... 712/11 | 5,802,290 A | 9/1998 | Casselman |
| 5,590,348 A | 12/1996 | Phillips et al. | 5,804,986 A | 9/1998 | Jones |
| 5,596,742 A | 1/1997 | Agarwal et al. | 5,815,004 A | 9/1998 | Trimberger et al. |
| 5,600,265 A | 2/1997 | El Gamal et al. | 5,815,715 A | 9/1998 | Küçükçakar |
| 5,600,597 A | 2/1997 | Kean et al. | 5,815,726 A | 9/1998 | Cliff |
| 5,600,845 A | 2/1997 | Gilson | 5,821,774 A | 10/1998 | Veytsman et al. |
| 5,602,999 A * | 2/1997 | Hyatt ............... 711/1 | 5,828,229 A | 10/1998 | Cliff et al. |
| 5,603,005 A | 2/1997 | Bauman et al. | 5,828,858 A | 10/1998 | Athanas et al. |
| 5,606,698 A | 2/1997 | Powell | 5,831,448 A | 11/1998 | Kean |
| 5,608,342 A | 3/1997 | Trimberger | 5,832,288 A | 11/1998 | Wong |
| 5,611,049 A | 3/1997 | Pitts | 5,838,165 A | 11/1998 | Chatter |
| 5,617,547 A | 4/1997 | Feeney et al. | 5,838,988 A | 11/1998 | Panwar et al. |
| 5,617,577 A | 4/1997 | Barker et al. | 5,841,973 A | 11/1998 | Kessler et al. |
| 5,619,720 A | 4/1997 | Garde et al. | 5,844,422 A | 12/1998 | Trimberger et al. |
| 5,625,806 A | 4/1997 | Kromer | 5,844,888 A | 12/1998 | Markkula, Jr. et al. |
| 5,625,836 A | 4/1997 | Barker et al. | 5,848,238 A | 12/1998 | Shimomura et al. |
| 5,627,992 A | 5/1997 | Baror | 5,854,918 A | 12/1998 | Baxter |
| 5,634,131 A | 5/1997 | Matter et al. | 5,857,097 A | 1/1999 | Henzinger et al. |
| 5,635,851 A | 6/1997 | Tavana | 5,857,109 A | 1/1999 | Taylor |
| 5,642,058 A | 6/1997 | Trimberger et al. | 5,859,544 A | 1/1999 | Norman |
| 5,646,544 A | 7/1997 | Iadanza | 5,860,119 A | 1/1999 | Dockser |
| 5,646,545 A | 7/1997 | Trimberger et al. | 5,862,403 A | 1/1999 | Kanai et al. |
| 5,649,176 A | 7/1997 | Selvidge et al. | 5,865,239 A | 2/1999 | Carr |
| 5,649,179 A | 7/1997 | Steenstra et al. | 5,867,691 A | 2/1999 | Shiraishi |
| 5,652,529 A | 7/1997 | Gould et al. | 5,867,723 A | 2/1999 | Peters et al. |
| 5,652,894 A | 7/1997 | Hu et al. | 5,870,620 A | 2/1999 | Kadosumi et al. |
| 5,655,069 A | 8/1997 | Ogawara et al. | 5,884,075 A | 3/1999 | Hester et al. |
| 5,655,124 A | 8/1997 | Lin | 5,887,162 A | 3/1999 | Williams et al. |
| 5,656,950 A | 8/1997 | Duong et al. | 5,887,165 A | 3/1999 | Martel et al. |
| 5,657,330 A | 8/1997 | Matsumoto | 5,889,533 A | 3/1999 | Lee |
| 5,659,785 A | 8/1997 | Pechanek et al. | 5,889,982 A | 3/1999 | Rodgers et al. |
| 5,659,797 A | 8/1997 | Zandveld et al. | 5,892,370 A | 4/1999 | Eaton et al. |
| 5,675,262 A | 10/1997 | Duong et al. | 5,892,961 A | 4/1999 | Trimberger |
| 5,675,743 A | 10/1997 | Mavity | 5,892,962 A | 4/1999 | Cloutier |
| 5,675,757 A | 10/1997 | Davidson et al. | 5,894,565 A | 4/1999 | Furtek et al. |
| 5,675,777 A | 10/1997 | Glickman | 5,895,487 A * | 4/1999 | Boyd et al. ............... 711/122 |
| 5,677,909 A | 10/1997 | Heide | 5,898,602 A | 4/1999 | Rothman et al. |
| 5,680,583 A | 10/1997 | Kuijsten | 5,901,279 A | 5/1999 | Davis, III |
| 5,682,491 A | 10/1997 | Pechanek et al. | 5,915,099 A | 6/1999 | Takata et al. |
| 5,682,544 A | 10/1997 | Pechanek et al. | 5,915,123 A | 6/1999 | Mirsky et al. |
| 5,687,325 A | 11/1997 | Chang | 5,924,119 A | 7/1999 | Sindhu et al. |
| 5,694,602 A | 12/1997 | Smith | 5,926,638 A | 7/1999 | Inoue |
| 5,696,791 A | 12/1997 | Yeung | 5,927,423 A | 7/1999 | Wada et al. |
| 5,696,976 A | 12/1997 | Nizar et al. | 5,933,023 A | 8/1999 | Young |
| 5,701,091 A | 12/1997 | Kean | 5,933,642 A | 8/1999 | Baxter et al. |
| 5,705,938 A | 1/1998 | Kean | 5,936,424 A | 8/1999 | Young et al. |
| 5,706,482 A | 1/1998 | Matsushima et al. | 5,943,242 A | 8/1999 | Vorbach et al. |
| 5,713,037 A | 1/1998 | Wilkinson et al. | 5,956,518 A | 9/1999 | DeHon et al. |
| 5,717,890 A | 2/1998 | Ichida et al. | 5,960,193 A | 9/1999 | Guttag et al. |
| 5,717,943 A | 2/1998 | Barker et al. | 5,960,200 A | 9/1999 | Eager et al. |
| 5,727,229 A * | 3/1998 | Kan et al. ............... 712/22 | 5,966,143 A | 10/1999 | Breternitz, Jr. |
| 5,732,209 A | 3/1998 | Vigil et al. | 5,966,534 A | 10/1999 | Cooke et al. |
| 5,734,869 A | 3/1998 | Chen | 5,970,254 A | 10/1999 | Cooke et al. |
| 5,734,921 A | 3/1998 | Dapp et al. | 5,978,260 A | 11/1999 | Trimberger et al. |
| 5,737,516 A | 4/1998 | Circello et al. | 5,978,583 A | 11/1999 | Ekanadham et al. |
| 5,737,565 A | 4/1998 | Mayfield | 5,996,048 A | 11/1999 | Cherabuddi et al. |
| 5,742,180 A | 4/1998 | DeHon et al. | 5,996,083 A | 11/1999 | Gupta et al. |
| 5,745,734 A | 4/1998 | Craft et al. | 5,999,990 A | 12/1999 | Sharrit et al. |
| 5,748,872 A | 5/1998 | Norman | 6,003,143 A | 12/1999 | Kim et al. |
| 5,748,979 A | 5/1998 | Trimberger | 6,011,407 A | 1/2000 | New |
| 5,752,035 A | 5/1998 | Trimberger | 6,014,509 A | 1/2000 | Furtek et al. |
| 5,754,459 A | 5/1998 | Telikepalli | 6,020,758 A | 2/2000 | Patel et al. |
| 5,754,820 A | 5/1998 | Yamagami | 6,020,760 A | 2/2000 | Sample et al. |
| 5,754,827 A | 5/1998 | Barbier et al. | 6,021,490 A | 2/2000 | Vorbach et al. |
| 5,754,871 A | 5/1998 | Wilkinson et al. | 6,023,564 A | 2/2000 | Trimberger |
| 5,754,876 A * | 5/1998 | Tamaki et al. ............... 712/4 | 6,023,742 A | 2/2000 | Ebeling et al. |
| 5,760,602 A | 6/1998 | Tan | 6,026,478 A * | 2/2000 | Dowling ............... 712/24 |
| 5,761,484 A | 6/1998 | Agarwal et al. | 6,026,481 A | 2/2000 | New et al. |
| 5,768,629 A * | 6/1998 | Wise et al. ............... 710/68 | 6,034,538 A | 3/2000 | Abramovici |
| 5,773,994 A | 6/1998 | Jones | 6,035,371 A | 3/2000 | Magloire |
| 5,778,237 A | 7/1998 | Yamamoto et al. | 6,038,650 A | 3/2000 | Vorbach et al. |

| | | |
|---|---|---|
| 6,038,656 A | 3/2000 | Cummings et al. |
| 6,044,030 A | 3/2000 | Zheng et al. |
| 6,045,585 A | 4/2000 | Blainey |
| 6,047,115 A | 4/2000 | Mohan et al. |
| 6,049,222 A | 4/2000 | Lawman |
| 6,049,866 A | 4/2000 | Earl |
| 6,052,524 A | 4/2000 | Pauna |
| 6,052,773 A | 4/2000 | DeHon et al. |
| 6,054,873 A | 4/2000 | Laramie |
| 6,055,619 A | 4/2000 | North et al. |
| 6,058,266 A | 5/2000 | Megiddo et al. |
| 6,058,469 A | 5/2000 | Baxter |
| 6,064,819 A | 5/2000 | Franssen et al. |
| 6,072,348 A | 6/2000 | New et al. |
| 6,076,157 A | 6/2000 | Borkenhagen et al. |
| 6,077,315 A | 6/2000 | Greenbaum et al. |
| 6,078,736 A | 6/2000 | Guccione |
| 6,081,903 A | 6/2000 | Vorbach et al. |
| 6,084,429 A | 7/2000 | Trimberger |
| 6,085,317 A | 7/2000 | Smith |
| 6,086,628 A | 7/2000 | Dave et al. |
| 6,088,795 A | 7/2000 | Vorbach et al. |
| 6,092,174 A | 7/2000 | Roussakov |
| RE36,839 E | 8/2000 | Simmons et al. |
| 6,096,091 A | 8/2000 | Hartmann |
| 6,105,105 A | 8/2000 | Trimberger et al. |
| 6,105,106 A | 8/2000 | Manning |
| 6,108,760 A | 8/2000 | Mirsky et al. |
| 6,118,724 A | 9/2000 | Higginbottom |
| 6,119,181 A | 9/2000 | Vorbach et al. |
| 6,122,719 A | 9/2000 | Mirsky et al. |
| 6,125,072 A * | 9/2000 | Wu .......................... 365/230.03 |
| 6,125,408 A | 9/2000 | McGee et al. |
| 6,127,908 A | 10/2000 | Bozler et al. |
| 6,128,720 A | 10/2000 | Pechanek et al. |
| 6,134,166 A | 10/2000 | Lytle et al. |
| 6,137,307 A | 10/2000 | Iwanczuk et al. |
| 6,144,220 A | 11/2000 | Young |
| 6,145,072 A | 11/2000 | Shams et al. |
| 6,150,837 A | 11/2000 | Beal et al. |
| 6,150,839 A | 11/2000 | New et al. |
| 6,154,048 A | 11/2000 | Iwanczuk et al. |
| 6,154,049 A | 11/2000 | New |
| 6,154,826 A | 11/2000 | Wulf et al. |
| 6,157,214 A | 12/2000 | Marshall |
| 6,170,051 B1 | 1/2001 | Dowling |
| 6,172,520 B1 | 1/2001 | Lawman et al. |
| 6,173,419 B1 | 1/2001 | Barnett |
| 6,173,434 B1 | 1/2001 | Wirthlin et al. |
| 6,178,494 B1 | 1/2001 | Casselman |
| 6,185,256 B1 | 2/2001 | Saito et al. |
| 6,185,731 B1 | 2/2001 | Maeda et al. |
| 6,188,240 B1 | 2/2001 | Nakaya |
| 6,188,650 B1 | 2/2001 | Hamada et al. |
| 6,198,304 B1 | 3/2001 | Sasaki |
| 6,201,406 B1 | 3/2001 | Iwanczuk et al. |
| 6,202,163 B1 | 3/2001 | Gabzdyl et al. |
| 6,202,182 B1 | 3/2001 | Abramovici et al. |
| 6,204,687 B1 | 3/2001 | Schultz et al. |
| 6,211,697 B1 | 4/2001 | Lien et al. |
| 6,212,544 B1 | 4/2001 | Borkenhagen et al. |
| 6,212,650 B1 | 4/2001 | Guccione |
| 6,215,326 B1 | 4/2001 | Jefferson et al. |
| 6,216,223 B1 | 4/2001 | Revilla et al. |
| 6,219,833 B1 | 4/2001 | Solomon et al. |
| RE37,195 E | 5/2001 | Kean |
| 6,230,307 B1 | 5/2001 | Davis et al. |
| 6,240,502 B1 | 5/2001 | Panwar et al. |
| 6,243,808 B1 | 6/2001 | Wang |
| 6,247,147 B1 | 6/2001 | Beenstra |
| 6,249,756 B1 | 6/2001 | Bunton et al. |
| 6,252,792 B1 | 6/2001 | Marshall et al. |
| 6,256,724 B1 | 7/2001 | Hocevar et al. |
| 6,260,114 B1 | 7/2001 | Schug |
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,266,760 B1 | 7/2001 | DeHon et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,440 B1 | 9/2001 | Casselman |
| 6,298,043 B1 | 10/2001 | Mauger et al. |
| 6,298,396 B1 | 10/2001 | Loyer et al. |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,311,265 B1 | 10/2001 | Beckerle et al. |
| 6,321,298 B1 | 11/2001 | Hubis |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,339,424 B1 | 1/2002 | Ishikawa et al. |
| 6,339,840 B1 | 1/2002 | Kothari et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,398,383 B1 | 6/2002 | Huang |
| 6,400,601 B1 | 6/2002 | Sudo et al. |
| 6,404,224 B1 | 6/2002 | Azegami et al. |
| 6,405,185 B1 | 6/2002 | Pechanek et al. |
| 6,405,299 B1 | 6/2002 | Vorbach et al. |
| 6,421,809 B1 | 7/2002 | Wuytack et al. |
| 6,421,817 B1 | 7/2002 | Mohan et al. |
| 6,425,054 B1 | 7/2002 | Nguyen |
| 6,425,068 B1 | 7/2002 | Vorbach |
| 6,426,649 B1 | 7/2002 | Fu et al. |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,672 B1 | 8/2002 | Gaither |
| 6,434,695 B1 | 8/2002 | Esfahani et al. |
| 6,434,699 B1 | 8/2002 | Jones et al. |
| 6,437,441 B1 | 8/2002 | Yamamoto |
| 6,438,747 B1 * | 8/2002 | Schreiber et al. ............. 717/160 |
| 6,449,283 B1 | 9/2002 | Chao et al. |
| 6,456,628 B1 * | 9/2002 | Greim et al. .................. 370/466 |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,483,343 B1 | 11/2002 | Faith et al. |
| 6,487,709 B1 | 11/2002 | Keller et al. |
| 6,490,695 B1 | 12/2002 | Zagorski et al. |
| 6,496,740 B1 * | 12/2002 | Robertson et al. ............... 700/20 |
| 6,496,902 B1 | 12/2002 | Faanes et al. |
| 6,496,971 B1 | 12/2002 | Lesea et al. |
| 6,504,398 B1 | 1/2003 | Lien et al. |
| 6,507,898 B1 | 1/2003 | Gibson et al. |
| 6,507,947 B1 * | 1/2003 | Schreiber et al. ............. 717/160 |
| 6,512,804 B1 | 1/2003 | Johnson et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 | 2/2003 | Veenstra et al. |
| 6,526,520 B1 | 2/2003 | Vorbach et al. |
| 6,538,468 B1 | 3/2003 | Moore |
| 6,538,470 B1 | 3/2003 | Langhammer et al. |
| 6,539,415 B1 | 3/2003 | Mercs |
| 6,539,438 B1 | 3/2003 | Ledzius et al. |
| 6,539,477 B1 | 3/2003 | Seawright |
| 6,542,394 B2 | 4/2003 | Marshall et al. |

| | | |
|---|---|---|
| 6,542,844 B1 | 4/2003 | Hanna |
| 6,542,998 B1 | 4/2003 | Vorbach |
| 6,553,395 B2 | 4/2003 | Marshall et al. |
| 6,553,479 B2 | 4/2003 | Mirsky et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,598,128 B1 | 7/2003 | Yoshioka et al. |
| 6,606,704 B1 | 8/2003 | Adiletta et al. |
| 6,624,819 B1 | 9/2003 | Lewis |
| 6,625,631 B2 | 9/2003 | Ruehle |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,665,758 B1 | 12/2003 | Frazier et al. |
| 6,668,237 B1 | 12/2003 | Guccione et al. |
| 6,681,388 B1 | 1/2004 | Sato et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,708,223 B1 | 3/2004 | Wang et al. |
| 6,708,325 B2 | 3/2004 | Cooke et al. |
| 6,717,436 B2 | 4/2004 | Kress et al. |
| 6,721,830 B2 | 4/2004 | Vorbach et al. |
| 6,725,334 B2 | 4/2004 | Barroso et al. |
| 6,728,871 B1 | 4/2004 | Vorbach et al. |
| 6,745,317 B1 | 6/2004 | Mirsky et al. |
| 6,748,440 B1 | 6/2004 | Lisitsa et al. |
| 6,751,722 B2 | 6/2004 | Mirsky et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,836,842 B1 | 12/2004 | Guccione et al. |
| 6,847,370 B2 | 1/2005 | Baldwin et al. |
| 6,859,869 B1 | 2/2005 | Vorbach |
| 6,868,476 B2 | 3/2005 | Rosenbluth |
| 6,871,341 B1 | 3/2005 | Shyr |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,957,306 B2 | 10/2005 | So et al. |
| 6,961,924 B2 | 11/2005 | Bates et al. |
| 6,975,138 B2 | 12/2005 | Pani et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,667 B2 | 3/2006 | Vorbach et al. |
| 7,028,107 B2 | 4/2006 | Vorbach et al. |
| 7,036,114 B2 | 4/2006 | McWilliams et al. |
| 7,038,952 B1 | 5/2006 | Zack et al. |
| 7,043,416 B1 | 5/2006 | Lin |
| 7,144,152 B2 | 12/2006 | Rusu et al. |
| 7,155,708 B2 | 12/2006 | Hammes et al. |
| 7,164,422 B1 | 1/2007 | Wholey et al. |
| 7,210,129 B2 | 4/2007 | May et al. |
| 7,216,204 B2 | 5/2007 | Rosenbluth |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 7,382,156 B2 | 6/2008 | Pani et al. |
| 7,455,450 B2 | 11/2008 | Liu et al. |
| 7,595,659 B2 | 9/2009 | Vorbach et al. |
| 7,650,448 B2 | 1/2010 | Vorbach et al. |
| 7,657,877 B2 | 2/2010 | Vorbach et al. |
| 7,759,968 B1 | 7/2010 | Hussein et al. |
| 7,873,811 B1 | 1/2011 | Wolinski et al. |
| 2001/0001860 A1 | 5/2001 | Beiu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0010853 A1 | 1/2002 | Trimberger et al. |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0051482 A1 | 5/2002 | Lomp |
| 2002/0073282 A1 | 6/2002 | Chauvel et al. |
| 2002/0083308 A1 | 6/2002 | De Oliveira Kastrup Pereira et al. |
| 2002/0099759 A1 | 7/2002 | Gootherts |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0147932 A1 | 10/2002 | Brock et al. |
| 2002/0152060 A1 | 10/2002 | Tseng |
| 2002/0156962 A1 | 10/2002 | Chopra et al. |
| 2002/0162097 A1 | 10/2002 | Meribout |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | Vorbach |
| 2003/0052711 A1 | 3/2003 | Taylor |
| 2003/0055861 A1 | 3/2003 | Lai et al. |
| 2003/0056062 A1 | 3/2003 | Prabhu |
| 2003/0056085 A1 | 3/2003 | Vorbach |
| 2003/0056091 A1 | 3/2003 | Greenberg |
| 2003/0056202 A1 | 3/2003 | Vorbach |
| 2003/0061542 A1 | 3/2003 | Bates et al. |
| 2003/0062922 A1 | 4/2003 | Douglass et al. |
| 2003/0070059 A1 | 4/2003 | Dally et al. |
| 2003/0086300 A1 | 5/2003 | Noyes et al. |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2003/0154349 A1 | 8/2003 | Berg et al. |
| 2003/0192032 A1 | 10/2003 | Andrade et al. |
| 2003/0226056 A1 | 12/2003 | Yip et al. |
| 2004/0015899 A1 | 1/2004 | May et al. |
| 2004/0025005 A1 | 2/2004 | Vorbach et al. |
| 2004/0039880 A1 | 2/2004 | Pentkovski et al. |
| 2004/0078548 A1 | 4/2004 | Claydon et al. |
| 2004/0088689 A1 | 5/2004 | Hammes |
| 2004/0088691 A1 | 5/2004 | Hammes et al. |
| 2004/0168099 A1 | 8/2004 | Vorbach et al. |
| 2004/0199688 A1 | 10/2004 | Vorbach et al. |
| 2005/0066213 A1 | 3/2005 | Vorbach et al. |
| 2005/0091468 A1 | 4/2005 | Morita et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0036988 A1 | 2/2006 | Allen et al. |
| 2006/0230094 A1 | 10/2006 | Simkins et al. |
| 2006/0230096 A1 | 10/2006 | Thendean et al. |
| 2007/0050603 A1 | 3/2007 | Vorbach et al. |
| 2007/0083730 A1 | 4/2007 | Vorbach et al. |
| 2008/0313383 A1 | 12/2008 | Morita et al. |
| 2009/0085603 A1 | 4/2009 | Paul et al. |
| 2009/0193384 A1 | 7/2009 | Sima et al. |
| 2010/0228918 A1* | 9/2010 | Vorbach et al. ............ 711/118 |
| 2010/0306602 A1 | 12/2010 | Kamiya et al. |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |

| | | |
|---|---|---|
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 102 674 | 5/2001 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 10-44571 | 2/1989 |
| JP | 1-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 6-266605 | 9/1994 |
| JP | 7-086921 | 3/1995 |
| JP | 7-154242 | 6/1995 |
| JP | 8-148989 | 6/1995 |
| JP | 7-182160 | 7/1995 |
| JP | 7-182167 | 7/1995 |
| JP | 8-44581 | 2/1996 |
| JP | 08069447 | 3/1996 |
| JP | 8-101761 | 4/1996 |
| JP | 8-102492 | 4/1996 |
| JP | 8-106443 | 4/1996 |
| JP | 8-221164 | 8/1996 |
| JP | 8-250685 | 9/1996 |
| JP | 9-27745 | 1/1997 |
| JP | 9-237284 | 9/1997 |
| JP | 9-294069 | 11/1997 |
| JP | 11-046187 | 2/1999 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2001-236221 | 8/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO03/091875 | 11/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

ARM Limited, "ARM Architecture Reference Manual," Dec. 6, 2000, pp. A10-6-A10-7.
U.S. Appl. No. 90/010,979, filed May 4, 2010, Vorbach et al.
U.S. Appl. No. 90/011,087, filed Jul. 8, 2010, Vorbach et al.
U.S. Appl. No. 60/109,417, filed Nov. 18, 1998, Jefferson et al.
Abnous et al., "Ultra-Low-Power Domain-Specific Multimedia Processors," U.C. Berkeley, 1996 IEEE, pp. 461-470.
Abnous, A., et al., "The Pleiades Architecture," Chapter I of *The Application of Programmable DSPs in Mobile Communications*, A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Advanced RISC Machines, "Introduction to AMBA," Oct. 1996, Section 1, pp. 1-7.
Albaharna, O.T. et al., "On the Viability of FPGA-Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "APEX 20K Programmable Logic Device Family," Altera Corporation Data Sheet, Mar. 2004, ver. 5.1, pp. 1-117.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Altera, "2. TriMatrix Embedded Memory Blocks in Stratix & Stratix GX Devices," Altera Corporation, Jul. 2005, 28 pages.
Altera, "APEX II Programmable Logic Device Family," Altera Corporation Data Sheet, Aug. 2002, Ver. 3.0, 99 pages.
Arabi, et al., "PLD Integrates Dedicated High-speed Data Buffering, Complex State machine, and Fast Decode Array," conference record on WESCON '93, Sep. 28, 1993, pp. 432-436.
Arm, "The Architecture for the Digital World," http://www.arm.com/products/ Mar. 18, 2009, 3 pages.
Arm, "The Architecture for the Digital World; Milestones," http://www.arm.com/aboutarm/milestones.html Mar. 18, 2009, 5 pages.

Asari, K. et al., "FeRAM circuit technology for system on a chip," *Proceedings First NASAa/DoD Workshop on Evolvable Hardware* (1999), pp. 193-197.

Athanas, "A Functional Reconfigurable Architecture and Compiler for Adoptive Computing," IEEE 1993, pp. 49-55.

Athanas, et al., "An Adaptive Hardware Machine Architecture and Compiler for Dynamic Processor Reconfigutation," IEEE, Laboratory for Engineering man/Machine Systems Division of Engineering, Box D, Brown University, Providence, Rhode Island, 1991, pp. 397-400.

Athanas et al., "Processor Reconfiguration Through Instruction-Set Metamorphosis," 1993, IEEE Computers, pp. 11-18.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT4OK FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Baumgarte, V. et al., PACT XPP "A Self-reconfigurable Data Processing Architecture," PACT Info. GMBH, Munchen Germany, 2001, 7 pages.

Beck et al., "From control flow to data flow," TR 89-1050, Oct. 1989, Dept. of Computer Science, Cornell University, Ithaca, NY, pp. 1-25.

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker et al., "Automatic Parallelism Exploitation for FPL-Based Accelerators," 1998, Proc. 31st Annual Hawaii International Conference on System Sciences, pp. 169-178.

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker, J. et al., "Parallelization in Co-compilation for Configurable Accelerators—a Host/accelerator Partitioning Compilation Method," Proceedings of Asia and South Pacific Design Automation Conference, Yokohama, Japan, Feb. 10-13, 1998, 11 pages.

Becker, J., "A Partitioning Compiler for Computers with Xputer-based Accelerators," 1997, Kaiserslautern University, 326 pp.

Bittner, "Wormhole Run-time Reconfiguration: Conceptualization and VLSI Design of a High Performance Computing System," *Dissertation*, Jan. 23, 1997, pp. I-XX, 1-415.

"BlueGene/L—Hardware Architecture Overview," BlueGene/L design team, IBM Research, Oct. 17, 2003 slide presentation, pp. 1-23.

"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.

BlueGene/L, "An Overview of the BlueGene/L Supercomputer," The BlueGene/L Team, IBM and Lawrence Livermore National Laboratory, 2002 IEEE. pp. 1-22.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cadambi, et al., "Managing Pipeline-reconfigurable FPGAs," ACM, 1998, pp. 55-64.

Callahan, et al., "The Garp Architecture and C Compiler," Computer, Apr. 2000, pp. 62-69.

Cardoso, J.M.P. et al., "A novel algorithm combining temporal partitioning and sharing of functional units," University of Algarve, Faro, Portugal, 2001 IEEE, pp. 1-10.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).

Cardoso, J.M.P., et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.

Cardoso, J.M.P., et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.

Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 07803-1760-2.

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Compton, K. et al., "Configurable Computing: A Survey of Systems and Software," Northwestern University, Dept. of ECE, Technical Report, 1999, (XP-002315148), 39 pages.

Cook, Jeffrey J., "The Amalgam Compiler Infrastructure," Thesis at the University of Illinois at Urbana-Champaign (2004) Chapter 7 & Appendix G.

Cronquist, D. et al., Architecture Design of Reconfigurable Pipelined Datapaths, Department of Computer Science and Engineering, University of Washington, Seattle, WA, Proceedings of the 20th Anniversary Conference on Advanced Research in VSLI, 1999, pp. 1-15.

Culler, D.E; Singh, J.P., "Parallel Computer Architecture," pp. 434-437, 1999, Morgan Kaufmann, San Francisco, CA USA, XP002477559.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Del Corso et al., "Microcomputer Buses and Links," Academic Press Inc. Ltd., 1986, pp. 138-143, 277-285.

Diniz, P., et al., "Automatic Synthesis of Data Storage and Control Structures for FPGA-based Computing Engines," 2000, IEEE, pp. 91-100.

Diniz, P., et al., "A behavioral synthesis estimation interface for configurable computing," University of Southern California, Marina Del Rey, CA, 2001 IEEE, pp. 1-2.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compilers?," IEEE, 1997, pp. 322-325.

Ebeling, C. et al., "Mapping Applications to the RaPiD Configurable Architecture," Department of Computer Science and Engineering, University of Washington, Seattle, WA, *FPGAs for Custom Comput-*

*ing Machines, 1997. Proceedings., The 5th Annual IEEE Symposium*, Publication Date: Apr. 16-18, 1997, 10 pages.

Epstein, Dave, "IBM Extends DSP Performance with Mfaxt," Microprocessor Report, vol. 9, No. 16 (MicroDesign Resources), Dec. 4, 1995, pp. 1-4 [XL0029013].

Equator, Pixels to Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the $2^{nd}$ Annual IEEE International Conference on Innovative Systems in Silicon, New York, NY, Oct. 1997, pp. 323-330.

Forstner, "Wer Zuerst Kommt, Mahit Zuerst!: Teil 3: Einsatzgebiete und Anwendungbeispiele von FIFO-Speichern," Elektronik, Aug. 2000, pp. 104-109.

Franklin, Manoj et al., "A Fill-Unit Approach to Multiple Instruction Issue," Proceedings of the Annual International Symposium on Microarchitecture, Nov. 1994, pp. 162-171.

Freescale Slide Presentation, An Introduction to Motorola's RCF (Reconfigurable Compute Fabric) Technology, Presented by Frank David, Launched by Freescale Semiconductor, Inc., 2004, 39 pages.

Galanis, M.D. et al., "Accelerating Applications by Mapping Critical Kernels on Coarse-Grain Reconfigurable Hardware in Hybrid Systems," Proceedings of the $13^{th}$ Annual IEEE Symposium on Field-Programmable Custom Computing Machines, 2005, 2 pages.

Genius, D. et al., "A Case for Array Merging in Memory Hierarchies," Proceedings of the 9th International Workshop on Compilers for Parallel Computers, CPC'01 (Jun. 2001), 10 pages.

Gokhale, M.B.et al., "Automatic Allocation of Arrays to Memories in FPGA processors with Multiple Memory Banks," Field-Programmable Custom Computing Machines, 1999, IEEE, 6 pages.

Guo, Z. et al., "A Compiler Intermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9, No. 7 (MicroDesign Resources), May 30, 1995, p. 1 and pp. 6-10.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R. et al., "A new FPGA architecture for word-oriented datapaths," Proc. FPL'94, Springer LNCS, Sep. 1994, pp. 144-155.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Huang, Libo et al., "A New Architecture for Multiple-Precision Floating-Point Multiply-Add Fused Unit Design," School of Computer National University of Defense Technology, China, IEEE 2007, 8 pages.

Hwang, K., "Advanced Computer Architecture—Parallelism, Scalability, Programmability," 1993, McGraw-Hill, Inc., pp. 348-355.

Hwang, K., "Computer Architecture and Parallel Processing," Data Flow Computers and VLSI Computations, XP-002418655, 1985 McGraw-Hill, Chapter 10, pp. 732-807.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

IBM Technical Disclosure Bulletin, IBM Corp., New York, XP000424878, Bd. 36, Nr. 11, Nov. 1, 1993, pp. 335-336.

"IEEE Standard Test Access Port and Boundary-Scan Architecture," IEEE Std. 1149.1-1990, 1993, pp. 1-127.

Imec, "ADRES multimedia processor & 3MF multimedia platform", Transferable IP, IMEC Technology Description, (Applicants believe the date to be Oct. 2005), 2 pages.

Inside DSP, "Ambric Discloses Massively Parallel Architecture," Aug. 23, 2006, HTTP://insidedsp.com/tabid/64/articleType/ArticieView/articleId/155/Defa..., 2 pages.

Intel, Intel MXP5800/MXP5400 Digital Media Processors, Architecture Overview, Jun. 2004, Revision 2.4, pp. 1-24.

Intel, "Pentium Pro Family Developer's Manual , vol. 3: Operating System Writer's Guide," Intel Corporation, Dec. 1995, [submitted in 4 PDF files: Part I, Part II, Part III and Part IV], 458 pages.

Iseli, C.,et al. "A C++ Compiler for FPGA Custom Execution Units Synthesis," IEEE, 1995, pp. 173-179.

Isshiki, Tsuyosbi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.

John, L., et al., "A Dynamically Reconfigurable Interconnect for Array Processors," vol. 6, No. 1, Mar. 1998, IEEE, pp. 150-157.

Kanter, David, "NVIDIA's GT200: Inside a Parallel Processor," http://www.realworldtech.com/page.cfm?ArticleID=RWT090989195242&p=1 , Sep. 8, 2008, 27 pages.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6*th* International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, Andreas et al., "High-Level-Language Compilation for Reconfigurable Computers," Proceedings of European Workshop on Reconfigurable Communication-Centric SOCS (Jun. 2005) 8 pages.

Koch, A., et al., "Practical Experiences with the SPARXIL Co-Processor," 1998, IEEE, pp. 394-398.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the 15*th* Annual International Symposium on Computer Architecture, May 30, 1998, pp. 252-260.

Lange, H. et al., "Memory access schemes for configurable processors," Field-Programmable Logic and Applications, International Workshop, FPL, Aug. 27, 2000, pp. 615-625, XP02283963.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Lee, R. B., et al., "Multimedia extensions for general-purpose processors," *IEEE Workshop on Signal Processing Systems, SIPS 97—Design and Implementation* (1997), pp. 9-23.

Lee, Jong-eun et al., "Reconfigurable ALU Array Architecture with Conditional Execution," International Soc. Design Conference (ISOOC) [online] Oct. 25, 2004, Seoul, Korea, 5 pages.

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield,C., "Logic that Mutates While-U-Wait," EDN (Bur. Ed) (USA), EDN (European Edition), Nov. 7, 1996, Cahners Publishing, USA, pp. 137-140, 142.

Mei, Bingfeng et al., "Adres: An Architecture with Tightly Coupled VLIW Processor and Coarse-Grained Reconfigurable Matrix," *Proc. Field-Programmable Logic and Applications* (FPL 03), Springer, 2003, pp. 61-70.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Miyamori, T. et al., "REMARC: Reconfigurable Multimedia Array Coprocessor," Computer Systems Laboratory, Stanford University, Proceedings of the 1998 ACM/SIGDA sixth international symposium on Field programmable gate arrays, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997) Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Myers, G. "Advances in Computer Architecture," Wiley-Interscience Publication, 2nd ed., John Wiley & Sons, Inc., 1978, pp. 463-494.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, 11th International Conference, FPL 2001, Proceedings (Lecture Notes in Computer Science, vol. 2147) (2001) pp. 503-512.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Olukotun, K., "The Case for a Single-Chip Microprocessor," ACM Sigplan Notices, ACM, Association for Computing Machinery, New York, vol. 31, No. 9, Sep. 1996 pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

PCI Local Bus Specification, Production Version, Revision 2.1, Jun. 1, Portland, OR, 1995, pp. 1-281.

Piotrowski, A., "IEC-BUS, Die Funktionsweise des IEC-Bus unde seine Anwendung in Geräten and Systemen," 1987, Franzis-Verlag GmbH, München, pp. 20-25.

Pirsch, P. et al., "VLSI implementations of image and video multimedia processing systems," IEEE Transactions on Circuits and Systems for Video Technology, vol. 8, No. 7, Nov. 1998, pp. 878-891.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Razdan et al., A High-Performance Microarchitecture with Hardware-Programmable Functional Units, Micro-27, Proceedings of the 27*th* Annual International Symposium on Microarchitecture, IEEE Computer Society and Association for Computing Machinery, Nov. 30-Dec. 2, 1994, pp. 172-180.

Ryo, A., "Auszug aus Handbuch der Informationsverarbeitung," ed. Information Processing Society of Japan, Information Processing Handbook, New Edition, Software Information Center, Ohmsha, Dec. 1998, 4 pages. [Translation provided].

Saleeba, M. "A Self-Contained Dynamically Reconfigurable Processor Architecture," Sixteenth Australian Computer Science Conference, ASCS-16, QLD, Australia, Feb. 1993, pp. 59-70.

Saleeba, Z.M.G., "A Self-Reconfiguring Computer System," Department of Computer Science, Monash University (Dissertation) 1998, pp. 1-306.

Salefski, B. et al., "Re-configurable computing in wireless," Annual ACM IEEE Design Automation Conference: Proceedings of the 38th conference on Design automation (2001) pp. 178-183.
Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.
Schmidt, H. et al., "Behavioral synthesis for FGPA-based computing," Carnegie Mellon University, Pittsburgh, PA, 1994 IEEE, pp. 125-132.
Schmidt, U. et al., "Datawave: A Single-Chip Multiprocessor for Video Applications," IEEE Micro, vol. 11, No. 3, May/Jun. 1991, pp. 22-25, 88-94.
Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.
Shin, D., et al., "C-based Interactive RTL Design Methodology," Technical Report CECS-0342 (Dec. 2003) pp. 1-16.
Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.
Siemers, C.,"Rechenfabrik Ansaetze Fuer Extrem Parallele Prozessoren," Verlag Heinze Heise GmbH., Hannover, DE No. 15, Jul. 16, 2001, pp. 170-179.
Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3$^{rd}$ Australian Computer Architecture Conference, Perth, John Morris, Ed., Feb. 2-3, 1998, pp. 169-178.
Simunic, et al., Source Code Optimization and Profiling of Energy Consurnation in Embedded Systems, Proceedings of the 13$^{th}$ International Symposium on System Synthesis, Sep. 2000, pp. 193-198.
Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.
Skokan, Z.E., "Programmable logic machine (A programmable cell array)," IEEE Journal of Solid-State Circuits, vol. 18, Issue 5, Oct. 1983, pp. 572-578.
Sondervan, J., "Retiming and logic synthesis," Electronic Engineering (Jan. 1993) vol. 65(793), pp. 33, 35-36.
Soni, M., "VLSI Implementation of a Wormhole Run-time Reconfigurable Processor," Jun. 2001, (Masters Thesis)Virginia Polytechnic Institute and State University, 88 pages.
Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].
Sutton et al., "A Multiprocessor DSP System Using PADDI-2," U.C. Berkeley, 1998 ACM, pp. 62-65.
Tau, E., et al., "A First Generation DPGA Implementation," *FPD '95*, pp. 138-143.
Tenca, A.F., et al., "A Variable Long-Precision Arithmetic Unit Design for Reconfigurable Coprocessor Architectures," University of California, Los Angeles, 1998, pp. 216-225.
The XPP White Paper, Release 2.1, PACT—A Technical Perspective, Mar. 27, 2002, pp. 1-27.
TMS320C54X DSP: CPU and Peripherals, Texas Instruments, 1996, 25 pages.
TMS320C54x DSP: Mnemonic Instruction Set, Texas Instruments, 1996, 342 pages.
Tsutsui, A., et al., "YARDS: FPGA/MPU Hybrid Architecture for Telecommunication Data Processing," NTT Optical Network Systems Laboratories, Japan, 1997 ACM, pp. 93-99.
Vasell et al., "The Function Processor: A Data-Driven Processor Array for Irregular Computations," Chalmers University of Technology, Sweden, 1992, pp. 1-21.
Villasenor, et al., "Configurable Computing Solutions for Automatic Target Recognition," *IEEE*, 1996 pp. 70-79.
Villasenor, et al., "Configurable Computing," *Scientific American*, vol. 276, No. 6, Jun. 1997, pp. 66-71.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.
Waingold, E., et al., "Baring it all to software: Raw machines," IEEE Computer, Sep. 1997, at 86-93.
Weinhardt, M., "Compilation Methods for Structure-programmable Computers," dissertation, ISBN 3-89722-011-3, 1997. [Table of Contents and English Abstract Provided].
Weinhardt, Markus et al., "Pipeline Vectorization for Reconfigurable Systems," 1999, IEEE, pp. 52-62.
Weinhardt, Markus et al., "Pipeline Vectorization," IEEE Transactions on Computer-Aided Design of Integrated Circuits and Systems, vol. 20, No. 2, Feb. 2001, pp. 234-248.
Weinhardt, Markus et al., "Memory Access Optimization for Reconfigurable Systems," IEEE Proceedings Computers and Digital Techniques, 48(3) (May 2001), pp. 1-16.
Wittig, et al., "OneChip: An FPGA Processor with Reconfigurable Logic," IEEE, 1996, pp. 126-135.
Wolfe, M. et al., "High Performance Compilers for Parallel Computing" (Addison-Wesley 1996) Table of Contents, 11 pages.
Wu, et al., "A New Cache Directory Scheme," IEEE, pp. 466-472, Jun. 1996.
Xu, H. et al., "Parallel QR Factorization on a Block Data Flow Architecture," Conference Proceeding Article, Mar. 1, 1992, pp. 332-336.
Xilinx, "Logic Cell Array Families: XC4000, XC4000A and XC4000H," 1994, product description, pp. 2-7, 2-9, 2-14, 2-15, 8-16, and 9-14.
Xilinx, "Spartan and SpartanXL Families Field Programmable Gate Arrays," Jan. 1999, Xilinx, pp. 4-3 through 4-70.
Xilinx, "The Programmable Logic Data Book," 1994, Section 2, pp. 1-231, Section 8, pp. 1, 23-25, 29, 45-52, 169-172.
Xilinx, "XC6200 Field Programmable Gate Arrays," Apr. 24, 1997, Xilinx product description, pp. 1-73.
Xilinx, "XC3000 Series Field Programmable Gate Arrays," Nov. 6, 1998, Xilinx product description, pp. 1-76.
Xilinx, "XC4000E and XC4000X Series Field Programmable Gate Arrays," May 14, 1999, Xilinx product description, pp. 1-68.
Xilinx, "Virtex-E 1.8 V Extended Memory Field Programmable Gate Arrays," Jul. 17, 2002, Xilinx Production Product Specification, pp. 1-118.
Xilinx, "Virtex-II and Virtex-II Pro X FPGA User Guide," Mar. 28, 2007, Xilinx user guide, pp. 1-559.
Xilinx, "Virtex-II and Virtex-II Pro X FPGA Platform FPGAs: Complete Data Sheet," (v4.6) Mar. 5, 2007, pp. 1-302.
Xilinx, "Virtex-II Platform FPGAs: Complete Data Sheet," (v3.5) Nov. 5, 2007, pp. 1-226.
Xilinx, "Virtex-E 1.8 V Extended Memory Field Programmable Gate Arrays," (v2.2) Sep. 10, 2002, Xilinx Production Product Specification, pp. 1-52.
Xilinx, White Paper 370: (Virtex-6 and Spartan-6 FPGA Families) "Reducing Switching Power with Intelligent Clock Gating," Frederic Rivoallon, May 3, 2010, pp. 1-5.
Xilinx, White Paper 298: (Spartan-6 and Virtex-6 Devices) "Power Consumption at 40 and 50 nm," Matt Klein, Apr. 13, 2009, pp. 1-21.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991) Table of Contents, 5 pages.

Xilinx, Inc.'s and Avnet, Inc.'s Disclosure Pursuant to P.R. 4-2; *PACT XPP Technologies, AG. v. Xilinx, Inc. and Avnet, Inc.*, Case No. 2:07-cv-00563-TJW-CE, U.S. District Court for the Eastern District of Texas, Dec. 28, 2007, 4 pages.

Xilinx, Inc.'s and Avnet, Inc.'s Disclosure Pursuant to P.R. 4-1; *PACT XPP Technologies, AG. v. Xilinx, Inc. and Avnet, Inc.*, Case No. 2:07-cv-00563-TJW-CE, U.S. District Court for the Eastern District of Texas, Dec. 28, 2007, 9 pages.

Defendant's Claim Construction Chart for P.R. 4-2 Constructions and Extrinsic Evidence for Terms Proposed by Defendants, *PACT XPP Technologies, AG. v. Xilinx, Inc. and Avnet, Inc.*, Case No. 2:07-cv-00563-TJW-CE, U.S. District Court for the Eastern District of Texas, Dec. 28, 2007, pp. 1-19.

PACT'S P.R. 4-1 List of Claim Terms for Construction, *PACT XPP Technologies, AG. v. Xilinx, Inc. and Avnet, Inc.*, Case No. 2:07-cv-00563-TJW-CE, U.S. District Court for the Eastern District of Texas, Dec. 28, 2007, pp. 1-7.

PACT'S P.R. 4-2 Preliminary Claim Constructions and Extrinsic Evidence, *PACT XPP Technologies, AG. v. Xilinx, Inc and Avnet, Inc.*, Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).

Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alike, Peter; New, Bernie, *Xilinx Application Note*, "Additional XC3000 Data," XAPP 024.000, 1994, pp. 8-11 through 8-20.

Alike, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alike, Peter, *Xilinx Application Note*, "Dynamic Reconfiguration," XAPP 093, Nov. 10, 1997, pp. 13-45 through 13-46.

Alflce, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors*, 1995, Fremont, CA., pp. 673-698.

Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.

Cartier, Lois, *Xilinx Application Note*, "System Design with New XC4000EX I/O Features," Feb. 21, 1996, pp. 1-8.

Chen, D., (Thesis) "Programmable arithmetic devices for high speed digital signal processing," U. California Berkeley 1992, pp. 1-175.

Churcher, S., et al., "The XC6200 FastMap TM Processor Interface," Xilinx, Inc., Aug. 1995, pp. 1-8.

Cowie, Beth, *Xilinx Application Note*, "High Performance, Low Area, Interpolator Design for the XC6200," XAPP 081, May 7, 1997 (Version 1.0), pp. 1-10.

Duncan, Ann, *Xilinx Application Note*, "A32x16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.

Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.

Fawcett, B., "New SRAM-Based FPGA Architectures Address New Applications," Xilinx, Inc. San Jose, CA, Nov. 1995, pp. 231-236.

Goslin, G; Newgard, B, *Xilinx Application Note*, "16-Tap, 8-Bit FIR Filter Applications Guide," Nov. 21, 1994, pp. 1-5.

Iwanczuk Roman, *Xilinx Application Note*, "Using the XC4000 RAM Capability," XAPP 031.000, 1994, pp. 8-127 through 8-138.

Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.

New, Bernie, *Xilinx Application Note*, "Boundary Scan Emulator for XC3000," XAPP 007.001, 1994, pp. 8-53 through 8-59.

New, Bernie, *Xilinx Application Note*, "Ultra-Fast Synchronous Counters," XAPP 014.001, 1994, pp. 8-78 through 8-81.

New, Bernie, *Xilinx Application Note*, "Using the Dedicated Carry Logic in XC4000," XAPP 013.001, 1994, pp. 8-105 through 8-115.

New, Bernie, *Xilinx Application Note*, "Complex Digital Waveform Generator," XAPP 008.002, 1994, pp. 8-163 through 8-164.

New, Bernie, *Xilinx Application Note*, "Bus-Structured Serial Input-Output Device," XAPP 010.001, 1994, pp. 8-181 through 8-182.

Ridgeway, David, *Xilinx Application Note*, "Designing Complex 2-Dimensional Convolution Filters," XAPP 037.000, 1994, pp. 8-175 through 8-177.

Rowson, J., et al., "Second-generation compilers optimize semicustom circuits," Electronic Design, Feb. 19, 1987, pp. 92-96.

Schewel, J., "A Hardware/Software Co-Design System using Configurable Computing Technology," Virtual Computer Corporation, Reseda, CA, IEEE 1998, pp. 620-625.

Segers, Dennis, Xilinx Memorandum, "MIKE—Product Description and MRD," Jun. 8, 1994, pp. 1-29.

Texas Instruments, "TMS320C8x System-Level Synopsis," Sep. 1995, 75 pages.

Texas Instruments, "TMS320C80 Digital Signal Processor," Data Sheet, Digital Signal Processing Solutions 1997, 171 pages.

Texas Instruments, "TMS320C80 (MVP) Parallel Processor," User's Guide, Digital Signal Processing Products 1995, 73 pages.

Trainor, D.W., et al., "Implementation of the 2D DCT Using a Xilinx XC6264 FPGA," 1997, IEEE Workshop of Signal Processing Systems SiPS 97, pp. 541-550.

Trimberger, S., (Ed.) et al., "Field-Programmable Gate Array Technology," 1994, Kluwer Academic Press, pp. 1-258 (and the Title Page, Table of Contents, and Preface) [274 pages total].

Trimberger, S., "A Reprogrammable Gate Array and Applications," IEEE 1993, Proceedings of the IEEE, vol. 81, No. 7, Jul. 1993, pp. 1030-1041.

Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996.(Version 1.1), pp. 1-9.
Wilkie, Bill,*Xilinx Application Note*, "Interfacing XC6200 to Microprocessors (MC68020 Example)," XAPP 063, Oct. 9, 1996.(Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, "A Fast Constant Coefficient Multiplier for the XC6200," XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROMless) 16-Bit Mixed Signal Processor," 1992, pp. 1-82.
Defendants' Invalidity Contentions in *PACT XPP Technologies, AG v. XILINX, Inc., et al.*, (ED. Texas Dec. 28, 2007) (No. 2:07cv563)., including Exhibits A through K in separate PDF files.
Hauser, John Reid, (Dissertation) "Augmenting a Microprocessor with Reconfigurable Hardware," University of California, Berkeley, Fall 2000, 255 pages. (submitted in 3 PDFs, Parts 1-3).
Hauser, John R., "The Garp Architecture," University of California at Berkeley, Computer Science Division, Oct. 997, pp. 1-55.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.
Ballagh et al., "Java Debug Hardware Models Using JBits," 8th Reconfigurable Architectures Workshop, 2001, 8 pages.
Bellows et al., "Designing Run-Time Reconfigurable Systems with JHDL," Journal of VLSI Signal Processing, vol. 28, Kluwer Academic Publishers, The Netherlands, 2001, pp. 29-45.
Guccione et al., "JBits: Java based interface for reconfigurable computing," Xilinx, Inc., San Jose, CA, 1999, 9 pages.
Price et al., "Debug ofReconfigurable Systems," Xilinx, Inc., San Jose, CA, Proceedings of SPIE, 2000, pp. 181-187.
Sundararajan et al., "Testing FPGA Devices Using JBits," Proc. MAPLD 2001, Maryland, USA, Katz (ed.), NASA, CA, 8 pages.
U.S. Appl. No. 90/010,450, filed Mar. 27, 2009.
Culler, D.E; Singh, J.P., "Parallel Computer Architecture," p. 17, 1999, Morgan Kaufmann, San Francisco, CA USA, XP002477559.
Short, Kenneth L., *Microprocessors and Programmed Logic*, Prentice Hall, Inc., New Jersey 1981, p. 34.
Webster's Ninth New Collegiate Dictionary, Merriam-Webster, Inc., 1990, p. 332 (definition of "dedicated").
Altera, "Implementing High-Speed Search Applications with Altera CAM," Jul. 2001, Ver. 2.1, Application Note 119, 50 pages.
Bolsens, Ivo (CTO Xilinx), "FPGA, a history of interconnect," Xilinx slide presentation, posted on the interact Oct. 30, 2008 at http://www.docstoc.com/docs/2198008/FPGA-a-history-of-interconnect, 32 pages.
Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.
Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.
Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.
FOLDOC, The Free On-Line Dictionary of Computing, "handshaking," online Jan. 13, 1995, retrieved from Internet Jan. 23, 2011 at http://foldoc.org/handshake.
Li et al., "Hardware-Software Co-Design of Embedded Reconfigurable Architectures," Los Angeles, CA, 2000, ACM, pp. 507-512.
Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.
Melvin, Stephen et al., "Hardware Support for Large Atomic Units in Dynamically Scheduled Machines," Computer Science Division, University of California, Berkeley, IEEE (1988), pp. 60-63.
Pistorius et al., "Generation of Very Large Circuits to Benchmark the Partitioning of FPGAs," Monterey, CA, 1999, ACM, pp. 67-73.
Roterberg, Eric., et al., "Trace Cache: a Low Latency Approach to High Bandwidth Instruction Fetching," Proceedings of the 29th Annual International Symposium on Michoarchitecture, Paris, France, IEEE (1996), 12 pages.
Translation of DE 101 39 170 by examiner using Google Translate, 10 pages.
Coelho, F., "Compiling dynamic mappings with array copies," Jul. 1997, 12 pages, http://delivery.acm.org/10.1145/270000/263786/p168-coelho.pdf.
Janssen et al., "A Specification Invariant Technique for Regularity Improvement between Flow-Graph Clusters," Mar. 1996, 6 pages, http://delivery.acm.org/10.1145/790000/787534/74230138.pdf.
Microsoft Press Computer Dictionary, Second Edition, 1994, Microsoft Press, ISBN 1-55615-597-2, p. 10.
Newton, Harry, "Newton's Telecom Dictionary," Ninteenth Edition, 2003, CMP Books, p. 40.
Rehmouni et al., "Formulation and evaluation of scheduling techniques for control flow graphs," Dec. 1995, 6 pages, http://delivery.acm.org/10.1145/230000/224352/p386-rahmouni.pdf.
Sinha et al., "System-dependence-graph-based slicing of programs with arbitrary interprocedural control flow," May 1999, 10 pages, http://delivery.acm.org/10.1145/310000/2036751p432-sinha.pdf.
Stallings, William, "Data & Computer Communications," Sixth Edition, Jun. 2000, Prentice-Hall, Inc., ISBN 0-084370-9, pp. 195-196.
Ramanathan et al., "Reconfigurable Filter Coprocessor Architecture for DSP Applications," Journal of VLSI Signal Processing, 2000, vol. 26, pp. 333-359.
Shanley, Tom, *Pentium Pro and Pentium II System Architecture*, MindSharc, Inc., Addition Wesley, 1998, Second Edition, pp. 11-17; Chapter 7; Chapter 10; pp. 209-211, and p. 394.
Shoup, Richard, "Programmable Cellular Logic Arrays," Dissertation, Computer Science Department, Carnegie-Mellon University, Mar. 1970, 193 pages.
Zucker, Daniel F., "A Comparison of Hardware Prefetching Techniques for Multimedia Benchmarks," Technical Report: CSL-TR-95-683, Dec. 1995, 26 pages.
Microsoft Press Computer Dictionary, Third Edition,Redmond, WA, 1997, 3 pages.
Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.). Chapman & Hall, 1996, 3 pages.

Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modem Dictionary of Electronics, Sixth Edition, Rudolf Graf (Ed.), Newnes (Butterwoth-Heinemann), 1997, 5 pages.
The American Heritage Dictionary, Fourth Edition, Dell (Houghton-Mifflin), 2001, 5 pages.
The American Heritage Dictionary, Second College Edition, Houghton Mifflin, 1982, 23 pages.
The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Dud= German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modem Dictionary of Electronics, Sixth Edition Revised and Updated, Rudolf F. Graf (Ed.), Butterworth-Heinemann, 1997, 7 pages.
Modem Dictionary of Electronics, Sixth Edition Revised and Updated, Rudolf F. Graf (Ed.), Butterworth-Heinemann, 1997, 5 pages.
Garner's Modem American Usage, Bryan A. Gamer (Ed.), Oxford University Press, 2003, 3 pages.
The New Fowler's Modem English Usage, R.W. Burchfield (Ed.), Oxford University Press, 2000, 3 pages.
Wikipedia, the free encyclopedia, "Granularity", at http://en.wikipedia.org/wiki/Granularity, Jun. 18, 2010, 4 pages.
Wordsmyth, The Premier Educational Dictionary—Thesaurus, at http://www.wordsmyth.net, "communication", Jun. 18, 2010, 1 page.
Yahoo! Education, "affect", at http://education.yahoo.com/reference/dictionary/entry/affect, Jun. 18, 2010, 2 pages.
mPulse Living Language, "high-level", at http://www.macmillandictionary.com/dictionarv/american/high-level, Jun. 18, 2010, 1 page.
MSN Encarta, "regroup", at http://encarta.msn.com/encnet/features/dictionary/DictionaryResults.aspx?lextype=3&search=regroup, Jun. 17, 2010, 2 pages.
MSN Encarta, "synchronize", at http://encarta.msn.com/encnet/features/dictionary/DictionaryResults.aspx?lextype=3&search=synchronize, Jun. 17, 2010, 2 pages.
MSN Encarta, "pattern", at http://encarta.msn.com/encnet/features/dictionary/DictionaryResults.aspx?lextype=3&search=partern, Jun. 17, 2010, 2 pages.
MSN Encarta, "dimension", at http://encarta.msn.com/encnet/features/dictionary/DictionaryResults.aspx?lextype=3&search=dimension, Jun. 17, 2010, 2 pages.

MSN Encarta, "communication", at http://encarta.msn.com/encnet/features/dictionary/DictionaryResults.aspx?lextype=3&search=communication, Jun. 17, 2010, 2 pages.
MSN Encarta, "arrangement", at http://encarta.msn.com/encnet/features/dictionary/DictionaryResults.aspx?lextype=3&search=arrangement, Jun. 17, 2010, 2 pages.
MSN Encarta, "vector", at http://encarta.msn.com/encnet/features/dictionary/DictionaryResults.aspx?lextype=3&search=vector, Jul. 30, 2010, 2 pages.
Dictionary.com, "address", at http://dictionary.reference.com/browse/address, Jun. 18, 2010, 4 pages.
P.R . 4-3 Joint Claim Constructions Statement, *PACT XPP Technologies, AG v. Xilinx, Inc. and Avnet, Inc et al.*, E.D. Texas, 2:07-cv00563-CE, Jul. 19, 2010, pp. 1-50.
Order Granting Joint Motion for Leave to File an Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, 72 pages.
P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 3, 2010, pp. 1-65.
Exhibit A—P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, pp. 1-66.
PACT's Opening Claim Construction Brief *PACT XPP Technologies, AG v. Xilinx, Inc. and Avnet, Inc.*, E.D. Texas, 2:07-cv-00563-CE, Nov. 1, 2010, pp. 1-55.
Declaration of Harry L. (Nick) Tredennick in Support of Pact's Claim Constructions, *PACT XPP Technologies, AG v. Xilinx, Inc. and Avnet, Inc. et al.*, E.D. Texas, 2:07-cv-00563-CE, Nov. 1, 2010, pp. 1-87.
Transcript of Harry (Nick) L. Tredennick III, Ph.D., Oct. 11, 2010, vol. 1, Exhibit 16 of PACT's Opening Claim Construction Briet *PACT XPP Technologies, AG v. Xilinx, Inc. and Avnet, Inc. et al.*, E.D. Texas, 2:07-cv-00563-CE, Nov. 1, 2010, pp. 1-3.
Agreed and Disputed Terms, Exhibit 17 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-16.
Oral Videotaped Deposition—Joseph McAlexander dated Oct. 12, 2010, vol. 1, Exhibit 18 of PACT's Opening Claim Construction Brief, *PACT XPP Technologies, AG v. Xillnx Inc. and Avnet, Inc. et al.*, E.D. Texas, 2:07-cv-00563-CE, Nov. 1, 2010, pp. 1-17.
Expert Report of Joe McAlexander Re Claim Construction dated Sep. 27, 2010, Exhibit 19 of PACT's Opening Claim Construction Brief *PACT XPP Technologies, AG v. Xilinx, Inc. and Avnet, Inc. et al.*, E.D. Texas, 2:07-cv-00563-CE, Nov. 1, 2010, pp. 1-112.
Documents from File History of U.S. Appl. No. 09/290,342, filed Apr. 12, 1999, Exhibit 20 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-37.
Amendment from File History of U.S. Appl. No. 10/156,397, filed May 28, 2002, Exhibit 25 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Documents from File History U.S. Appl. No. 09/329,132, filed Jun. 9, 1999, Exhibit 27 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-36.
Amendment from File History of U.S. Appl. No. 10/791,501, filed Mar. 1, 2004, Exhibit 39 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-9.
Amendment from File History of U.S. Appl. No. 10/265,846, filed Oct. 7, 2002, Exhibit 40 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Defendants Xilinx, Inc. and Avnet, Inc.'s Responsive Claim Construction Brief *PACT XPP Technologies, AG v. Xilinx, Inc. and Avnet, Inc. et al.*, E.D. Texas, 2:07-cv-00563-CE, Dec. 6, 2010, pp. 1-55.

Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG v. Xilinx, Inc. and Avnet, Inc. et al.*, E.D. Texas, 2:07-cv-00563-CE, Dec. 6, 2010, pp. 1-5.

Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.

Expert Report of Joe McAlexander re Claim Construction, Exhibit 2 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.

Various Documents from File History of U.S. Appl. No. 09/290,342, filed Apr. 22, 1999, Exhibit 6 of Defendants Xilinx, Inc. and Avnet, Inc.'s Responsive Claim Construction Breif, *PACT XPP Technologies, AG v. Xilinx, Inc. and Avnet, Inc. et al.*, E.D. Texas, 2:07-cv-00563-CE, Dec. 6, 2010, pp. 1-181.

Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-28.

Amendment, Response from File History of U.S. Appl. No. 10/156,397, filed May 28, 2002, Exhibit 15 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.

Application from File History of U.S. Appl. No. 08/544,435, filed Nov. 17, 1995, Exhibit 20 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-102.

Documents from File History of U.S. Appl. No. 09/329,132, filed Jun. 9, 1999, Exhibit 24 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-13.

Documents from File History of U.S. Appl. No. 10/791,501, filed Mar. 1, 2004, Exhibit 25 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-14.

Amendment from File History of U.S. Appl. No. 11/246,617, filed Oct. 7, 2005, Exhibit 26 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-9.

Documents from File History of U.S. Appl. No. 08/947,254, filed Oct. 8, 1997, Exhibit 27 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-38.

Documents from File History of U.S. Appl. No. 08/947,254, filed Oct. 8, 1997, specifically, German priority application specification [English translation provided], Exhibit 33 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, 54 pages [including English translation].

Documents from File History of U.S. Appl. No. 09/335,974, filed Jun. 18, 1999, Exhibit 28 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-32.

Documents from File History of U.S. Patent Reexamination Control No. 90/010,450 (filed Mar. 27, 2009), Exhibit 30 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-71.

Documents from File History of U.S. Appl. No. 10/265,846, filed Oct. 7, 2002, Exhibit 32 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-23.

PACT'S Claim Construction Reply Brie& *PACT XPP Technologies, AG v. Xilinx, Inc. and Avnet, Inc. et al.*, E.D. Texas, 2:07-cv-00563-CE, Jan. 7, 2011, pp. 1-20.

Defendants Xilinx, Inc. and Avnet, Inc.'s Claim Construction Surreply Brief, *PACT XPP Technologies, AG v. Xilinx, Inc. and Avnet, Inc. et al.*, E.D. Texas, 2:07-cv-00563-CE, Jan. 18, 2011, 142 pages.

Markman Hearing Minutes and Attorney Sign-In Sheet, *PACT XPP Technologies, AG v. Xilinx, Inc. and Avnet, Inc. et al.*, Ed. Texas, 2:07-cv-00563-CE, Feb. 22, 2011, 3 pages; and court transcript, 245 pages.

Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.

Atmel Corporation, Atmel 5-K- 50K Gates Coprocessor FPGA and FreeRAM, (www.atmel.com), Apr. 2002, pp. 1-68.

Glaskowsky, Peter N., "PACT Debuts Extreme Processor; Reconfigurable ALU Array is Very Powerful—and Very Complex" Microprocessor, The Insider's Guide to Microprocessor Hardware, MicroDesign Resources—Microprocessor Report, Oct. 9, 2000 (www.MPRonline.com) 6 pages.

Glaskowsky, Peter N., "Analysis' Choice Nominees Named; Our Picks for 2002's Most Important Products and Technologies" Microprocessor, The Insider's Guide to Microprocessor Hardware, MicroDesign Resources—Microprocessor Report, Dec. 9, 2002 (www.MPRonline.com), 4 pages.

Lattice Semiconductor Corporation, ispLSI 2000E, 2000VE and 2000 VL Family Architectural Description, Oct. 2001, pp. 1-88.

Olukotun, K. at al., "Rationale, Design and Performance of the Hydra Multiprocessor," Computer Systems Laboratory, Stanford University, CA, Nov. 1994, pp. 1-19.

PACT Corporate Backgrounder, PACT company release, Oct. 2008, 4 pages.

Page, Ian., "Reconfigurable processor architectures," Oxford University Computing Laboratory, Oxford UK, Elsevier Science B.V., Microprocessors an Microsystems 20 (1996) pp. 185-196.

Singh, Hartej et al., "Morpho-Sys: A Reconfigurable Architecture for Multimedia Applications," Univ. of California, Irvine, CA and Federal University of Rio de Janeiro, Brazil, at http://www.eng.uci.edu/morohosys/docs/sbcci98.html, 10 pages.

Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Reconfigurable Computing*, Springer 2007, pp. 89-149.

Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.

Xilinx, XC6200 Field Programmable Gate Arrays, Advance Product Specification, Jun. 1, 1996 (Version 1.0), pp. 4-255 through 4-286.

Xilinx, Virtex-II Platform FPGA User Guide, U0002 (V2.1) Mar. 28, 2007, pp. 1-502 [Parts 1-3].

(86) Xilinx, XC4000E and SC4000X Serial Field Programmable Gate Arrays, Product Specification (Version 1.6), May 14, 1999, pp. 1-107.

* cited by examiner

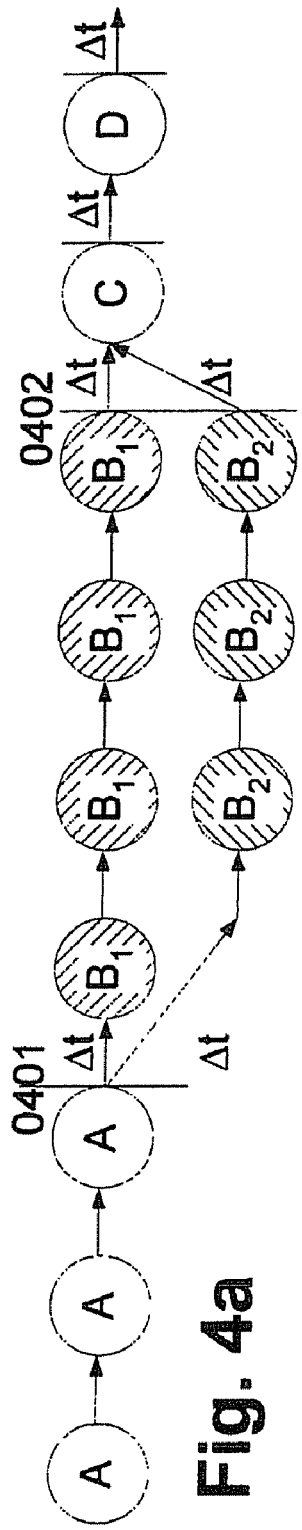
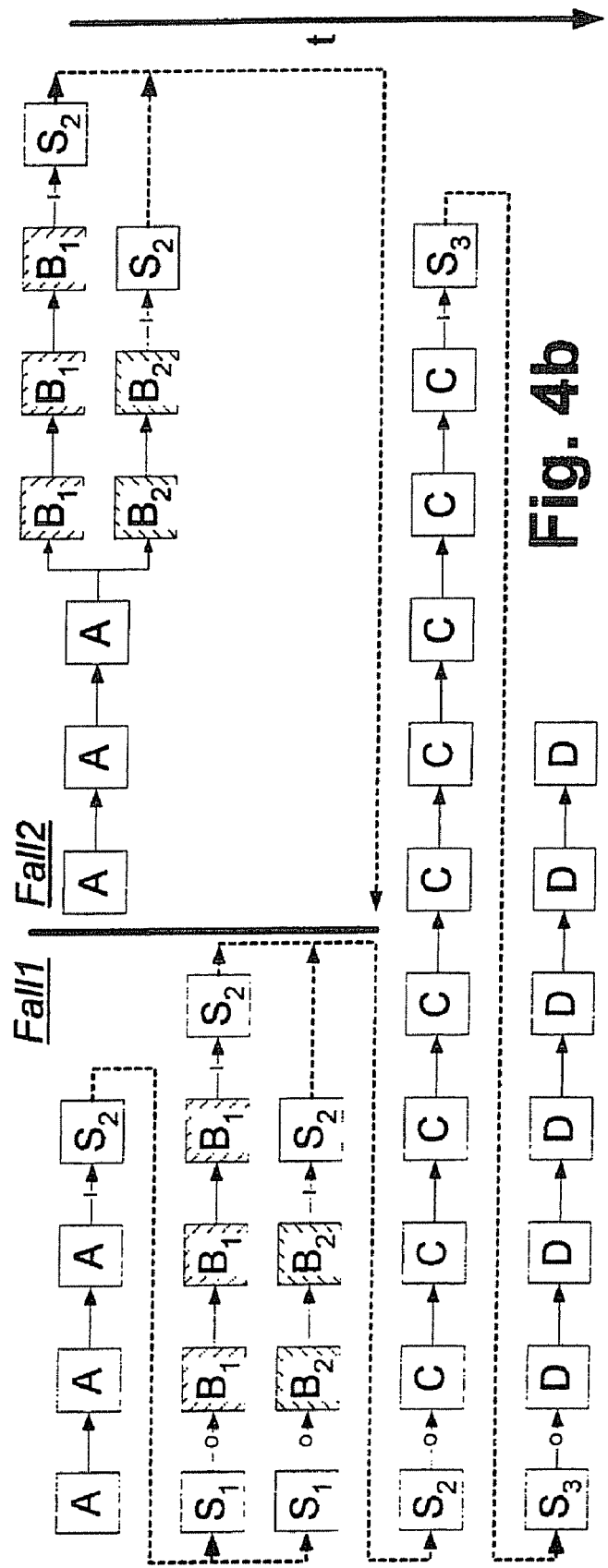
Fig. 4a
Fig. 4b

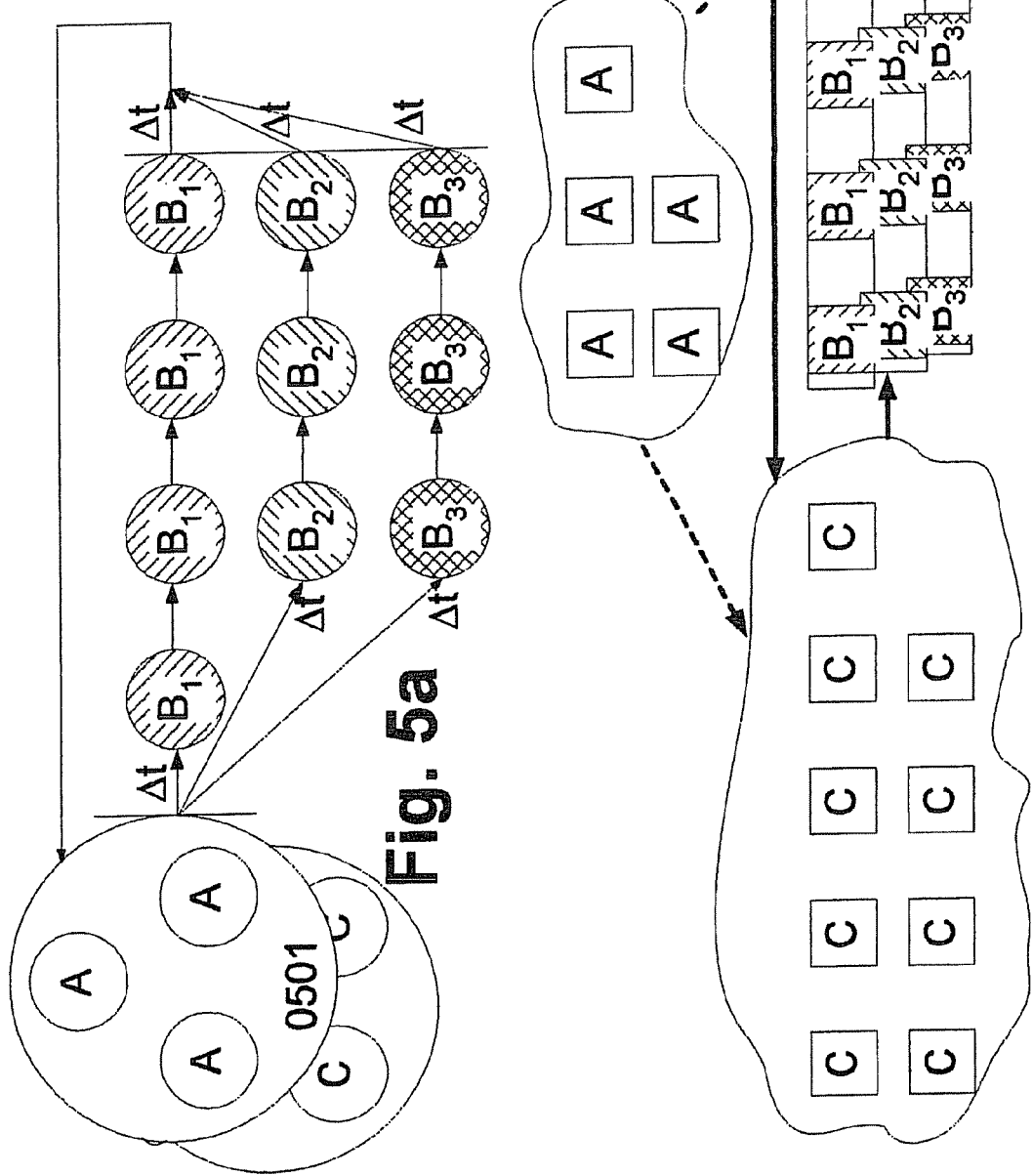

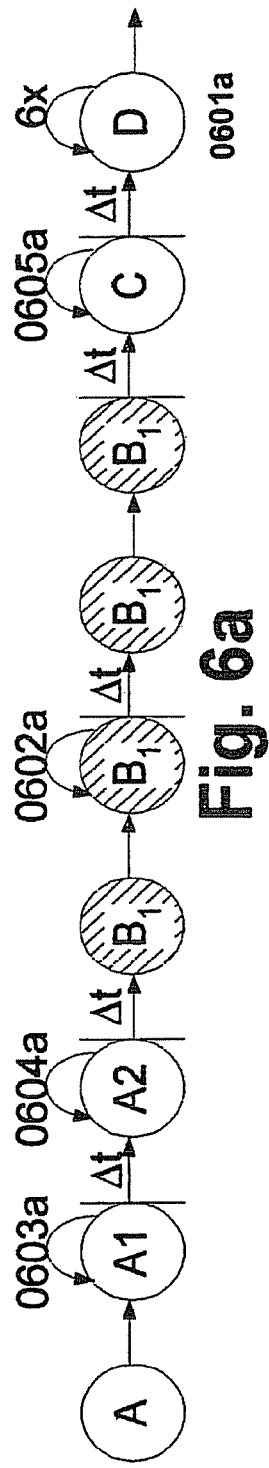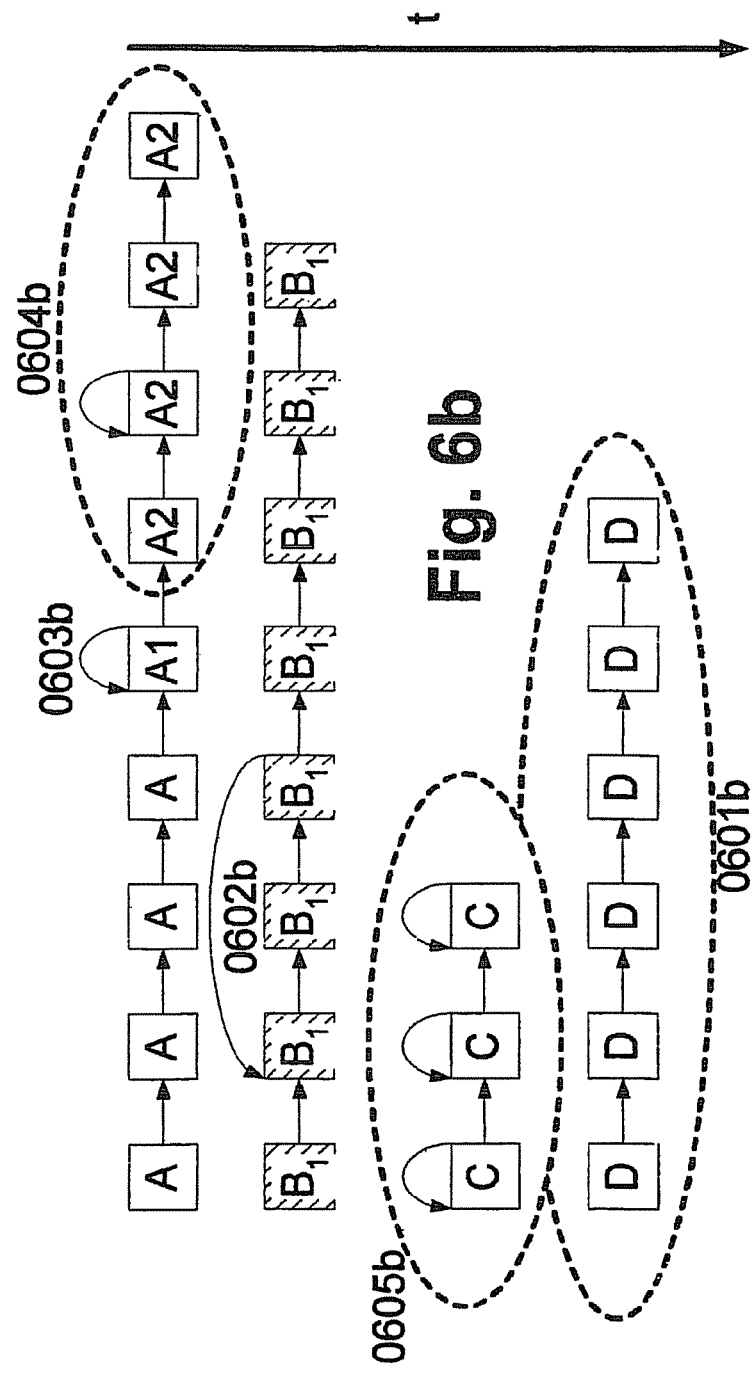
Fig. 6a
Fig. 6b

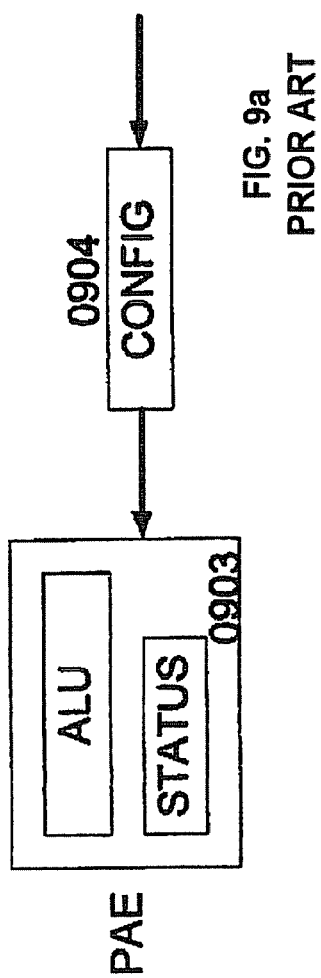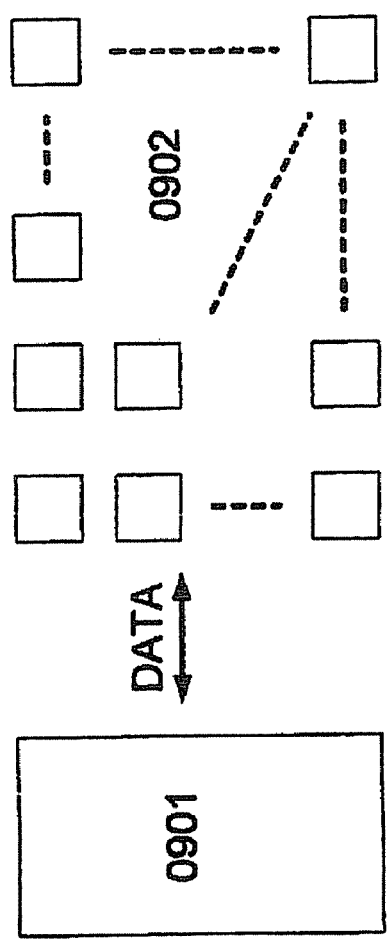
FIG. 9a PRIOR ART
FIG. 9b PRIOR ART

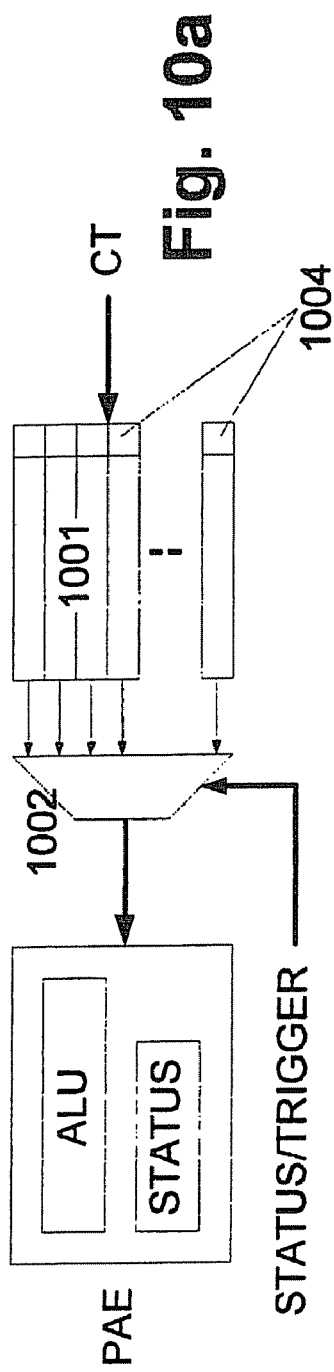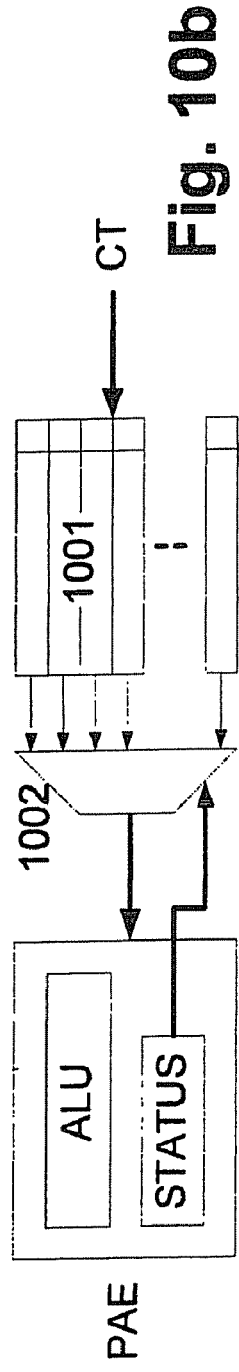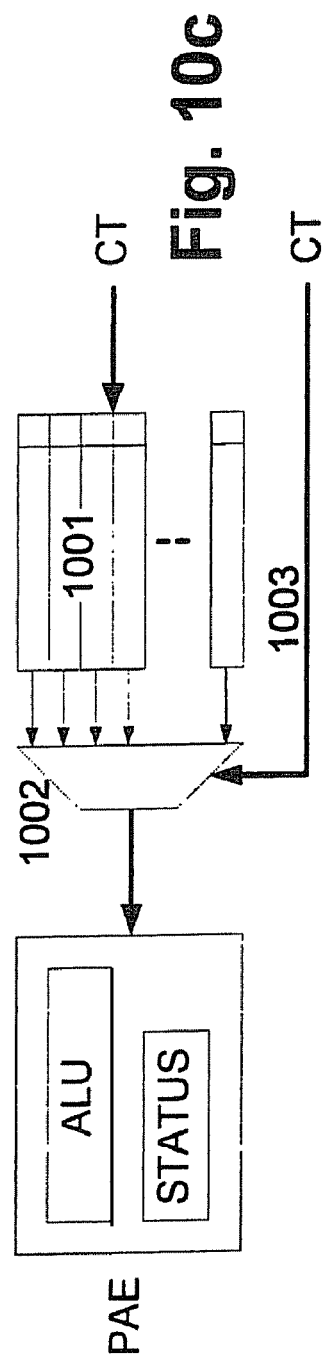

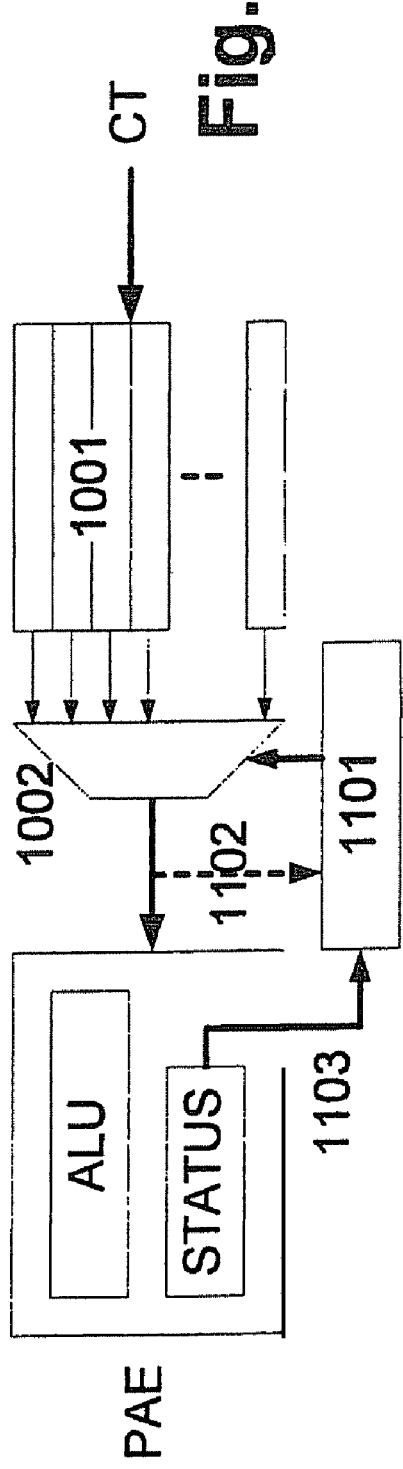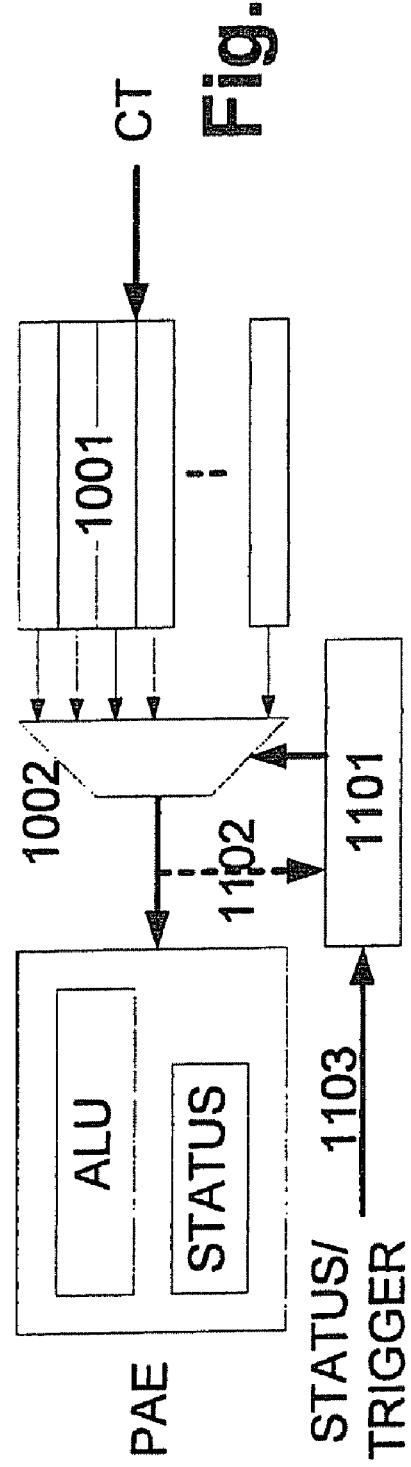

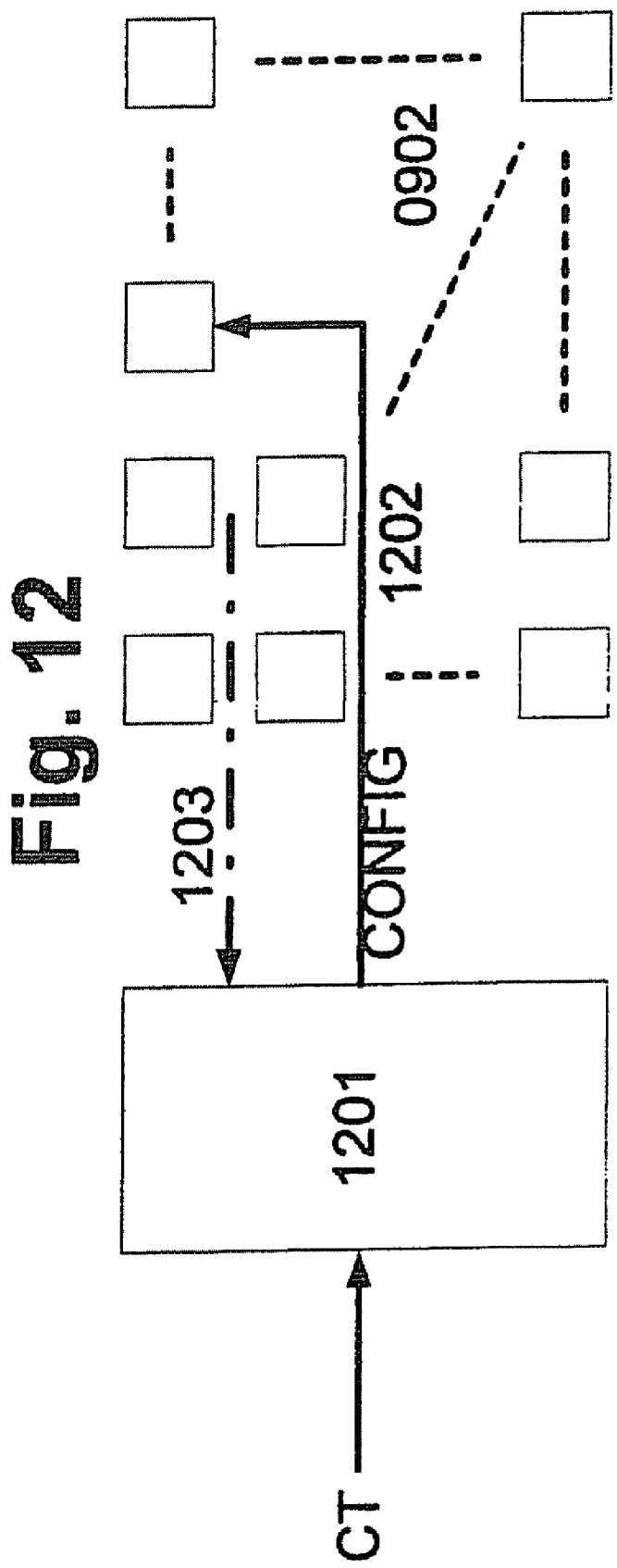

Fig. 13a 13b 13c 13d 13e

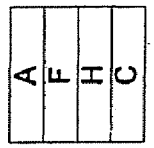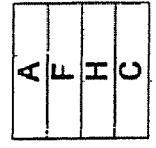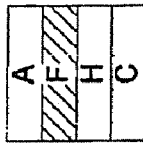
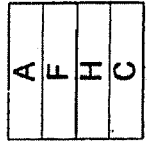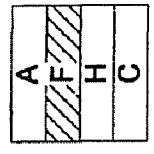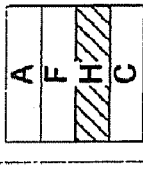
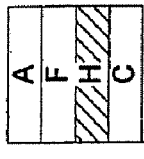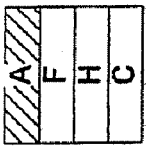
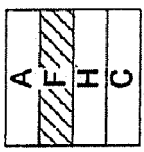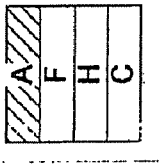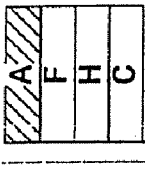
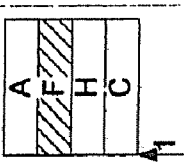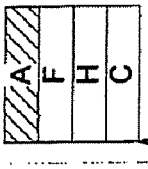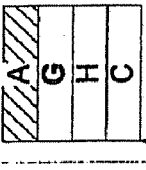
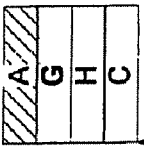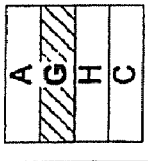
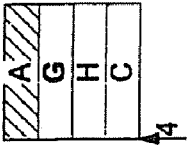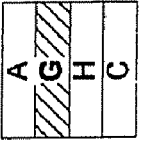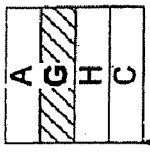
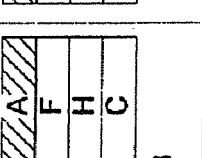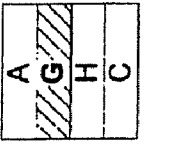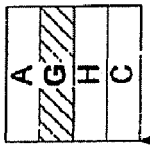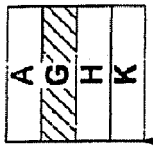
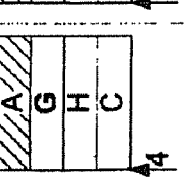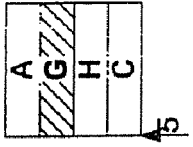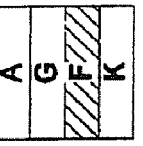
Fig. 13f, 13g, 13h, 13i, 13j

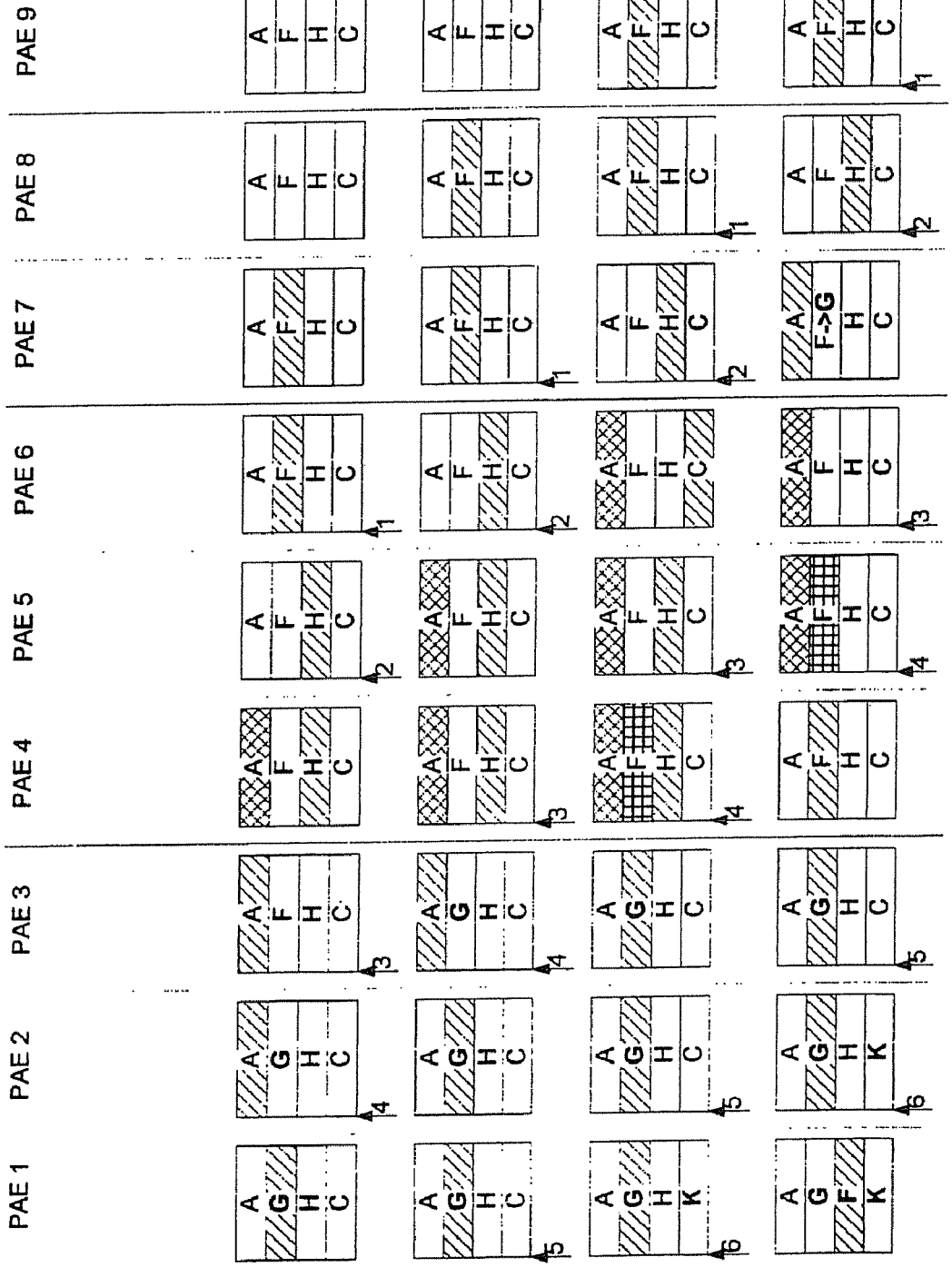

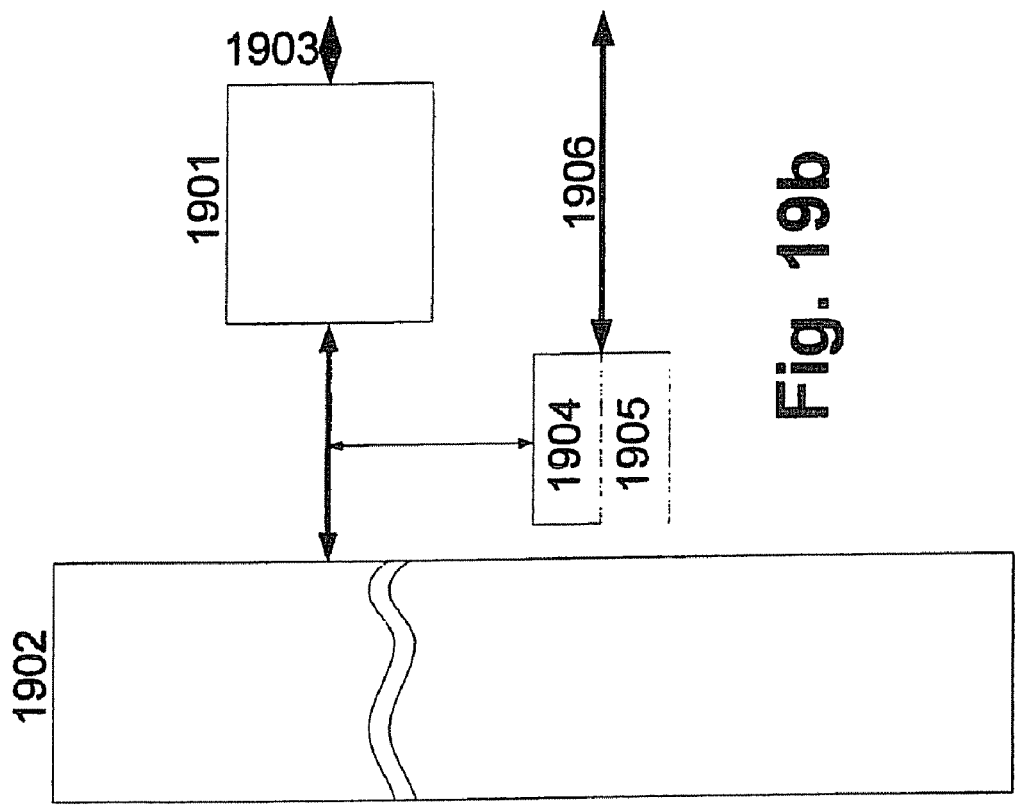
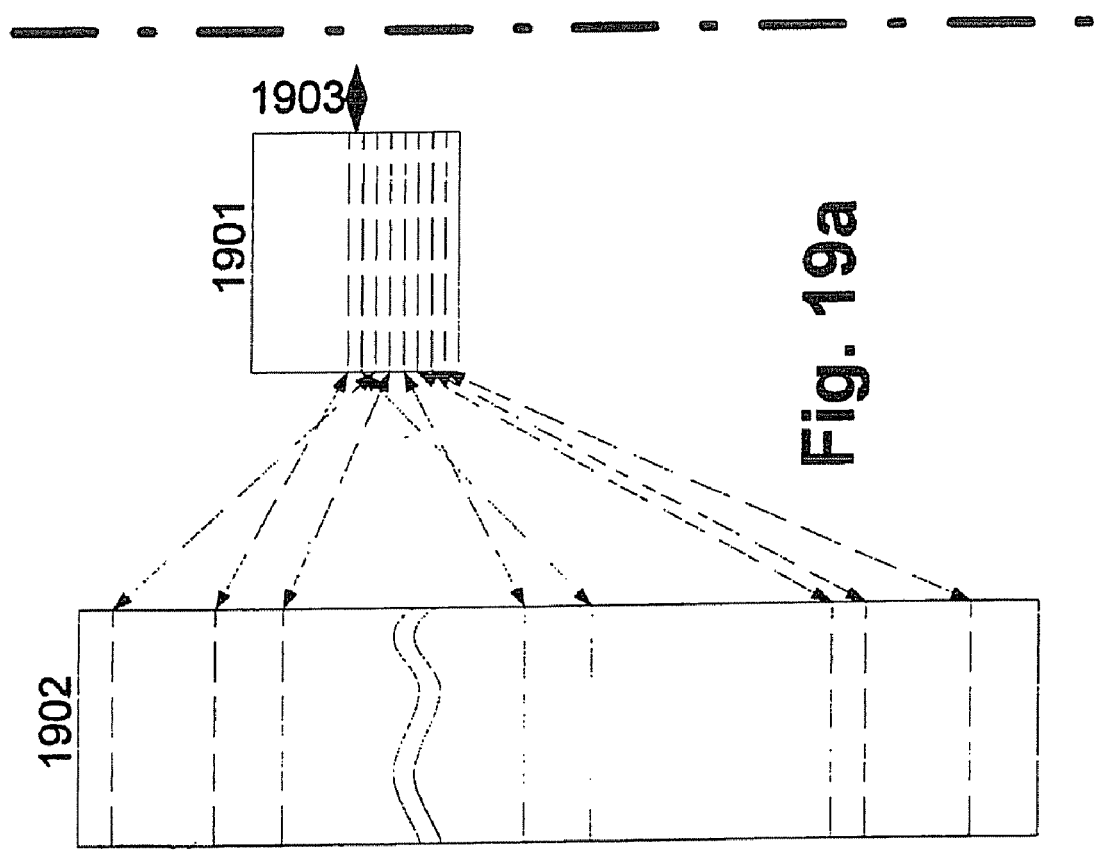

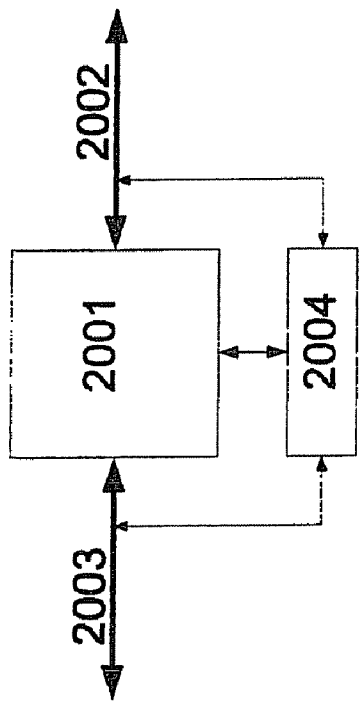
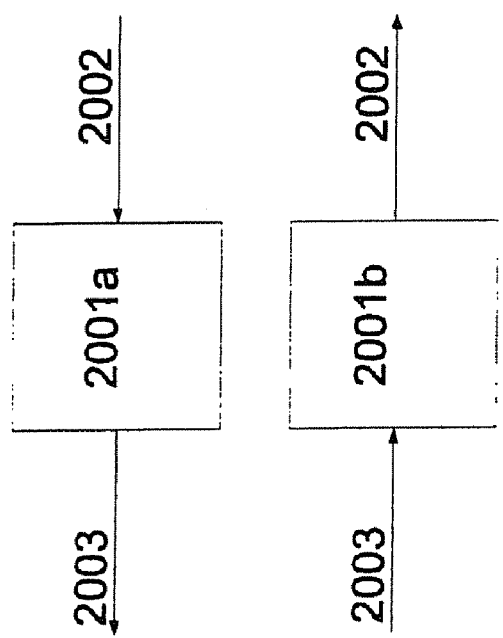

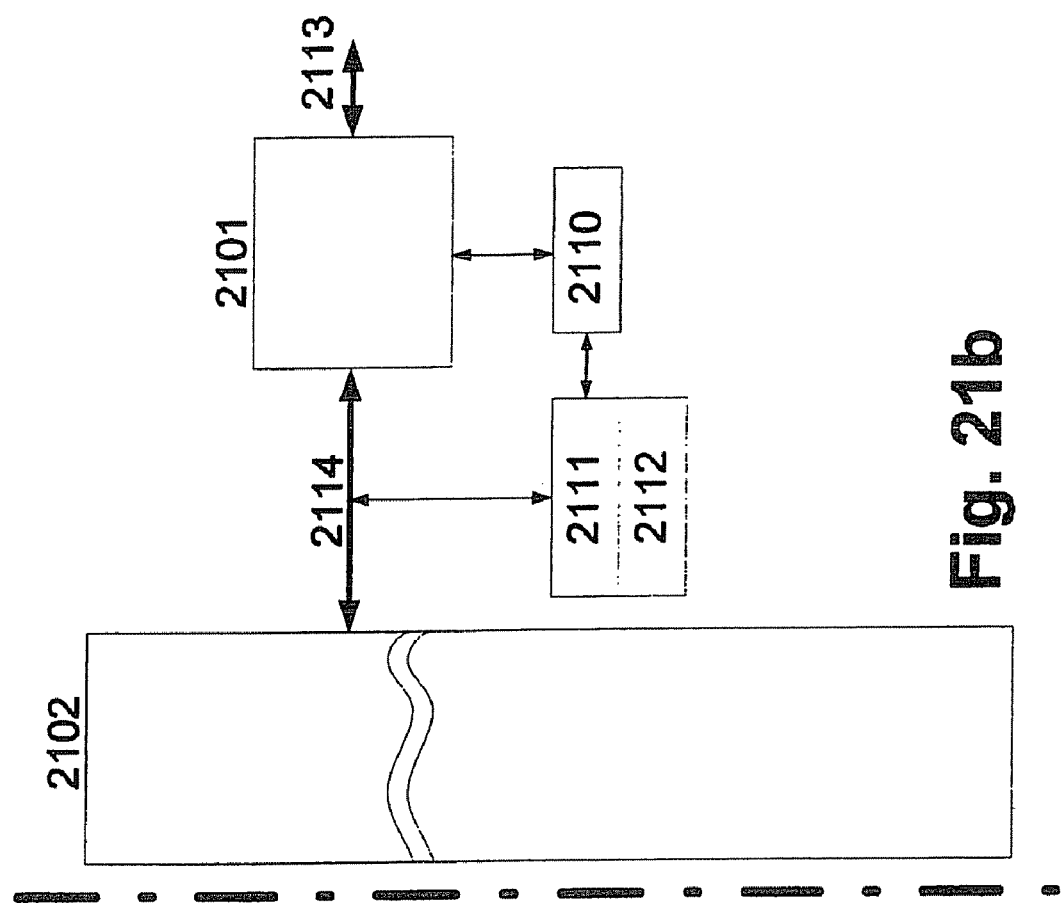
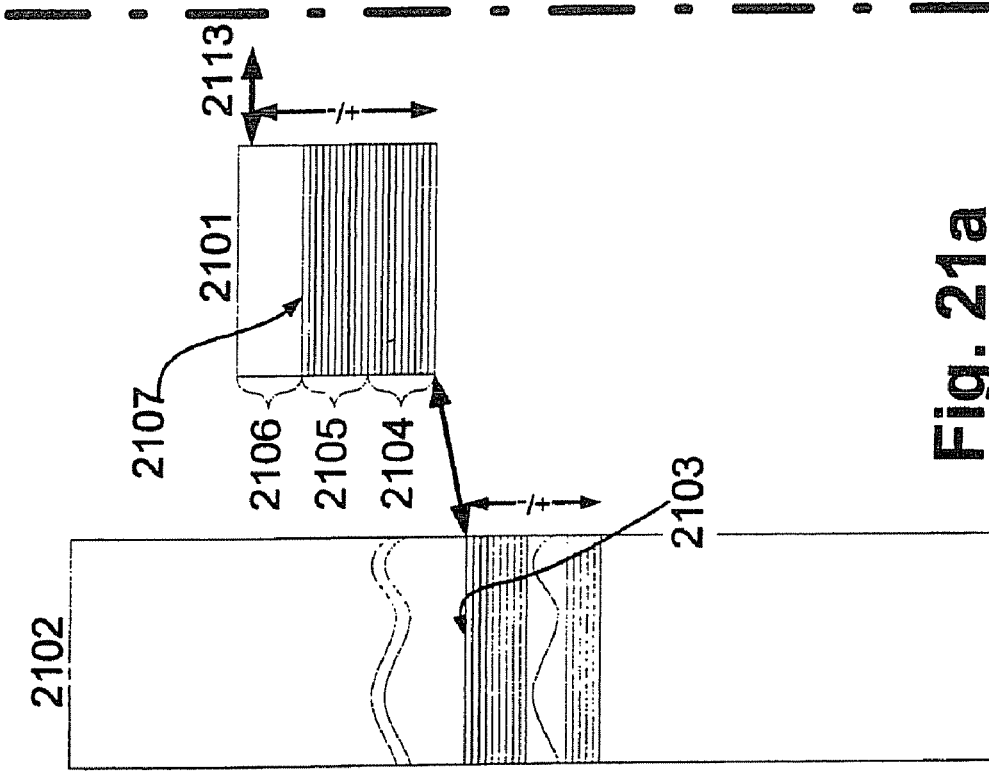
Fig. 21b
Fig. 21a

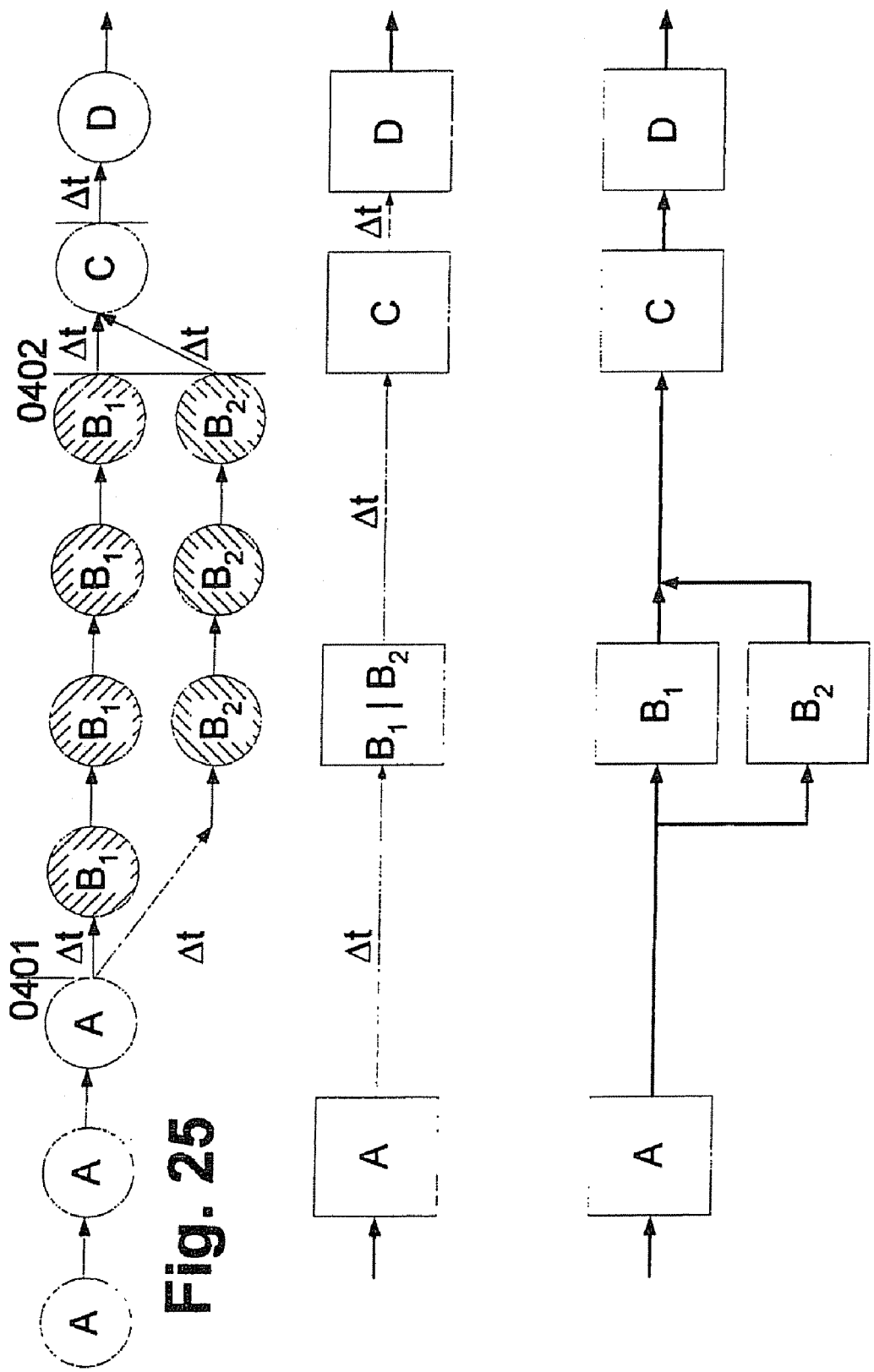

(2602)

(2602)

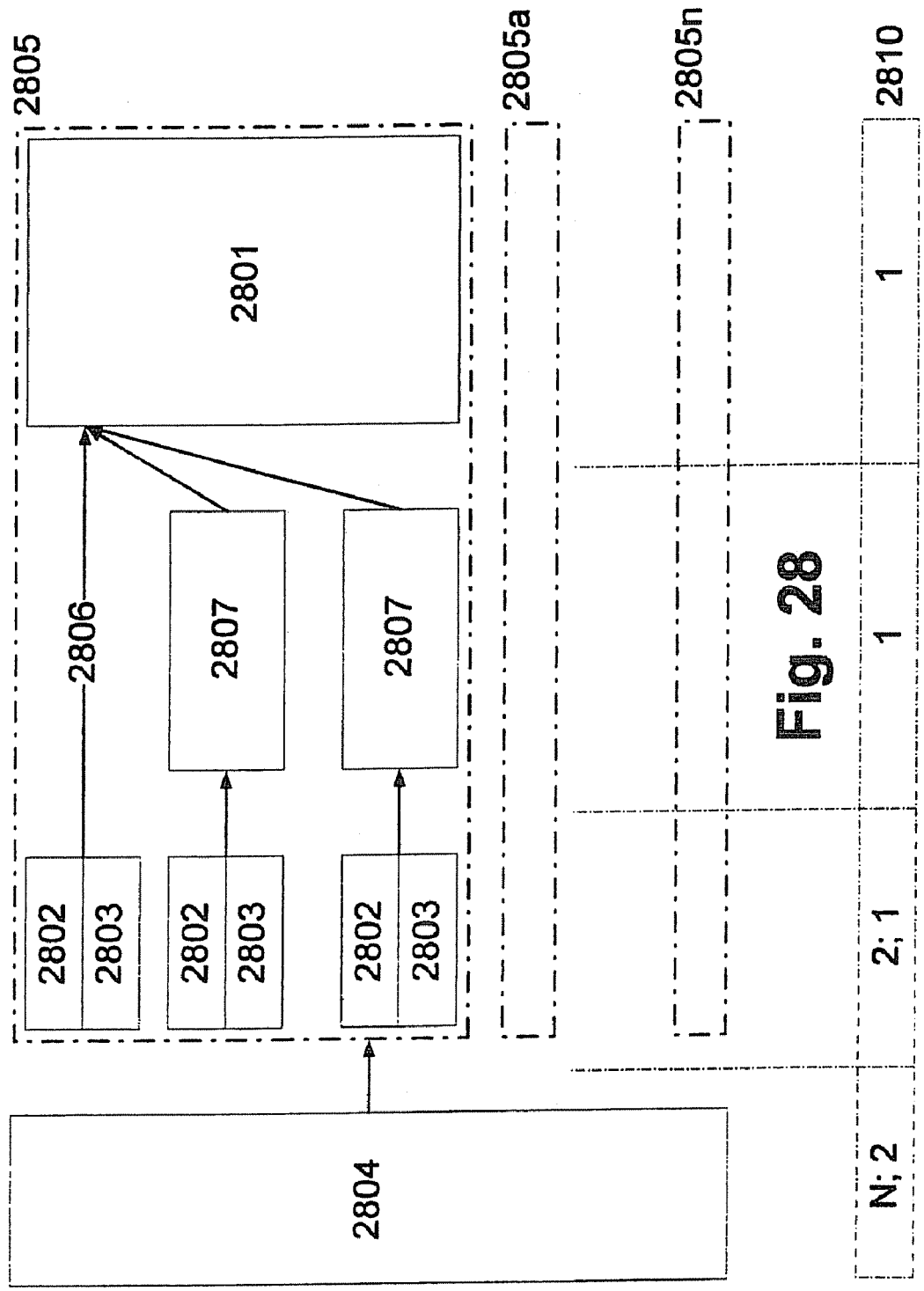

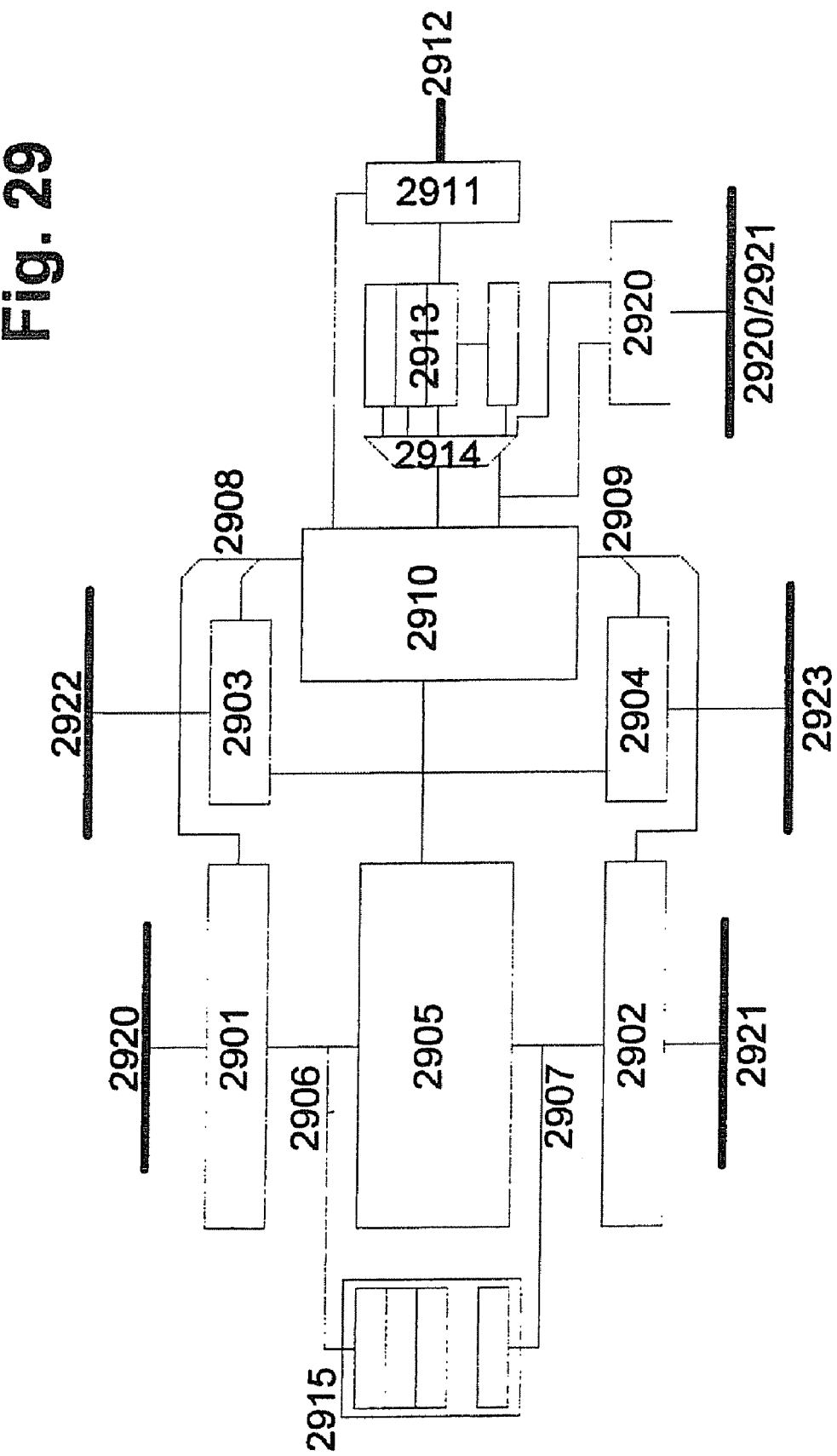

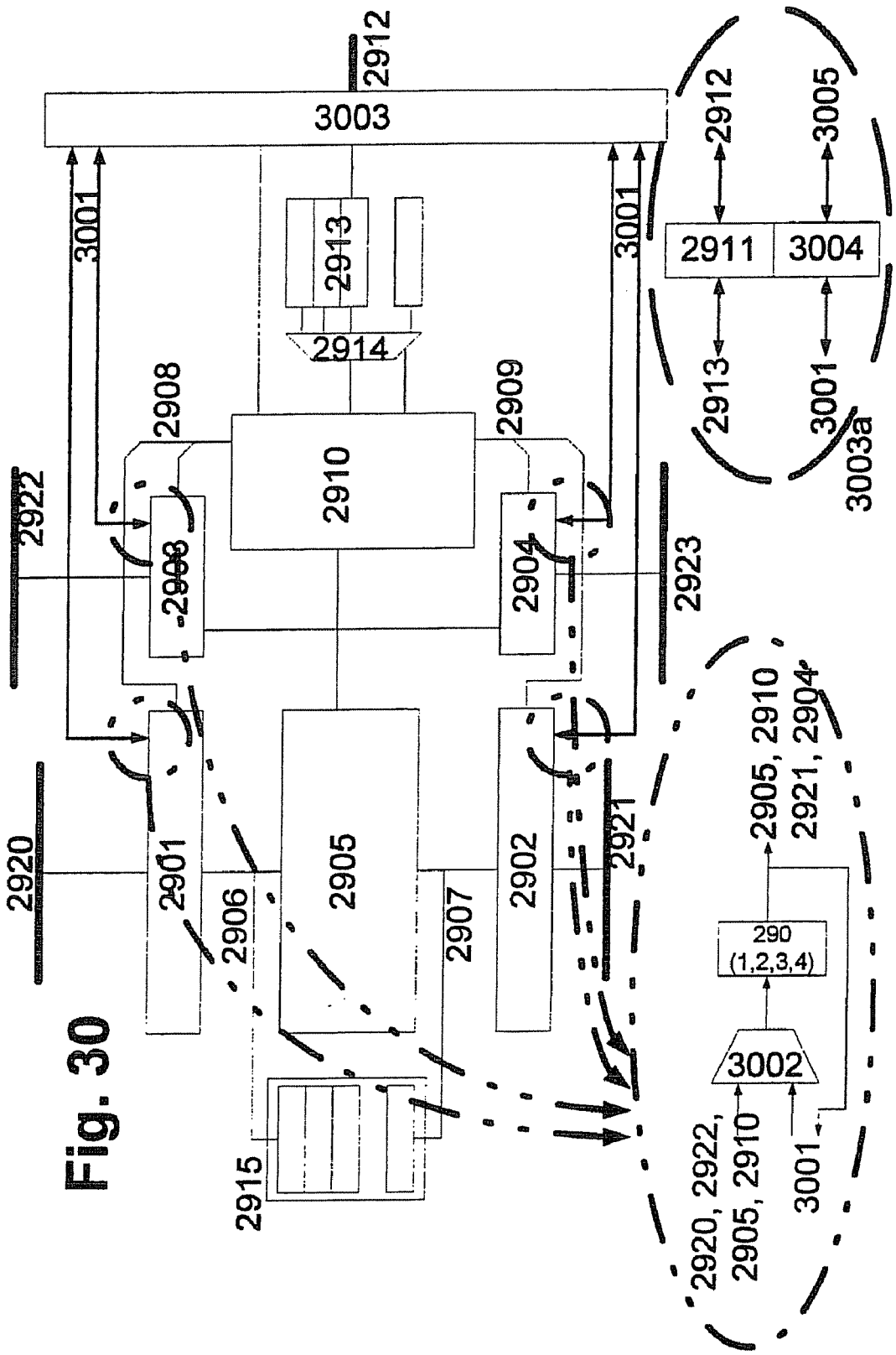

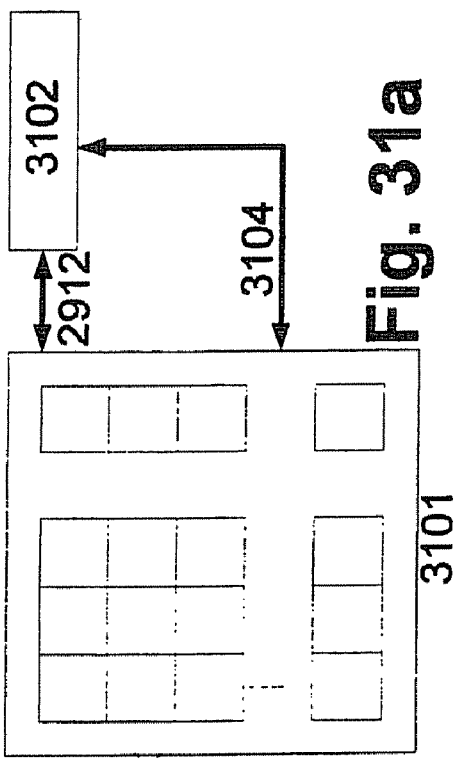
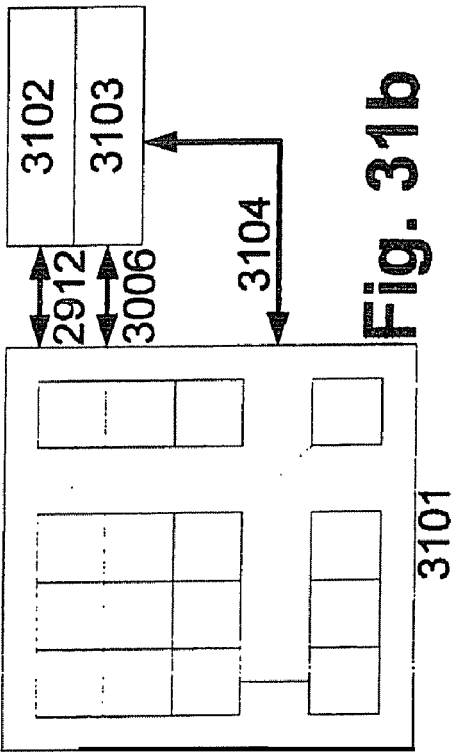
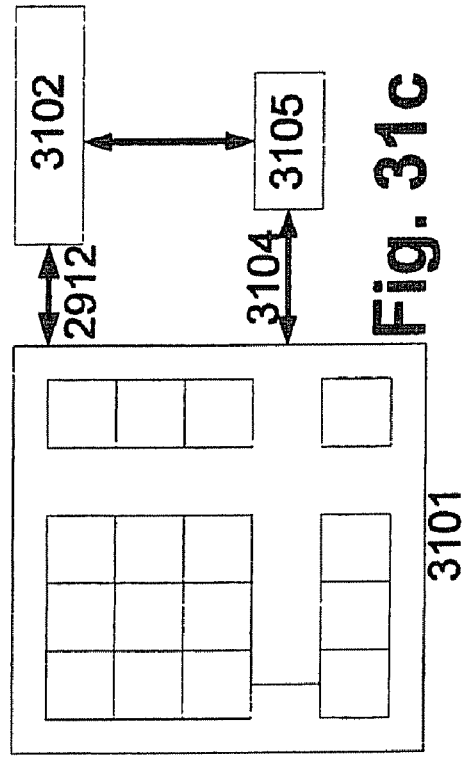
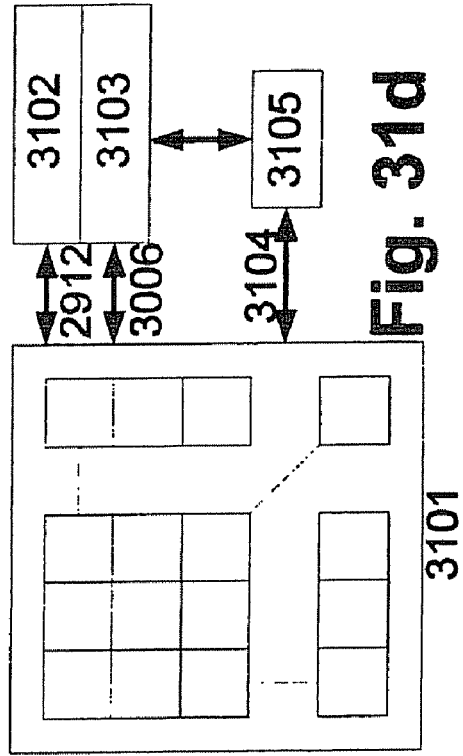

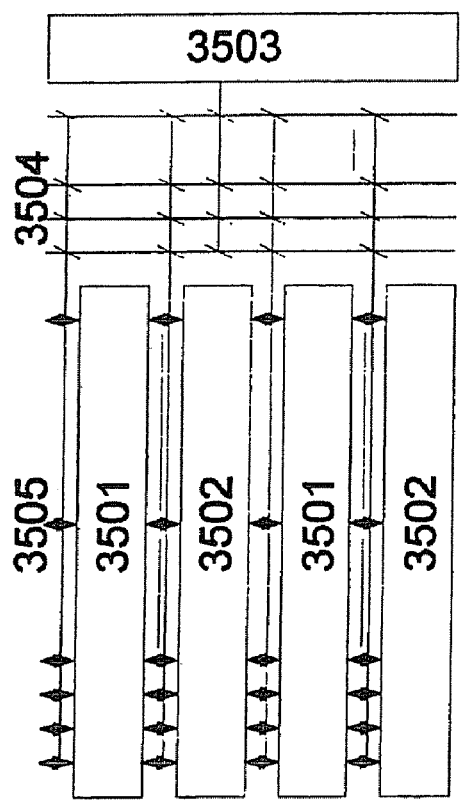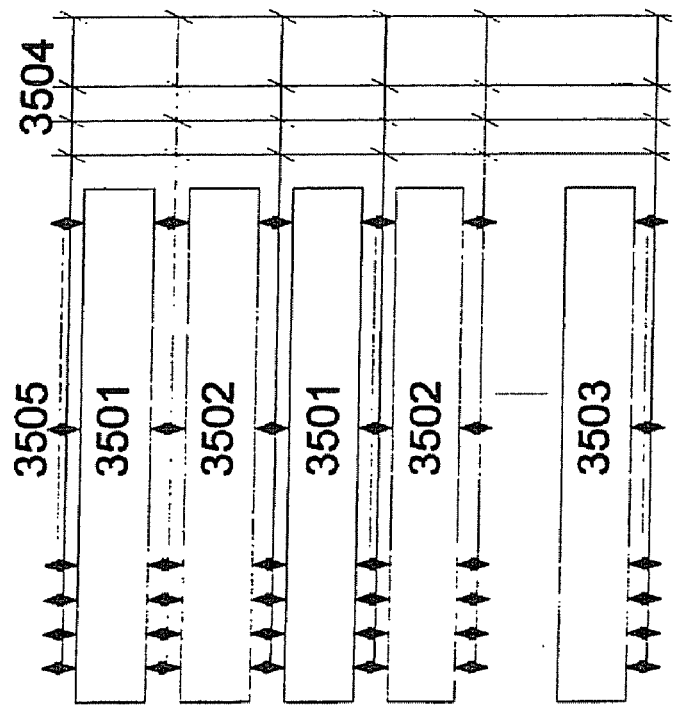
Fig. 35

PROCESSOR CHIP INCLUDING A PLURALITY OF CACHE ELEMENTS CONNECTED TO A PLURALITY OF PROCESSOR CORES

CROSS-REFERENCE TO RELATED APPLICATIONS

This application is a continuation of and claims priority to U.S. patent application Ser. No. 12/720,898, filed on Mar. 10, 2010, which is a continuation of and claims priority to U.S. patent application Ser. No. 10/009,649, filed on May 29, 2002 now U.S. Pat. No. 8,230,411, which is the national stage of International Application Serial No. PCT/DE00/01869, filed on Jun. 13, 2000, which claims benefit of and priority to German Patent Application Serial No. 199 26 538.0, filed on Jun. 10, 1999, the entire contents of each of which are expressly incorporated herein by reference.

AREA OF APPLICATION

The present invention may be applied to programmable arithmetic and/or logic hardware modules (VPUs) which can be reprogrammed during operation. For example, the present invention may be applied to VPUS having a plurality of arithmetic and/or logic units whose interconnection can also be programmed and reprogrammed during operation. Such logical hardware modules are available from several manufacturers under the generic name of FPGA (Field-Programmable Gate Arrays). Furthermore, several patents have been published, which describe special arithmetic hardware modules having automatic data synchronization and improved arithmetic data processing.

All the above-described hardware modules may have a two-dimensional or multidimensional arrangement of logical and/or arithmetic units (Processing Array Elements—PAEs) which can be interconnected via bus systems.

The above described hardware modules may either have the units listed below or these units may be programmed or added (including externally):
1. at least one unit (CT) for loading configuration data;
2. PAEs;
3. at least one interface (IOAG) for one or more memory(ies) and/or peripheral device(s).

An object of the present invention is to provide a programming method which allows the above-described hardware modules to be efficiently programmed with conventional high-level programming languages, making automatic, full, and efficient use of the parallelism of the above-described hardware modules obtained by the plurality of units to the maximum possible degree.

BACKGROUND INFORMATION

Hardware modules of the type mentioned above may be programmed using popular data flow languages. This can create two basic problems:
1. A programmer must become accustomed to programming in data flow languages; multilevel sequential tasks can generally be described only in a complex manner;
2. Large applications and sequential descriptions can be mapped to the desired target technology (synthesized) with the existing translation programs (synthesis tools) only to a certain extent.

In general, applications are partitioned into multiple subapplications, which are then synthesized to the target technology individually (FIG. 1). Each of the individual binary codes is then loaded onto one hardware module. A method described in German Patent 44 16 881, filed on Feb. 8, 1997, makes it possible to use a plurality of partitioned subapplications within a single hardware module by analyzing the time dependence, sequentially requesting the required subapplications from a higher-level load unit via control signals, whereupon the load unit loads the subapplications onto the hardware module.

Existing synthesis tools are capable of mapping program loops onto hardware modules only to a certain extent (FIG. 2 (0201)). FOR loops (0202) are often supported only as primitive loops by fully rolling out the loop onto the resources of the target module, in FIG. 2.

Contrary to FOR loops, WHILE loops (0203) have no constant abort value. Instead, a WHITE loop is evaluated using a condition, whenever interrupt takes place. Therefore, normally (when the condition is not constant), at the time of the synthesis, it is not known when the loop is aborted. Due to their dynamic behavior, these synthesis tools cannot map these loops onto the hardware, e.g., transfer them to a target module, in a fixed manner.

Using conventional synthesis tools, recursions basically cannot be mapped onto hardware if the recursion depth is not known at the time of the synthesis. Mapping may be possible if the recursion depth is known, e.g., constant. When recursion is used, new resources are allocated with each new recursion level. This would mean that new hardware has to be made available with each recursion level, which, however, is dynamically impossible.

Even simple basic structures can be mapped only by synthesis tools when the target module is sufficiently large to offer sufficient resources.

Simple time dependencies (0301) are not partitioned into multiple subapplications by conventional synthesis tools and can therefore be transferred onto a target module as a whole.

Conditional executions (0302) and loops over conditions (0303) can also only be mapped if sufficient resources exist on the target module.

BRIEF DESCRIPTION OF THE DRAWINGS

FIG. 4 illustrates the achievement of time independence in the partitioning of a larger example program, according to an example embodiment of the present invention.

FIG. 5 illustrates the execution of a model graph, according to an example embodiment of the present invention.

FIG. 6 illustrates the partitioning of a graph containing loops, according to an example embodiment of the present invention.

FIG. 9 illustrates the inclusion of a set of configuration registers with a PAE, and memory access by a group of PAEs.

FIG. 10 illustrates three approaches to having the multiplexer select a register, according to example embodiment of the present invention.

FIG. 11 illustrates approaches to selecting a register with a sequencer, according to an example embodiment of the present invention.

FIG. 12 illustrates an additional or alternative procedure for creating sequencers within VPUs, according to an example embodiment of the present invention.

FIG. 13 shows the basic principle of wave reconfiguration (WRC), according to an example embodiment of the present invention.

FIG. 19 illustrates a memory in the "register/cache" mode, according to an example embodiment of the present invention.

FIG. 20 illustrates the use of a memory in the FIFO mode, according to an example embodiment of the present invention.

FIG. 21 illustrates the operation of example memories in stack mode, according to an example embodiment of the present invention.

FIG. 25 illustrates the scalability of the VPU technology, according to an example embodiment of the present invention.

FIG. 28 illustrates an example structure of complex programs.

FIG. 29 illustrates an example basic structure of a PAE, according to an example embodiment of the present invention.

FIG. 30 illustrates an extension of the PAE in order to allow the CT or another connected microprocessor to access the data registers, according to an example embodiment of the present invention.

FIG. 31 illustrates the connection of the array of PAEs to a higher-level micro controller, according to an example embodiment of the present invention.

FIG. 35 illustrates possible designs of a unit for gating individual signals, according to an example embodiment of the present invention.

DETAILED DESCRIPTION OF AN EXAMPLE EMBODIMENT

Figure 1:
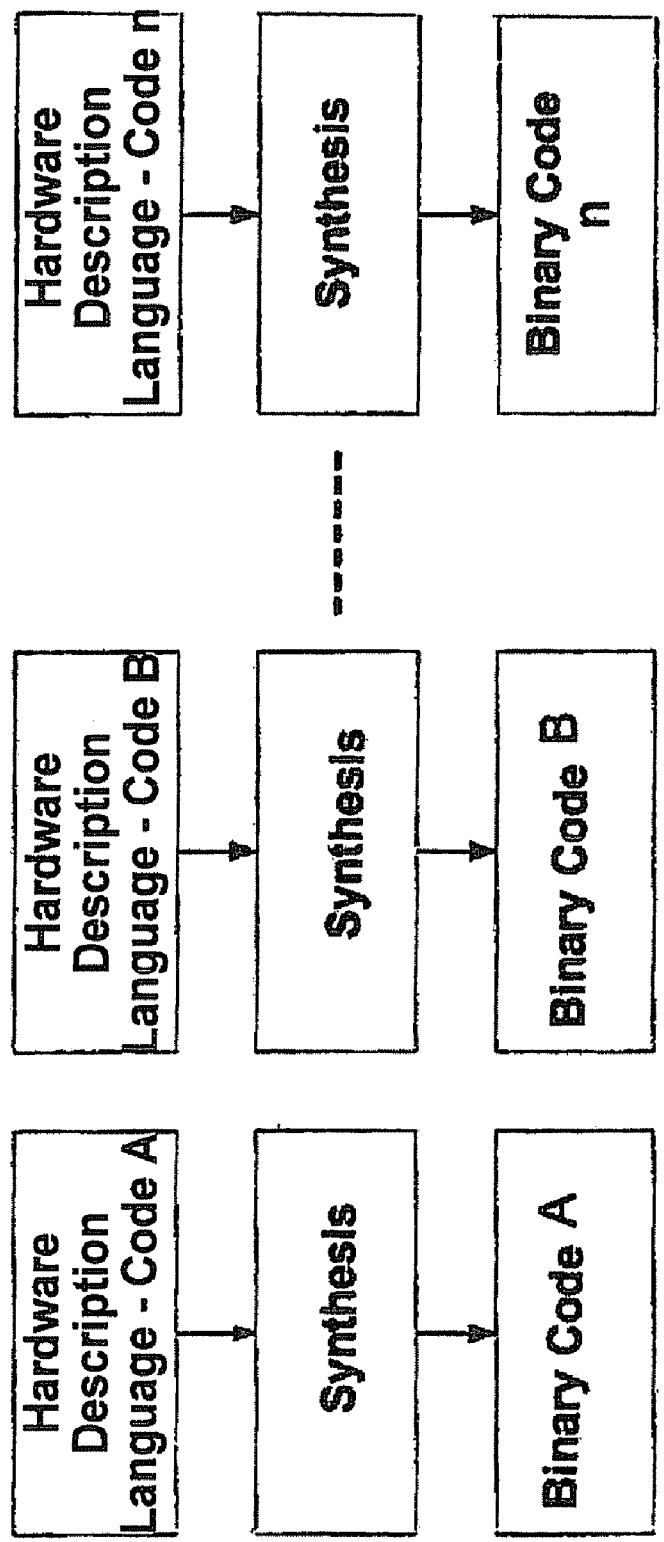
FIG. 1 illustrates the partitioning of applications into multiple subapplications, which are then synthesized to the target technology individually.
Figure 2:
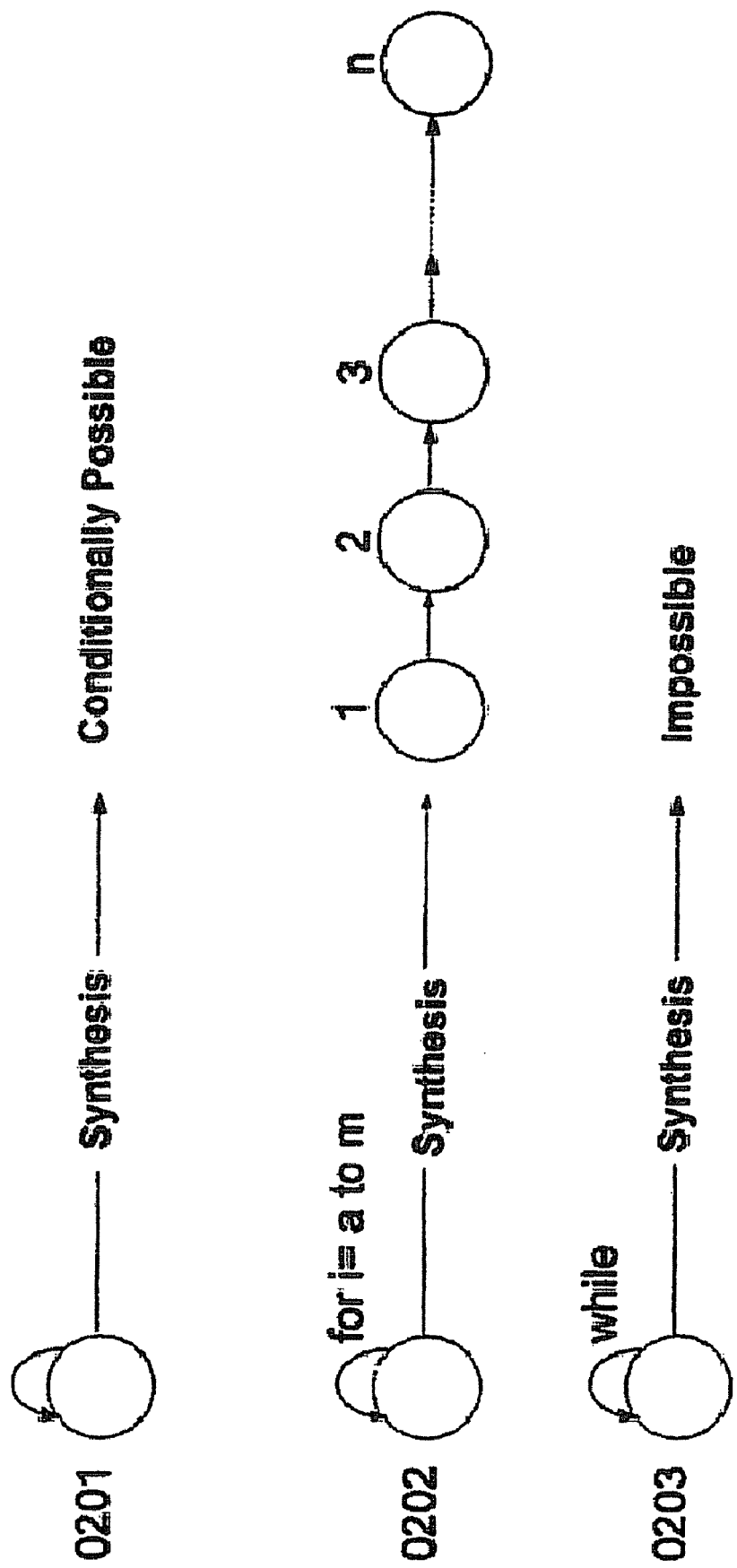
FIG. 2 illustrates mapping program loops onto hardware modules.
Figure 3:
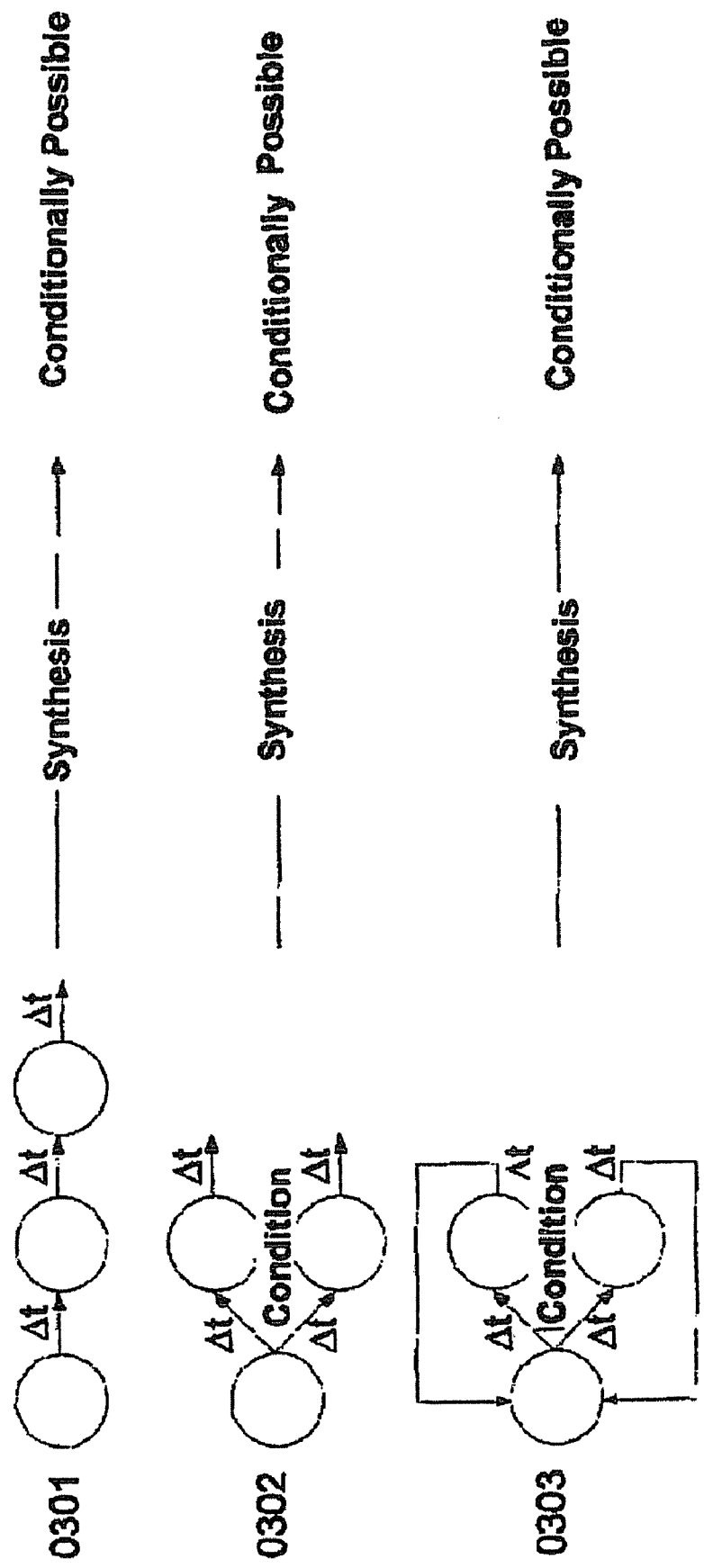
FIG. 3 illustrates the partitioning of simple time dependencies.

The method described in German Patent 44 16 881 allows conditions to be recognized within the hardware structures of the above-mentioned modules at runtime and makes it possible to dynamically respond to such conditions so that the function of the hardware is modified according to the condition received, which is basically accomplished by configuring a new structure.

The method according to the present invention may include the partitioning of graphs (applications) into time-independent subgraphs (subapplications).

The term "time independence" is defined so that the data which are transmitted between two subapplications are separated by a memory of any design (including a simple register). This is possible, in particular, at the points of a graph where there is a clear interface with a limited and minimum amount of signals between the two subgraphs.

Furthermore, points in the graph having the following features may be particularly suitable when, for example:
1. There are few signals or variables between the nodes;
2. A small amount of data is transmitted via the signals or variables;
3. There is no feedback, e.g., no signals or variables are transmitted in the direction opposite to the others.

In the case of large graphs, time independence may be achieved by introducing specific, clearly defined interfaces that are as simple as possible to store data in a buffer (see $S_1$, $S_2$ and $S_3$ in FIG. 4).

Loops often have a strong time independence with respect to the rest of the algorithm, since they may work over a long period on a limited number of variables that are (mostly) local in the loop and may require a transfer of operands or of the result only when entering or leaving the loop.

With time independence, after a subapplication has been completely executed, the subsequent subapplication can be loaded without any further dependencies or influences occurring. When the data is stored in the above-named memory, a status signal trigger, as described in German Patent Application No. 197 04 782.9, filed on Feb. 8, 1997, can be generated, which may request the higher-level load unit to load the next subapplication. When simple registers are used as memories, the trigger may be generated when data is written into the register. When memories are used, in particular memories operating by the FIFO principle, triggers may be generated depending on multiple conditions. For example, the following conditions, individually or in combination, can generate a trigger:
Result memory full
Operand memory empty
No new operands
Any condition within the subapplication, generated, e.g., by
comparators (equal, greater, etc.)
counters (overrun)
adders (overrun)

In the following, a subapplication may also be referred to as a software module in order to improve understandability from the point of view of conventional programming. For the same reason, signals may also be called variables. These variables may differ from conventional variables in one important aspect: a status signal (Ready) which shows whether a given variable has a legal value may be assigned to each variable. If a signal has a legal (calculated) value, the status signal may be Ready; if the signal has no legal value (calculation not yet completed), the status signal may be Not_Ready. This principle is described in detail in German Patent Application No. 196 51 075.9.

In summary, the following functions may be assigned to the triggers:
1. Control of data processing as the status of individual processing array elements (PAEs);
2. Control of reconfiguration of PAEs (time sequence of the subapplications).

In particular, the abort criteria of loops (WHILE) and recursions, as well as conditional jumps in subapplications, may be implemented by triggers.

In case 1, the triggers are exchanged between PAEs; in case 2, the triggers are transmitted by the PAEs to the CT. The transition between case 1 and case 2 may depend on the number of subapplications running at the time in the matrix of PAEs. In other words, triggers may be to the subapplications currently being executed on the PAEs. If a subapplication is not configured, the triggers are sent to the CT. If this subapplication were also configured, the respective triggers would be sent directly to the respective PAEs.

This results in automatic scaling of the computing performance with increasing PAE size, e.g., with cascading of a plurality of PAE matrices. No more reconfiguration time is needed, but the triggers are sent directly to the PAEs which are now already configured.

Example Wave Reconfiguration

A plurality of software modules may be overlapped using appropriate hardware architecture (see FIGS. 10/11). A plurality of software modules may be pre-configured in the PAEs at the same time. Switching between configurations may be performed with minimum expenditure in time, so only one configuration is activated at one time for each PAE.

In a collection of PAEs into which a software module A and a module B are preconfigured, one part of this collection can be activated using a part of A and another part of this collection can be activated at the same time using a part of B. The separation of the two parts is given exactly by the PAE in which the switch-over state between A and B occurs. This means that, from a certain point in time B is activated in all PAEs for which A was activated for execution prior to this time, and in all other PAEs A is still activated after this time. With increasing time, B is activated in more and more PAEs.

Switch-over may take place on the basis of specific data, states which result from the computation of the data, or on the basis of any other events which are generated externally, e.g., by the CT.

As a result, after a data packet has been processed, switch-over to another configuration may take place. At the same time/alternatively, a signal (RECONFIG-TRIGGER) can be sent to the CT, which causes new configurations to be pre-loaded by the CT. Pre-loading can take place onto other PAEs, which are dependent on or independent of the current data processing.

By isolating the active configuration from the configurations which are now available for reconfiguration (see FIGS. 10/11), new configurations can be loaded even into PAEs that are currently operating (active), in particular also the PAE which generated the RECONFIG-TRIGGER. This allows a configuration to overlap with the data processing.

FIG. 13 shows the basic principle of wave reconfiguration (WRC). It is based on a row of PAEs (PAE1-PAE9), through which the data runs as through a pipeline. It will be appreciated that WRC is not limited to pipelines and the interconnection and grouping of PAEs may assume any desired form. The illustration was selected in order to show a simple example for easier understanding.

Figure 13A:
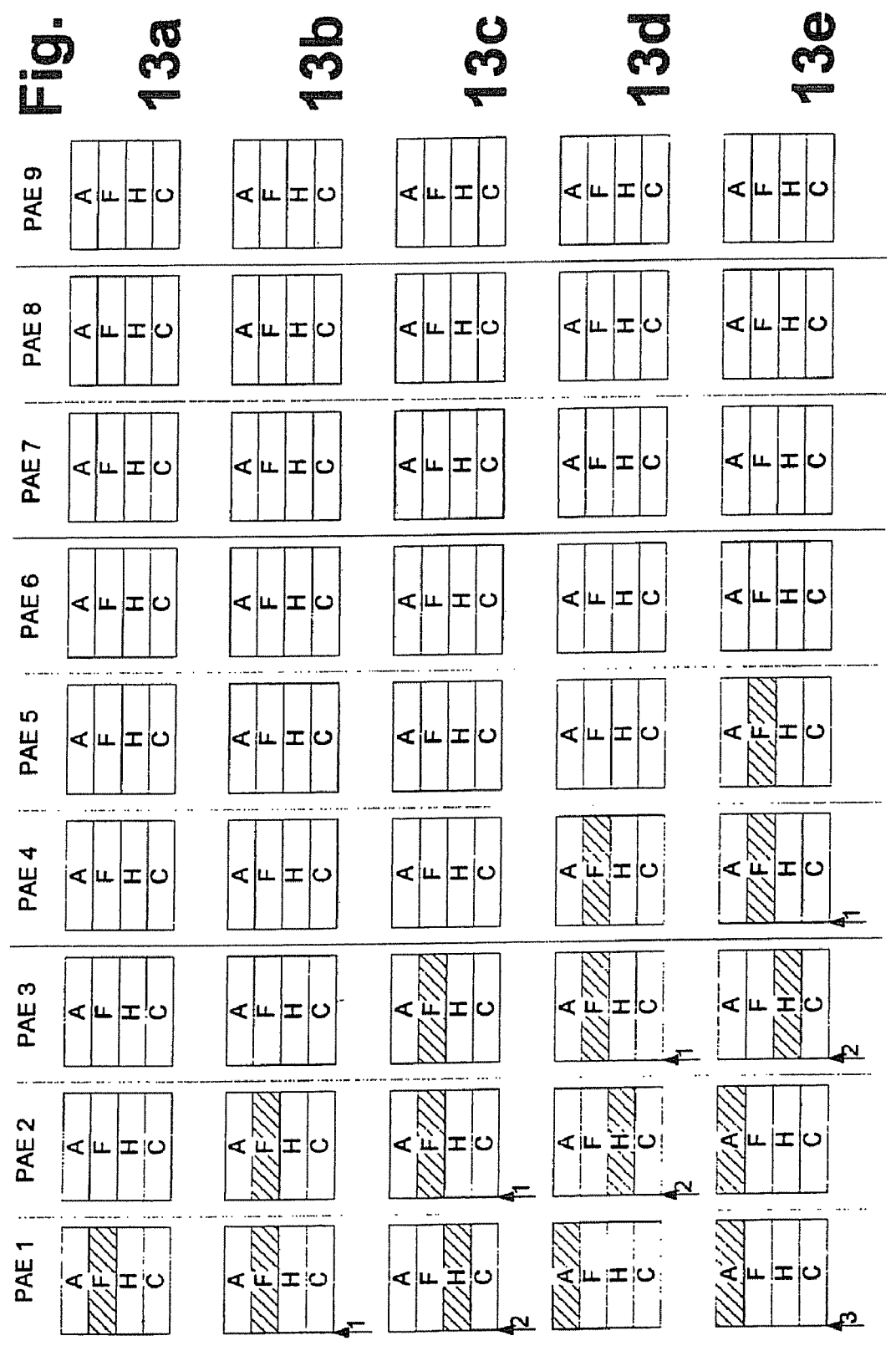

In FIG. 13*a*, a data packet runs in PAE1. The PAE has four possible configurations (A, F, H, C), which may be selected using appropriate hardware (see FIGS. 10/11). Configuration F is activated in PAE1 for the current data packet (shaded area).

In the next cycle, the data packet runs to PAE2 and a new data packet appears in PAE1. F is also active in PAE2. Together with the data packet, an event (↑1) appears in PAE1. The event may occur whenever the PAE receives any external event (e.g., a status flag or a trigger) or it is generated within the PAE by the computation performed.

In FIG. 13*c*, configuration H is activated in PAE1 because of the event (↑1); at the same time, a new event (↑2) appears, which causes configuration A to be activated in the following cycle (FIG. 13*d*).

In FIG. 13*e*, (↑3) is received at PAE1, which causes F to be overwritten by G (FIG. 13*f*). G is activated with the receipt of (↑4) (FIG. 13*g*). (↑5) causes K to be loaded instead of C (FIGS. 13*h*, i), and (↑6) loads and starts F instead of H (FIG. 13*j*).

FIGS. 13*g* to 13*j* show that when running a wave reconfiguration, not all PAEs need to operate according to the same pattern. The way a PAE is configured by a wave configuration depends mainly on its own configuration. It should be mentioned here that PAE4 to PAE6 are configured so that they respond to events differently from the other PAEs. For example, in FIG. 13*g*, H is activated instead of A in response to event ↑2 (see FIG. 13*g*). The same holds true for 13*h*. Instead of loading G in response to event ↑3 in FIG. 13*i*, configuration F remains preserved and A is activated. In FIG. 13*j*, it is shown for PAE7 that event ↑3 will again cause G to be loaded. In PAE4, event ↑4 causes F to be activated instead of configuration G (see FIG. 13*j*).

In FIG. 13, a wave of reconfigurations moves in response to events through a number of PAEs, which may have a two- or multidimensional design.

It is not absolutely necessary that a reconfiguration having taken place once take place throughout the entire flow. For example, reconfiguration with activation of A in response to event (↑2) could take place only locally in PAEs 1 to 3 and PAE7, while configuration H continues to remain activated in all the other PAEs.

In other words:
a) It is possible that an event only, occurs locally and therefore has only local reactivation as a result;
b) a global event may not have any effect on some PAEs, depending on the algorithm being executed.

In PAEs which continue to keep H activated even after (↑2), the receipt of event (↑3) may, of course, have a completely different effect, (I) such as activation of C instead of loading of G; (ii) also, (↑3) might not have any effect at all on these PAEs.

Example Processor Model

The example graphs shown in the following figures always have one software module as a graph node. It will be appreciated that a plurality of software modules may be mapped onto one target hardware module. This means that, although all software modules are time independent of one another, reconfiguration is performed and/or a data storage device is inserted only in those software modules which are marked with a vertical line and Δt. This point is referred to as reconfiguration time.

The reconfiguration time depends on certain data or the states resulting from the processing of certain data.

It will be appreciated that:
1. Large software modules can be partitioned at suitable points and broken down into small software modules which are time independent of one another, and fit into the PAE array in an optimum manner.
2. In the case of small software modules, which can be mapped together onto a target module, time independence is not needed. This saves configuration steps and speeds up data processing.
3. The reconfiguration times may be positioned according to the resources of the target modules. This makes it possible to scale the graph length in any desired manner.
4. Software modules may be configured with superimposition.
5. The reconfiguration of software modules may be controlled through the data itself or through the result of data processing.
6. The data generated by the software modules may be stored and the chronologically subsequent software modules read the data from this memory and in turn store the results in a memory or output the end result to the peripheral devices.

Example Use of Status Information in the Processor Model

Figure 8B:
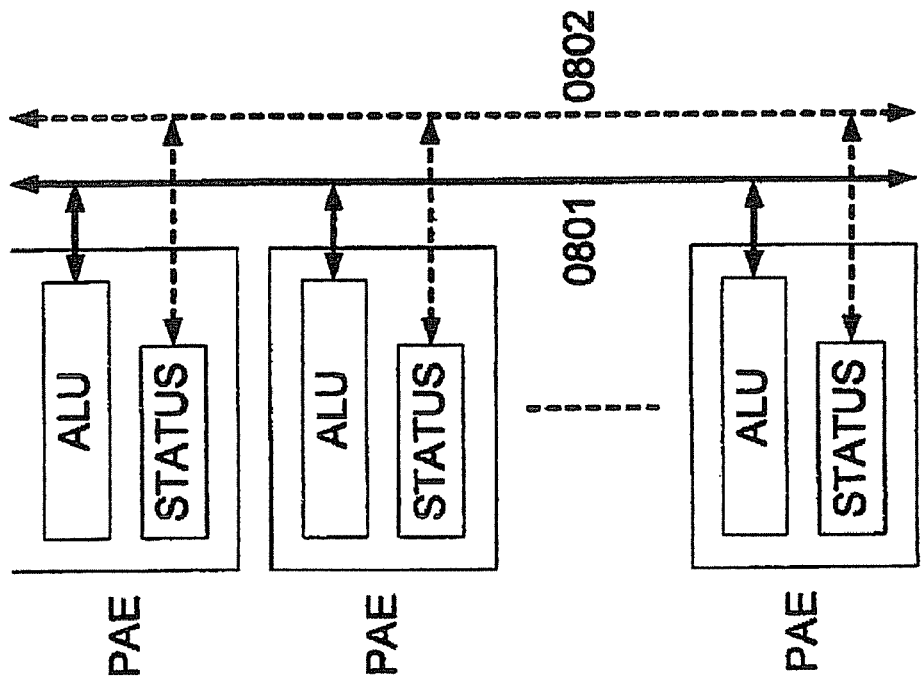
FIG. 8 illustrates determining the states within a graph by making the status registers of the individual cells (PAEs) available to other arithmetic units via a freely routable and segmentable status bus system.
Figure 8A:
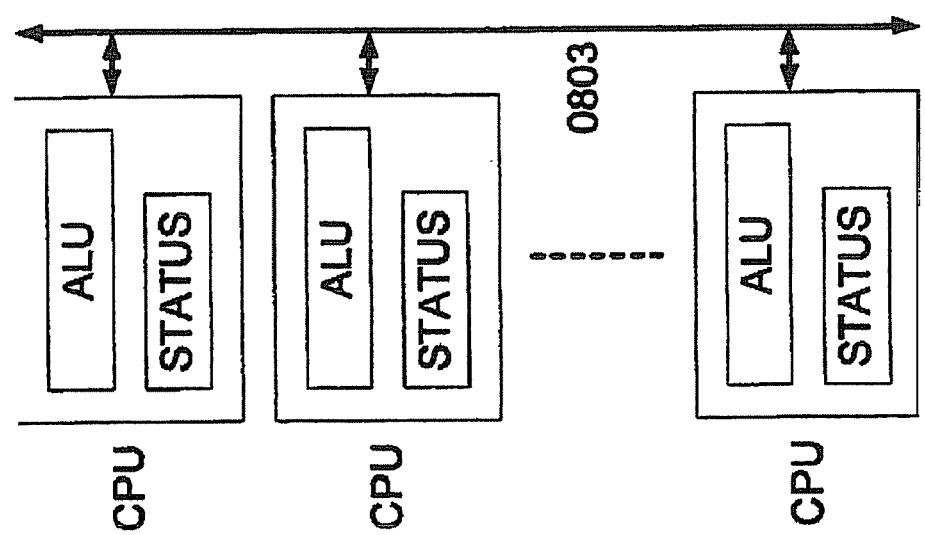

In order to determine the states within a graph, the status registers of the individual cells (PAEs) may be made available to all the other arithmetic units via a freely routable and segmentable status bus system (0802) which exists in addition to the data bus (0801) (FIG. 8*b*). This means that a cell (PAE X) may evaluate the status information of another cell (PAE Y) and process the data accordingly. In order to show the difference with respect to existing parallel computing systems, FIG. 8*a* shows a conventional multiprocessor system whose processors are connected to one another via a common data bus (0803). No explicit bus system exists for synchronized exchange of data and status.

The network of the status signals (0802) may represent a freely and specifically distributed status register of a single conventional processor (or of multiple processors of an SMP computer). The status of each individual ALU (e.g., each individual processor) and, in particular, each individual piece of status information may be available to the ALU or ALUs (processors) that need the information. There is no additional program runtime or communication runtime (except for the signal runtimes) for exchange of information between the ALUs (processors).

In conclusion, it should be noted that, depending on the task, both the data flow chart and the control flow chart may be treated according to the above-described method.

Example Virtual Machine Model

According to the previous sections, the principles of data processing using VPU hardware modules are mainly data flow oriented. However, in order to execute sequential programs with a reasonable performance, a sequential data processing model must be available for which the sequencers in the individual PAEs are often insufficient.

However, the architecture of VPUs basically allows sequencers of any desired complexity to be formed from individual PAEs. This means:
1. Complex sequencers which exactly correspond to the requirements of the algorithm may be configured;
2. Through appropriate configuration, the data flow may exactly represent the computing steps of the algorithm.

Thus, a virtual machine corresponding in particular to the sequential requirements of an algorithm may be implemented on VPUs.

An advantage of the VPU architecture is that an algorithm can be broken down by a compiler so that the data flow portions are extracted. The algorithm may be represented by an "optimum" data flow, in that an adjusted data flow is configured AND the sequential portions of the algorithm are represented by an "optimum" sequencer, by configuring an adjusted sequencer. A plurality of sequencers and data flows may be accommodated on one VPU at the same time.

As a result of the large number of PAEs, there may be a large number of local states within a VPU during operation. When changing tasks or calling a subprogram (interrupts), these states may need to be saved (see PUSH/POP for standard processors). This, however, may be difficult in practice due to the large number of states.

In order to reduce the states to a manageable number, a distinction must be made between two types of state:
1. Status information of the machine model (MACHINE-STATE). This status information is only valid within the execution of a specific software module and is also only used locally in the sequencers and data flow units of this specific software module. This means that these MACHINE STATEs represent the states occurring in the background within the hardware in conventional processors, are implicit in the commands and processing steps, and have no further information for subsequent commands after the execution of a command. Such states need not be saved. The condition for this is that interrupts should only be executed after the complete execution of all the currently active software modules. If interrupts for execution arise, no new software modules are loaded, but only those still active are executed; moreover, if allowed by the algorithm, no new operands are sent to the active software modules. Thus a software module becomes an indivisible, uninterruptible unit, comparable to an instruction of a conventional processor.
2. States of data processing (DATA-STATE). The data-related states must be saved and written into the memory when an interrupt occurs according to the conventional processor model. These are specific required registers and flags or, according to the terminology of VPU technology, triggers.

In the case of DATA-STATEs, handling can be further simplified depending on the algorithm. Two basic strategies are explained in detail below:
1. Concomitant Run of the Status Information All the relevant status infatuation that is needed at a later time may be transferred from one software module to the next as normally implemented in pipelines. The status information is then implicitly stored, together with the data, in a memory, so that the states are also available when the data is called. Therefore, no explicit handling of the status information takes place, in particular using PUSH and POP, which considerably speeds up processing depending on the algorithm, as well as results in simplified programming. The status information can be either stored with the respective data packet or, only in the event of an interrupt, saved and specifically marked.

2. Saving the Reentry Address

When large amounts of data stored in a memory are processed, it may be advantageous to pass the address of at least one of the operands of the data packet just processed together with the data packet through the PAEs. In this case the address is not modified, but is available when the data packet is written into a RAM as a pointer to the operand processed last.

This pointer can be either stored with the respective data packet or, only in the event of an interrupt, can be saved and specifically marked. In particular, if all pointers to the operands are computed using one address (or a group of addresses), it may be advantageous to save only one address (or a group of addressees).

Example "ULIW"-"UCISC" Model

The concept of VPU architecture may be extended. The virtual machine model may be used as a basis. The array of PAEs (PA) may be considered as an arithmetic unit with a configurable architecture. The CT(s) may represent a load unit (LOAD-UNIT) for opcodes. The IOAG(s) may take over the bus interface and/or the register set.

This arrangement allows two basic modes of operation which can be used mixed during operation:

1. A group of one or more PAEs may be configured to execute a complex command or command sequence and then the data associated with this command (which may be a single data word) is processed. Then this group is reconfigured to process the next command. The size and arrangement of the group may change. According to partitioning technologies described previously, it is the compiler's responsibility to create optimum groups to the greatest possible extent. Groups are "loaded" as commands onto the module by the CT; therefore, the method is comparable to the known VLIW, except that considerably more arithmetic units are managed AND the interconnection structure between the arithmetic units can also be covered by the instruction word (Ultra Large Instruction Word="ULIW"). This allows a very high Instruction Level Parallelism (ILP) to be achieved. (See also FIG. 27.) One instruction word corresponds here to one software module. A plurality of software modules can be processed simultaneously, as long as the dependence of the data allows this and sufficient resources are available on the module. As in the case of VLIW commands, usually the next instruction word is immediately loaded after the instruction word has been executed. In order to optimize the procedure in terms of time, the next instruction word can be pre-loaded even during execution (see FIG. 10). In the event of a plurality of possible next instruction words, more than one can be pre-loaded and the correct instruction word is selected prior to execution, e.g., by a trigger signal. (See FIG. 4*a* B1/B2, FIG. 15 ID C/ID K, FIG. 36 A/B/C.)

2. A group of PAEs (which can also be one PAE) may be configured to execute a frequently used command sequence. The data, which can also in this case be a single data word, is sent to the group as needed and received by the group. This group remains without being reconfigured for a one or more. This arrangement is comparable with a special arithmetic unit in a processor according to the related art (e.g., MMX), which is provided for special tasks and is only used as needed. With this method, special commands can be generated according to the CISC principle with the advantage that these commands can be configured to be application-specific (Ultra-CISC=UCISC).

Extension of the RDY/ACK Protocol

German Patent Application No. 196 51 075.9, filed on Dec. 9, 1996, describes a RDY/ACK standard protocol for synchronization procedures of German Patent 44 16 881 with respect to a typical data flow application. The disadvantage of the protocol is that only data can be transmitted and receipt acknowledged. Although the reverse case, with data being requested and transmission acknowledged (hereinafter referred to as REQ/ACK), can be implemented electrically with the same two-wire protocol, it is not detected semantically. This is particularly true when REQ/ACK and RDY/ACK are used in mixed operation.

Therefore, a clear distinction is made between the protocols:

RDY: data is available at the transmitter for the receiver;
REQ: data is requested by the receiver from the transmitter;
ACK: general acknowledgment for receipt or transmission completed It will be appreciated that a distinction could also be made between ACK for a RDY and an ACK for a REQ, but the semantics of the ACK is usually implicit in the protocols.

Example Memory Model

Memories (one or more) may be integrated in VPUs and addressed as in the case of a PAE. In the following, a memory model shall be described which represents at the same time an interface to external peripherals and/or external memories:

A memory within a VPU with PAE-like bus functions may represent various memory modes:

1. Standard memory (random access)
2. Cache (as an extension of the standard memory)
3. Lookup table
4. FIFO
5. LIFO (stack).

A controllable interface, which writes into or reads from memory areas either one word or one block at a time, may be associated with the memory.

The following usage options may result:

1. Isolation of data streams (FIFO)
2. Faster access to selected memory areas of an external memory, which represents a cache-like function (standard memory, lookup table)
3. Variable-depth stack (LIFO).

The interface can be used, but it is not absolutely necessary if, for example, the data is used only locally in the VPU and the free memory in an internal memory is sufficient.

Example Stack Model

A simple stack processor may be designed by using the REQ/ACK protocol and the internal memory in the LIFO mode. In this mode, temporary data is written by the PAEs to the stack and loaded from the stack as needed. The necessary compiler technologies are sufficiently known. The stack may be as large as needed due to the variable stack depth, which is achieved through a data exchange of the internal memory with an external memory.

Example Accumulator Model

Each PAE can represent an arithmetic unit according to the accumulator principle. As described in German Patent Application No. 196 51 075.9, the output register may be looped back to the input of the PAE. This yields structure which may operate like a related art accumulator. Simple accumulator processors can be designed in connection with the sequencer according to FIG. 11.

Example Register Model

A simple register processor can be designed by using the REQ/ACK protocol and the internal memory in the standard memory mode. The register addresses are generated by one group of PAEs, while another group of PAEs is responsible for processing the data.

Example Memory Architecture

The example memory has two interfaces: a first interface which connects the memory to the array, and a second one which connects the memory with an IO unit. In order to improve the access time, the memory may be designed as a dual-ported RAM, which allows read and write accesses to take place independently of one another.

The first interface may be a conventional PAE interface (PAEI), which may guarantee access to the bus system of the array and may ensure synchronization and trigger processing. Triggers can be used to display different states of the memory or to force actions in the memory, for example, 1. Empty/full: when used as a FIFO, the FIFO status "full," "almost full," "empty," or "almost empty" is displayed;
2. Stack overrun/underrun: when used as a stack, stack overrun and underrun may be signaled;
3. Cache hit/miss: in the cache mode, whether an address has been found in the cache may be displayed;
4. Cache flush: writing the cache into the external RAM is forced by a trigger.

A configurable state machine, which may control the different operating modes, may be associated with the PAE interface. A counter may be associated with the state machine. The counter may generate the addresses in FIFO and LIFO modes. The addresses are supplied to the memory via a multiplexer, so that additional addresses generated in the array may be supplied to the memory.

The second interface may be used to connect an IO unit (IOI). The IO unit may be designed as a configurable controller having an external interface. The controller may read or write data one word or one block at a time from and into the memory. The data is exchanged with the IO unit. The controller also supports different cache functions using an additional TAG memory.

IOI and PAEI may be synchronized with one another, so that no collision of the two interfaces can occur. Synchronization is different depending on the mode of operation; for example, while in standard memory or stack mode operation either the IOI or the PAEI may access the entire memory at any time, synchronization is row by row in the FIFO mode, e.g., while IOI accesses a row x, the PAEI can access any other row other than x at the same time.

The IO unit may be configured according to the peripheral requirements, for example:
1. SDRAM controller
2. RDRAM controller
3. DSP bus controller
4. PCI controller
5. serial controller (e.g., NGIO)
6. special purpose controller (SCSI, Ethernet, USB, etc.).

A VPU may have any desired memory elements having any desired IO units. Different IO units may be implemented in a single VPU.

Example Memory Modes of Operation

1. Standard Memory 1.1 Internal/Local

Data and addresses are exchanged with the memory via the PAEI. The addressable memory size is limited by the size of the memory.

1.2 External/Memory Mapped Window

Data and addresses may be exchanged with the memory via the PAEI. A base address in the external memory may be specified in the IOI controller. The controller may read data from the external memory address one block at a time and write it into the memory, the internal and external addresses being incremented (or decremented) with each read or write operation, until the entire internal memory has been transmitted or a predefined limit has been reached. The array works with the local data until the data is written again into the external memory by the controller. The write operation takes place similarly to the read operation described previously.

Read and write by the controller may be initiated
a) by a trigger or
b) by access of the array to an address that is not locally stored. If the array accesses such an address, initially the internal memory may written to the external one and then the memory block is reloaded with the desired address.

This mode of operation may be particularly relevant for the implementation of a register set for a register processor. In this case, the push/pop of the register set with the external memory can be implemented using a trigger for a change in task or a context switchover.

1.3 External/Lookup Table

The lookup table function is a simplification of the external/memory mapped window mode of operation. In this case, the data may be read once or a number of times via a CT call or a trigger from the external RAM into the internal RAM. The array reads data from the internal memory, but writes no data into the internal memory. The base address in the external memory is stored in the controller either by the CT or by the array and can be modified at runtime. Loading from the external memory is initiated either by the CT or by a trigger from the array and can also be done at runtime.

1.4 External/Cached

In this mode, the array optionally accesses the memory. The memory operates as a cache memory for the external memory according to the related art. The cache can be emptied (e.g., the cache can be fully written into the external memory) through a trigger from the array or through the CT.

2. FIFO

The FIFO mode is normally used when data streams are sent from the outside to the VPU. Then the FIFO is used to isolate the external data processing from the data processing within the VPU so that either the write operation to the FIFO takes place from the outside and the read operation is performed by the VPU or vice versa. The states of the FIFO are signaled by triggers to the array or, if needed, also to the outside. The FIFO itself is implemented according to the related art with different read and write pointers.

3. Stack/Internal

An internal stack may be formed by an address register. The register is (a) incremented or (b) decremented depending on the mode with each write access to the memory by the array. In contrast, in the case of read accesses from the array, the register is (a) decremented and (b) incremented. The address register makes the addresses available for each access. The stack may be limited by the size of the memory. Errors, such as overrun or underrun may be indicated by triggers.

4. Stack/External

If the internal memory is too small for forming a stack, it may be transferred into the external memory. For this purpose, an address counter for the external stack address may be available in the controller. If a certain amount of records is exceeded in the internal stack, records may be written onto the external stack one block at a time. The stack may be written outward from the end, e.g., from the oldest record, a number of the newest records not being written to the external memory, but remaining internal. The external address counter (ERC) may be modified one row at a time.

After space has been created in the internal stack, the remaining content of the stack may need to be moved to the beginning of the stack; the internal stack address may adjusted accordingly.

A more efficient version is configuring the stack as a ring memory as described in German Patent Application No. 196 54 846.2, filed on Dec. 27, 1996. An internal address counter may be modified by adding or removing stack entries. As soon as the internal address counter (IAC) exceeds the top end of the memory, it point to the lowermost address. If the IAC is less than the lowermost address, it may point to the uppermost address. An additional counter (FC) may indicate the full status of the memory, e.g., the counter may be incremented with each word written, and decremented with each word read. Using the FC, it may be ascertained when the memory is full or empty. This technology is known from FIFOs. Thus, if a block is written into the external memory, the adjustment of the FC is sufficient for updating the stack. An external address counter (EAC) may be configured to always points to the oldest record in the internal memory and is therefore at the end of the stack opposite the IAC. The EAC may be modified if (a) data is written to the external stack; then the EAC runs toward the IAC;
(b) data is read from the external stack; then The EAC moves away from the IAC.

It will be appreciated that it may be ensured by monitoring the FC that the IAC and the EAC do not collide.

The ERC may be modified according to the external stack operation, e.g., buildup or reduction.

Example MMU

An MMU can be associated with the external memory interface. The MMU may perform two functions:
1. Recompute the internal addresses to external addresses in order to support modern operating systems;
2. Monitor accesses to the external addresses, e.g., generate an error signal as a trigger if the external stack overruns or underruns.

Example Compiler

In an example embodiment according to the present invention, the VPU technology programming may include separating sequential codes and breaking them down into the largest possible number of small and independent subalgorithms, while the subalgorithms of the data flow code may be mapped directly onto the VPU.

Separation Between VPU Code and Standard Code

C++ is used in the following to represent all possible compilers (Pascal, Java, Fortran, etc.) within a related art language; a special extension (VC=VPU C), which contains the language constructs and types which can be mapped onto VPU technology particularly well, may be defined. VC may be used by programmers only within methods or functions that use no other constructs or types. These methods and functions can be mapped directly onto the VPU and run particularly efficiently. The compiler extracts the VC in the pre-processor and forwards it directly to the VC back-end processing (VCBP).

Extraction of the Parallelizable Compiler Code

In the following step, the compiler analyzes the remaining C++ codes and extracts the portions (MC=mappable C) which can be readily parallelized and mapped onto the VPU technology without the use of sequencers. Each individual MC may be placed into a virtual array and routed. Then, the space requirement and the expected performance are analysed. For this purpose, the VCBP may be called and the individual MCs may be partitioned together with the VCs, which are mapped in each case.

The MCs whose VPU implementations achieve the highest increase in performance are accepted and the others are forwarded to the next compiler stage as C++.

Example Optimizing Sequencer Generator

This compiler stage may be implemented in different ways depending on the architecture of the VPU system:
1. VPU without a Sequencer or External Processor
    All remaining C++ codes may be compiled for the external processor.
2. VPU Only with Sequencer
2.1. Sequencer in the PAEs
    All remaining C++ codes may be compiled for the sequencer of the PAEs.
2.2 Configurable Sequencer in the Array
    The remaining C++ code is analysed for each independent software module. The best-suited sequencer version is selected from a database and stored as VC code (SVC). This step is mostly iterative, e.g., a sequencer version may be selected, the code may be compiled, analysed, and compared to the compiled code of other sequencer versions. Finally, the object code (SVCO) of the C++ code may be generated for the selected SVC.
2.3 Both 2.1 and 2.2 are Used
    The mode of operation corresponds to that of 2.2. Special static sequencer models are available in the database for the sequencers in the PAEs.
3. VPU with Sequencer and External Processor
    This mode of operation also corresponds to 2.2. Special static sequencer models are available in the database for the external processor.

Example Linker

The linker connects the individual software modules (VC, MC, SVC, and SVCO) to form an executable program. For this purpose, the linker may use the VCBP in order to place and route the individual software modules and to determine the time partitioning. The linker may also add the communication structures between the individual software modules and, if needed, additional registers and memories. Structures for storing the internal states of the array and sequencers for the case of a reconfiguration may be added, e.g., on the basis of an analysis of the control structures and dependencies of the individual software modules.

Notes on the Processor Models

It will be appreciated that the machine models used may be combined within a VPU in any desired manner. It is also possible to switch from one model to another within an algorithm depending on which model is best.

If an additional memory is added to a register processor from which the operands are read and into which the results are written, a load/store processor may be created. A plurality of different memories may be assigned by treating the individual operands and the result separately.

These memories then may operate more or less as load/store units and represent a type of cache for the external memory. The addresses may be computed by the PAEs which are separate from the data processing.

Pointer Reordering

High-level languages such as C/C++ often use pointers, which are poorly handled by pipelines. If a pointer is not computed until immediately before a data structure at which it points is used, the pipeline often cannot be filled rapidly enough and the processing is inefficient, especially in the VPUs.

It may be useful not to use any pointers in programming VPUs; however, this may be impossible.

The problem may be solved by having the pointer structures re-sorted by the compiler so that the pointer addresses are computed as early as possible before they are used. At the same time, there should be as little direct dependence as possible between a pointer and the data at which it points.

Extensions of the PAEs

German Patents 196 51 075.9 and 196 54 846.2 describe possible configuration characteristics of cells (PAEs).

According to German Patent 196 51 075.9, a set of configuration registers (0904) containing a configuration may be associated with a PAE (0903) (FIG. 9*a*). According to German Patent 196 54 846.2, a group of PAEs (0902) may access a memory to store or read data (FIG. 9*b*).

These related patents may be extended, e.g., a) to provide a method to speed up the reconfiguration of PAEs and isolate it in time from the higher-level load unit, b) to design the method so that the possibility of simultaneously sequencing over more than one configuration is provided, and c) to simultaneously hold in one PAE a plurality of configurations, one of which is always activated, with rapid switching between different configurations.

Isolation of the Configuration Register

The configuration register may be isolated from the higher-level load unit (CT) (FIG. 10) by the use of a set configuration registers (1001). Precisely one of the configuration registers always selectively determines the function of the PAE. The active register is selected via a multiplexer (1002). The CT may freely write into each of the configuration registers as long as the configuration register does not determine the current configuration of the PAE, e.g., is not active. Writing onto the active register is possible using, for example, the method described in German Patent Application No. 198 07 782.2, filed on Feb. 25, 1998.

The configuration register to be selected by multiplexer 1002 may be determined by different sources:

1. Any status signal or a group of any status signals supplied via a bus system 0802 in FIG. 8 to multiplexer 1002 (FIG. 10*a*). The status signals may generated by any of the PAEs or made available through external links of the hardware module (see FIG. 8).

2. The status signal of the PAE which is configured by the configuration registers 1001 and multiplexer 1002 may be used for the selection (FIG. 10*b*).

3. A signal 1003 generated by the higher-level CT may used for the selection, as shown in FIG. 10*c*.

Optionally, the incoming signals 1003 may be stored for a certain period of time using a register and may be optionally called as needed.

By using a plurality of registers, the CT may be isolated in time. The CT may "pre-load" a plurality of configurations without a direct time-dependency existing.

The configuration of the PAE is delayed only until the CT has loaded the register if the selected/activated register in the register set 1001 has not yet been loaded. In order to determine whether a register has valid information, a "valid bit" 1004 which is set by the CT may be inserted in each register. If 0906 is not set in a selected register, the CT may be requested, via a signal, to configure the register as rapidly as possible.

The procedure described in FIG. 10 may be extended to a sequencer, as shown in FIG. 11. For this purpose, a sequencer having an instruction decoder 1101 may be used for triggering the selection signals of the multiplexer 1002. The sequencer determines, as a function of a currently selected configuration 1102 and an additional piece of status information 1103 the configuration to be selected next. The status information may be:

(a) the status of the status signal of the PAE which is configured by register set 1001 and 1002, as shown in FIG. 11*a*;

(b) any desired status signal supplied via bus system 0802, as shown in FIG. 11*b*; or (c) a combination of (a) and (b).

Register set 1001 may also be designed as a memory, with a command being addressed by instruction decoder 1101 instead of multiplexer 1002. Addressing here depends on the command itself and on a status register. In this respect, the structure corresponds to that of a "von Neumann" machine with the difference (a) of universal applicability, e.g., non-use of the sequencer (as in FIG. 10);

(b) that the status signal does not need to be generated by the arithmetic unit (PAE) associated with the sequencer, but may come from any other arithmetic unit (e.g., FIG. 11*b*).

It will be appreciated that it may be useful if the sequencer can execute jumps, in particular also conditional jumps within the register set 1001.

FIG. 12 illustrates an additional or alternative procedure for creating sequencers within VPUs. FIG. 12 shown the use of the internal data storage device 1201 or 0901 for storing the configuration information for a PAE or a group of PAEs. In this case, the data output of a memory is connected to a configuration input 1202 or data input of a PAE or a plurality of PAEs. The address 1203 for data storage device 1201 may be generated by the same PAE/PAEs or any one or more other PAE(s).

In this procedure, the sequencer is not fixedly implemented, but may be emulated by a PAE or a group of PAEs. The internal memories may reload programs from the external memories.

In order to store local data (e.g., for iterative computations and as a register for a sequencer), the PAE may be provided with an additional register set, whose individual registers are either determined by the configuration, connected to the ALU or written into by the ALU; or they be freely used by the command set of an implemented sequencer (register mode). One of the registers may also be used as an accumulator (accumulator mode). If the PAE is used as a full-featured machine, it may be advantageous to use one of the registers as an address counter for external data addresses.

In order to manage stacks and accumulators outside the PAE (e.g., in the memories according to the present invention), the previously described RDY/ACK REQ/ACK synchronization model is used.

Conventional PAEs, such as those described in German Patent Application No. 196 51 075.9, may be ill-suited for processing bit-wise operations, since the integrated ALU may not particularly support bit operations, e.g., it has a narrow design (1, 2, 4 bits wide). Efficient processing of individual bits or signals may be guaranteed by replacing the ALU core with an FPGA core (LC), which executes logical operations according to its configuration. The LC can be freely configured in its function and internal interconnections. Conventional LCs can be used. For certain operations it may be advantageous to assign a memory to the LC internally. The interface modules between FC and the bus system of the array are adjusted only slightly to the FC, but are basically preserved. However, in order to configure the time response of the FC in a more flexible manner, it may be useful if the registers in the interface modules are configured so that they can be turned off.

FIG. 4*a* illustrates some basic characteristics of an example method according to the present invention. The Type A software modules may be combined into a group and, at the end, have a conditional jump either to B1 or to B2. At position

0401, a reconfiguration point may be inserted. It may be useful to treat each branch of the conditional jump as a separate group (case 1). However, if both B branches (B1 and B2), together with A as well, suit the target module (case 2), it may be more convenient to insert only one reconfiguration point at position 0402, since this reduces the number of configurations and increases the processing speed. Both branches (B1 and B2) jump to C at position 0402.

The configuration of cells on the target module is illustrated schematically in FIG. 4b. The functions of the individual graph nodes may, be mapped onto the cells of the target module. Each line represents one configuration. The broken-line arrows at a new line indicate a reconfiguration. $S_n$ is a data storage cell of any desired design (register, memory, etc.). $S_nI$ is a memory which accepts data and $S_nO$ is a memory which outputs data. Memory $S_n$ is always the same for the same n; I ad O identify the direction of data transfer.

Both cases of conditional jump (case 1, case 2) are shown.

The model of FIG. 4 corresponds to a data flow model with several extensions. The model includes the reconfiguration point and the graph partitioning that is achieved thereby, the data transmitted between the partitions being buffered.

FIG. 5 illustrates the execution of a model graph. The model graph B includes the subgraphs $B_1$, $B_2$, and $B_3$. The model graph B may be called from a collection of graphs 0501. The collection of graphs 0501 may include any number and combination of graphs. After execution of B, the data is returned to the collection of graphs 0501.

If a sufficiently large sequencer (A) is implemented in 0501, a principle which is very similar to typical processors can be implemented with this model. In this case, the data may go to 1. sequencer A, which decodes it as commands and responds to it according to the "von Neumann" principle;
2. sequencer A, where it is treated as data and forwarded to a fixedly configured arithmetic unit C for computation.

Graph B selectively makes available a special arithmetic unit and/or special opcodes for certain functions and is alternatively used to speed up C. For example, B1 can be an optimized algorithm for performing matrix multiplications, while B2 represents a FIR filter, and B3 a pattern recognition. The appropriate, e.g., corresponding graph B is called according to an opcode which is decoded by the collection 0501.

FIG. 5b schematically shows the mapping onto the individual cells. The cell may perform pipeline-type arithmetic unit, as illustrated in 0502.

While larger memories may be introduced at the reconfiguration points of FIG. 4 for temporary storage of data, simple synchronization of data is sufficient at the reconfiguration points of FIG. 5, since the data stream preferably runs as a whole through graph B, and graph B is not partitioned further; therefore, temporary storage of data is superfluous.

FIG. 6a shows different loops. Loops may be basically h handled in three different ways:

1. Hardware approach: Loops may be mapped onto the target hardware completely rolled out (0601a/b). As explained previously, this may be possible only for a few types of loops;
2. Data flow approach: Loops may be formed over a plurality of cells within the data flow (0602a/b). The end of the loop may be looped back to the beginning of the loop.
3. Sequencer approach: A sequencer having a minimum command set may execute the loop (0603a/b). The cells of the target modules may be configured so that they contain the corresponding sequencers (see FIG. 11a/b).

The execution of the loops may sometimes be optimized by breaking them down in a suitable manner:

1. Using conventional optimizing methods, often the body of the loop, e.g., the part to be executed repeatedly, can be optimized by removing certain operations from the loop and placing them before or after the loop (0604a/b). Thus, the number of commands to be sequenced is substantially reduced. The removed operations are only executed once before or after the execution of the loop.
2. Another optimization option is dividing the loops into a plurality or smaller or shorter loops. This division is performed so that a plurality of parallel or sequential (0605a/b) loops are obtained.

Figure 7:
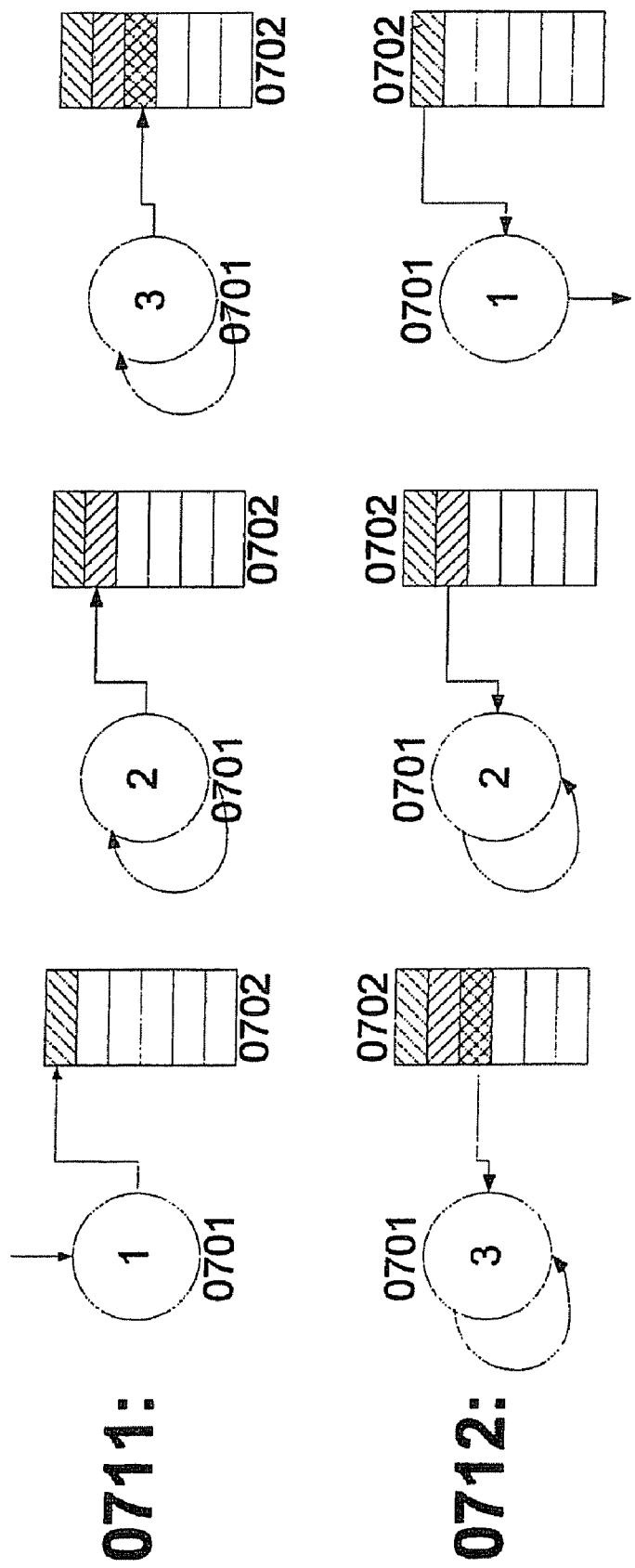
FIG. 7 illustrates the implementation of a recursion, according to an example embodiment of the present invention.

FIG. 7 illustrates the implementation of a recursion. The same resources 0701 may be used in the form of cells for each recursion level. Several revision levels are shown (1-3). The results of each recursion level (1-3) may be written into a stack-type memory 0702 as it is being built up (0711:). The stack is torn down simultaneously with the tear-down (0712:) of the levels.

Figure 14:
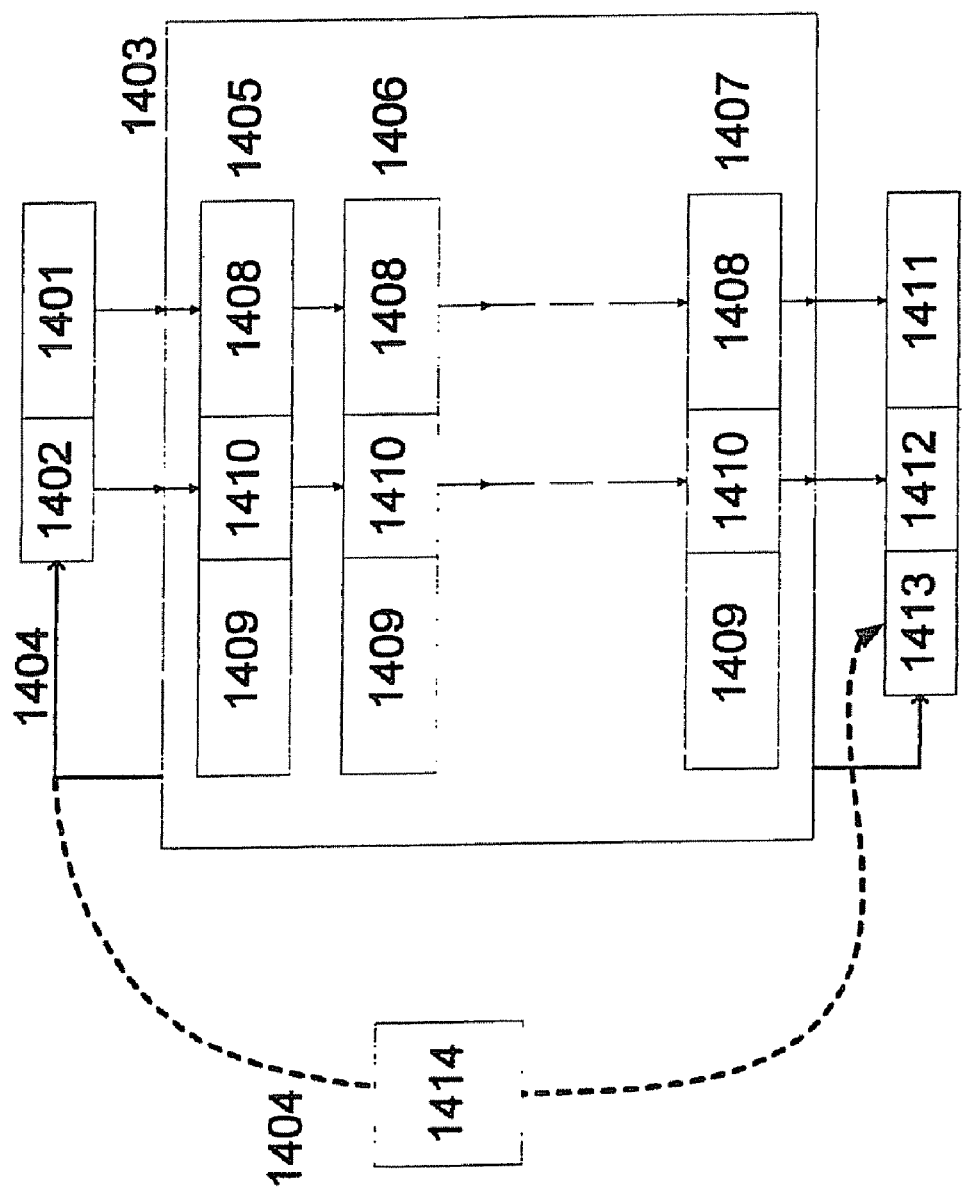
FIG. 14 illustrates a virtual machine model, according to an example embodiment of the present invention.

FIG. 14 illustrates a virtual machine model. Data 1401 and states 1402 associated with the data may be read into a VPU 1403 from an external memory. Data 1401 and states 1402 may be selected via an address 1404 generated by the VPU. PAEs may be combined to form different groups within the VPU (group 1405, group 1406, group 1407). Each group may have a data processing part 1408, which may have local implicit states (1409), which have no effect on the surrounding groups. Therefore the states of the data processing part are not forwarded outside the group. However, it may depend on the external states. Another part 1410 generates states which have an effect on the surrounding groups.

The data and states of the results may be stored in memories (1411 and memory 1412). At the same time, the address of operands 1404 may be stored as a pointer 1413. Address 1404 may pass through registers 1414 for time synchronization.

FIG. 14 shows a simple model for the sake of clarity. The interconnection and grouping may be considerably more complex than they are in this model. States and data may also be transmitted to software modules other than those mentioned below. Data is transmitted to different software modules than the states. Both data and states of a certain software modules may be received by a plurality of different software modules. 1408, 1409, and 1410 may be present within a group. Depending on the algorithm, individual parts may also not be present (e.g., 1410 and 1409 present, but not 1410).

Figure 15:
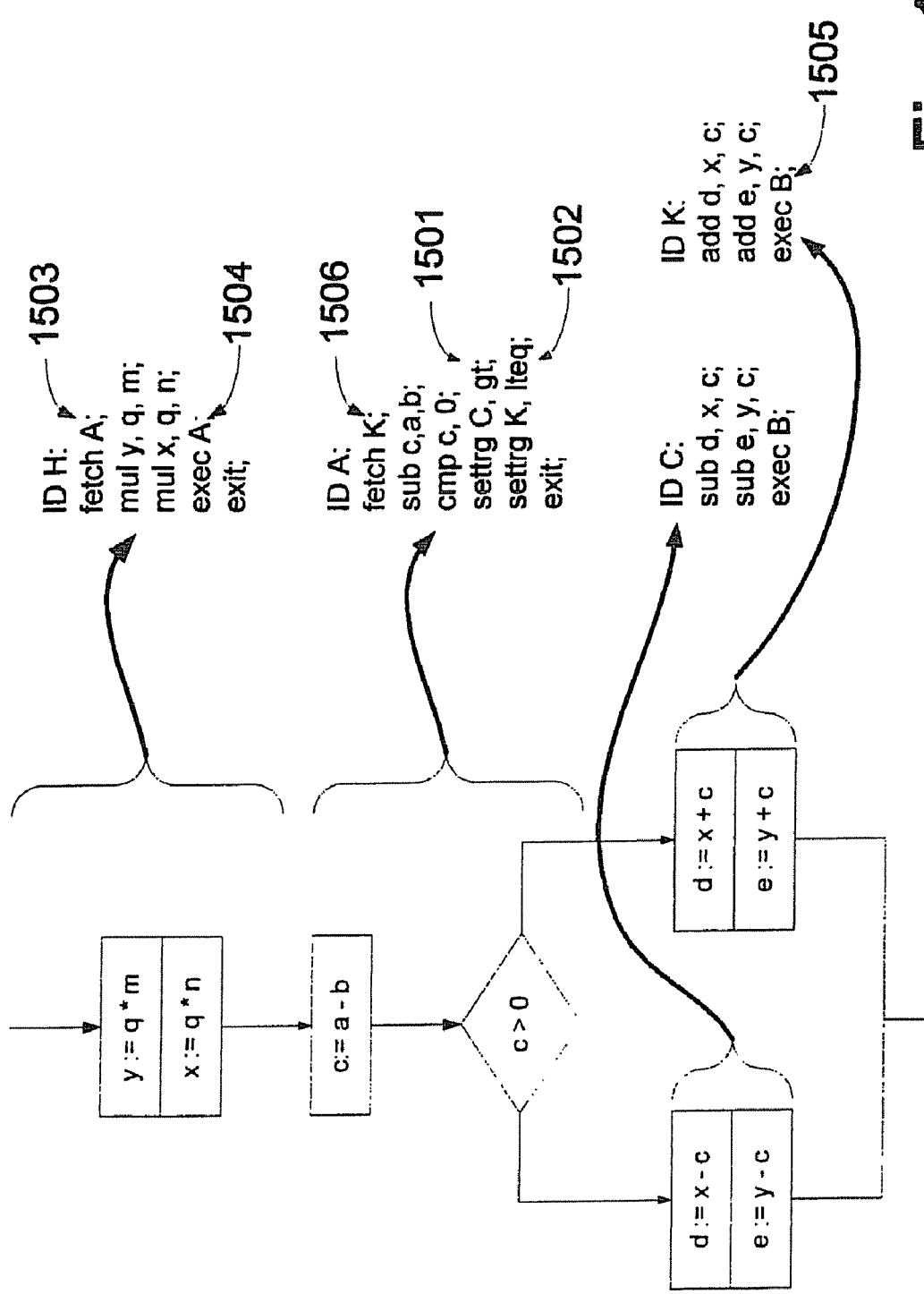
FIG. 15 illustrates the extraction of sub applications from a processing graph, according to an example embodiment of the present invention.

FIG. 15 illustrates how subapplications may be extracted from a processing graph. The graph may be broken down so that long graphs are subdivided into smaller parts as appropriate and mapped in subapplications (H, A, C, K). After jumps, new subgraphs may be formed (C, K), with a separate subgraph being formed for each jump.

In the ULIW model, each subgraph may be loaded separately by the CT, see German Patent Application No. 198 07 782.2. Subgraphs may be managed by the mechanisms of German Patent Application No. 198 07 782.2. These may include intelligent configuring, execute/start, and deletion of subapplications.

At point 1503 a fetch instruction may cause subapplication A to be loaded or configured, while subapplication K is being executed. Thus, a) subapplication A may be already configured in the PAEs at the time subapplication K is completely executed if the PAEs have more than one configuration register;

b) subapplication A may be already loaded into the CT at the time subapplication K is completely executed if the PAEs only have one configuration register.

1504 starts the execution of subapplication K.

This means that, at runtime the next required program parts may be loaded independently while the current program parts are running. This may yield a much more efficient handling of the program codes than the usual cache mechanisms.

Another particular feature of subapplications A is shown. In principle, both possible branches (C, K) of the comparison could be preconfigured. Assuming that the number of free configuration registers available is insufficient for this, the more probable of the two branches is configured (1506). This also saves configuration time. When the non-configured branch is executed, the program execution may be interrupted (since the configuration is not yet loaded into the configuration registers) until the branch is configured.

In principle, unconfigured subapplications may also be executed (1505); in this case they may need to be loaded prior to execution as described previously.

A FETCH command may be initiated by a trigger via its own ID. This allows subapplications to be pre-loaded depending on the status of the array.

The ULIW model differs from the VLIW model in that it also includes data routing. The ULIW model also forms larger instruction words.

The above-described partitioning procedure may also be used by compilers for existing standard processors according to the RISC/CISC principle. If a unit described in German Patent Application No. 198 07 782.2 is used for controlling the command cache, it can be substantially optimized and sped up.

For this purpose, "normal" programs may be partitioned into subapplications in an appropriate manner. According to German Patent Application No. 198 07 782.2, references to possible subsequent subapplications are inserted (1501, 1502). Thus a CT may pre-load the subapplications into the cache before they are needed. In the case of a jump, only the subapplication to which the jump was made needs to be executed; the other(s) may be overwritten later by new subapplications. In addition to intelligent pre-loading, the procedure has the additional advantage that the size of the subapplications is already known at the time of loading. Thus, optimum bursts can be executed by the CT when accessing the memories, which in turn may considerably speed up memory access.

Figure 16:
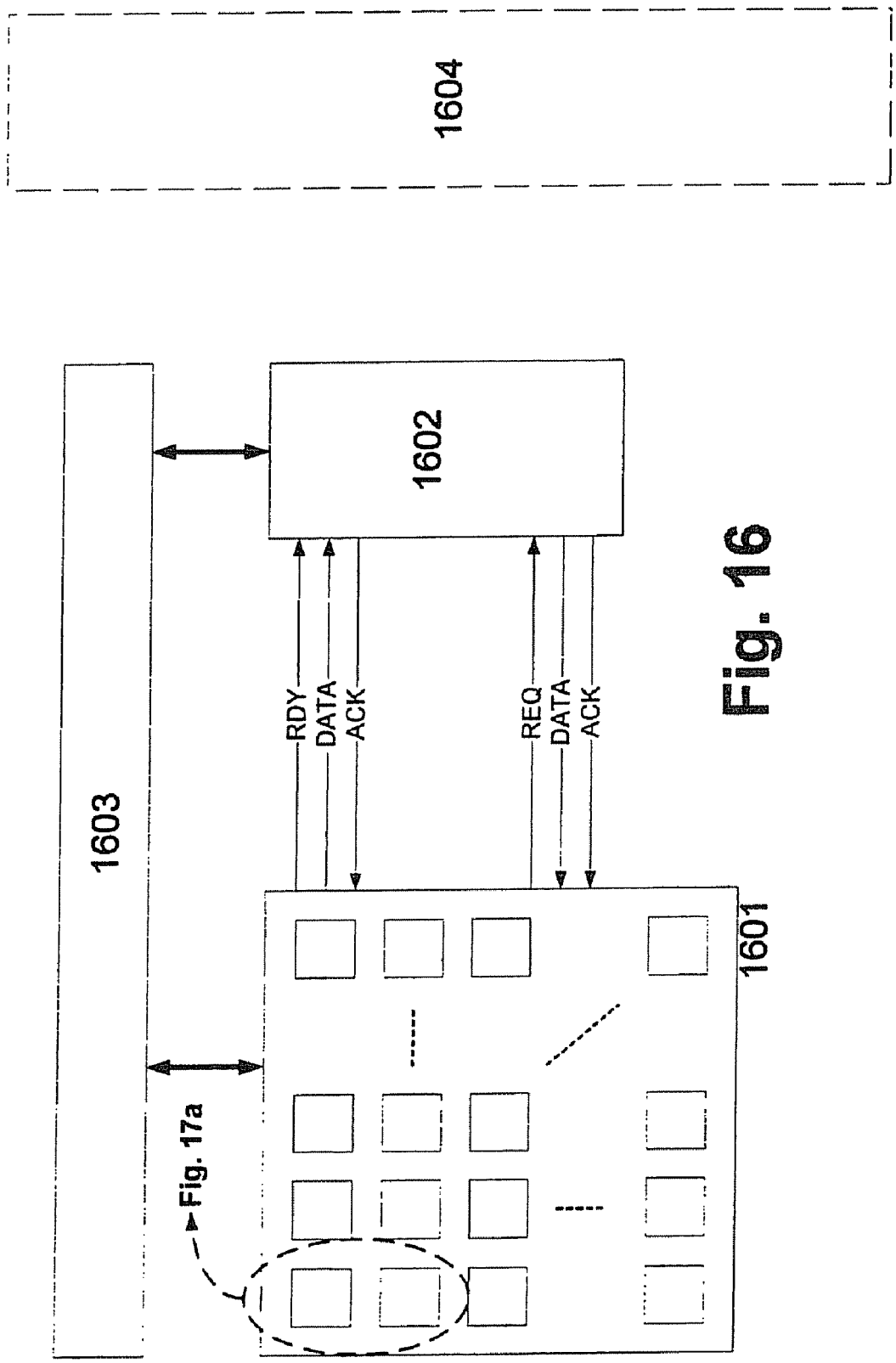
FIG. 16 illustrates the structure of an example stack processor, according to an example embodiment of the present invention.

FIG. 16 illustrates the structure of an example stack processor. Protocols may be generated by the PAE array 1601 in order to write into or read from a memory 1602 configured as LIFO. A RDY/ACK protocol may be used for writing and a REQ/ACK protocol may be used for reading. The interconnection and operating modes may be configured by the CT 1603. Memory 1602 may transfer its content to an external memory 1604.

Figures 17, 17A:
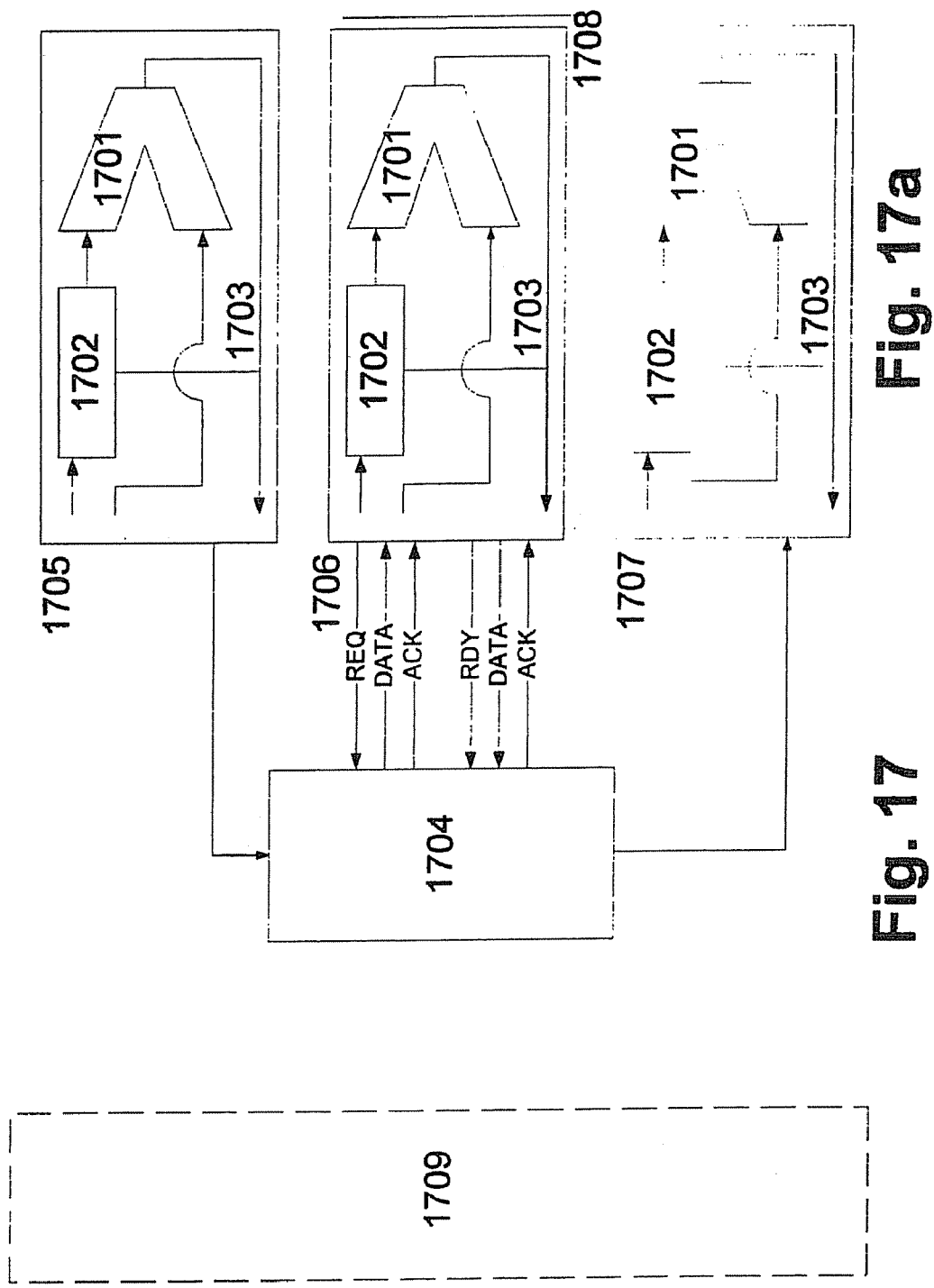
FIG. 17 illustrates the operation of an array of PAEs as a register processor, according to an example embodiment of the present invention.

An array of PAEs may operate as a register processor in this embodiment (FIG. 17). Each PAE may be composed of an arithmetic unit (1701) and an accumulator (1702) to which the result of arithmetic unit 1701 is looped back (1703). Thus, in this embodiment, each PAE may represent an accumulator processor. A PAE (1705) reads and writes the data into the RAM (1704) configured as a standard memory. An additional PAE (1706) may generate the register addresses.

It may be advantageous to use a separate PAE for reading the data. In this case, PAE 1705 would only write and PAE 1707 would only read. An additional PAE (1708, shown in broken lines underneath PAE 1706) may be added for generating the read addresses.

It is not necessary to use separate PAEs for generating addresses. Often the registers are implicit and, configured as constants, may be transmitted by the data processing PAEs.

The use of accumulator processors for a register processor is shown as an example. PAEs without accumulators can also be used for creating register processors. The architecture shown in FIG. 17 can be used for activating registers as well as for activating a load/store unit.

When used as a load/store unit, an external RAM (1709) may need to be connected downstream, so that RAM 1704 represents only a temporary section of external RAM 1709, similar to a cache.

Also, when 1704 is used as a register bank, it may be advantageous to some for an external memory to be connected downstream. In this case, PUSH/POP operations according to the related art, which write the content of the register into a memory or read it from there, may be performed.

Figure 18:
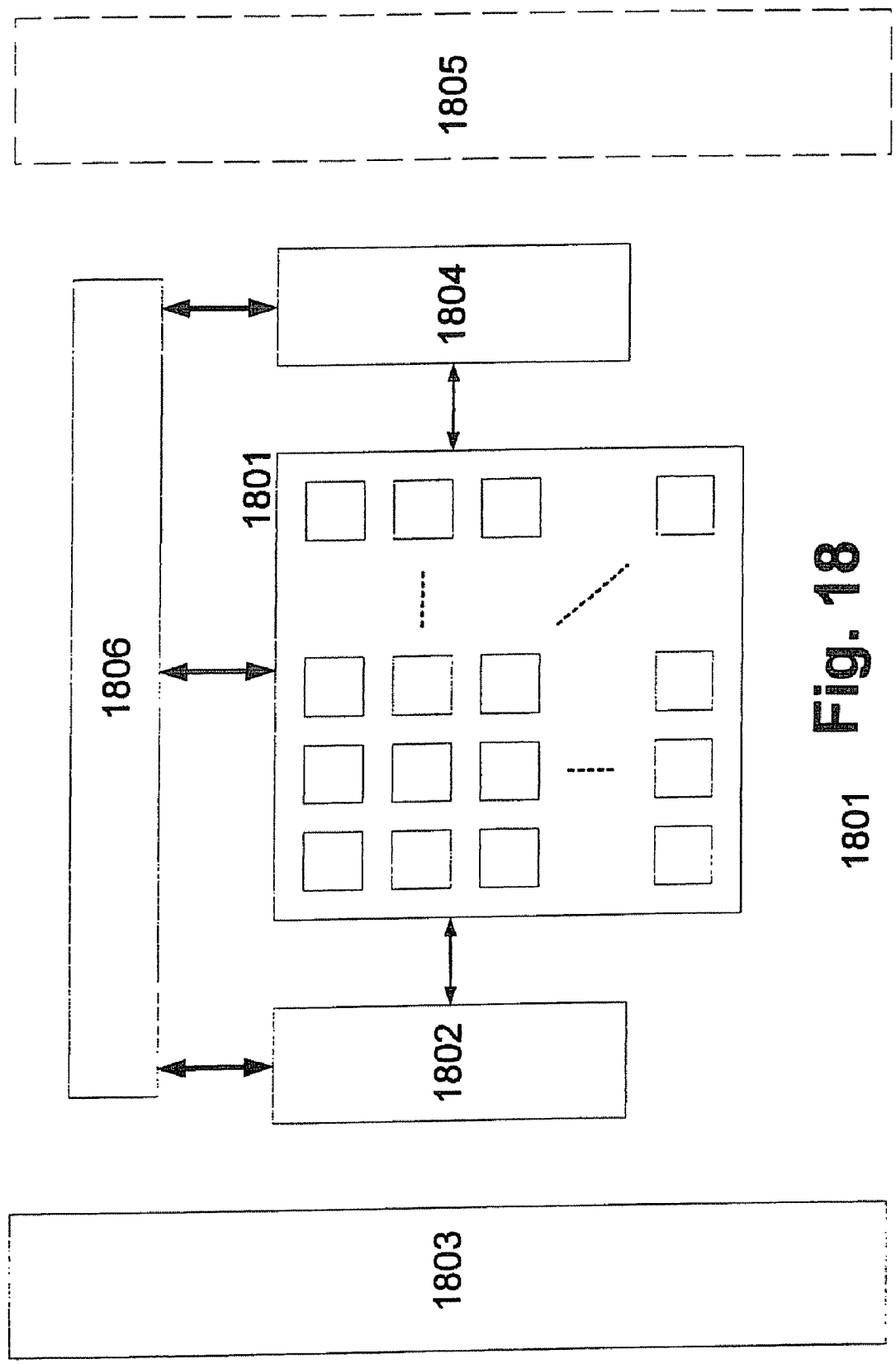
FIG. 18 illustrates an example complex machine in which the PAE array controls a load/store unit with a downstream RAM, according to an example embodiment of the present invention.

FIG. 18 illustrates a complex machine as an example, in which the PAE array (1801) controls a load/store unit (1802) with a downstream RAM (1803), and also has a register bank (1804) with a downstream RAM (1805). 1802 and 1804 may be activated by one PAE each or any group of PAEs. The unit is controlled by a CT (1806) according to the VPU principle.

There is no basic difference between the load/store unit (1802) and the register bank (1804) and their activation.

FIGS. 19, 20, 21 show an internal memory according to an example embodiment of the present invention. The figures also represent a communication unit having external memories and/or peripheral devices. The individual figures show different modes of operation of the same memory. The modes of operation and the individual detail settings are configured.

FIG. 19a shows a memory according to the present invention in the "register/cache" mode. In the memory (1901), words of a usually larger and slower external memory (1902) may be stored.

The data exchange between 1901, 1902, and the PAEs (not shown) connected via a bus (1903) may take place as follows, distinction being made between two modes of operation:

A) The data read or transmitted by the PAEs from main memory 1902 is buffered in 1901 using a cache technique. Any conventional cache technique can be used.

B) The data of certain addresses is transmitted between 1902 and 1901 via a load/store unit. Certain addresses may be predefined both in 1902 and in 1901, different addresses being normally used for 1902 and 1901. The individual addresses may be generated by a constant or by computations in PAEs. In this operating mode memory 1901 may operate as a register bank.

The addresses between 1901 and 1902 may be assigned in any desired manner, which only depends on the respective algorithms of the two operating modes.

The corresponding machine is shown in FIG. 19b as a block diagram. A control unit (1904) operating as a conventional load/store unit (1904) or as a conventional cache controller is associated with the bus between 1901 and 1902. If needed, a memory management unit (MMU) (1905) with address translation and address checking may be associated with this unit. Both 1904 and 1905 can be activated by the PAEs. Thus, for example, the MMU may be programmed, the load/store addresses may be set, or a cache flush may be triggered.

FIG. 20 shows the use of the memory (2001) in the FIFO mode, in which data streams are isolated according to a FIFO principle. The typical application is in a write (2001a) or read (2001b) interface, in which case data is isolated in time between the PAEs connected to the internal bus system (2002) and the peripheral bus (2003).

A unit (2004) which controls the write and read pointers of the FIFO as a function of the bus operations of 2003 and 2002 may be provided to control the FIFO.

FIG. 21 illustrates an example operating principle of the memories in stack mode, according to an example embodiment of the present invention. A stack may be a memory whose uppermost/lowermost element is the one active at the time. Data may be appended at the top/bottom, and data may likewise be removed from the top/bottom. The data written last may also be the data read first (last in first out). The stack may grow upward or downward depending on the implementation. In the following embodiment, stacks growing upward will be discussed.

The current data may be held in internal memory 2101; the most recent record (2107) may be located at the very top in 2101. Old records are transferred to external memory 2102. If the stack continues to grow, the space in internal memory 2101 is no longer sufficient. When a certain amount of data is reached, which may be represented by a (freely selectable) address in 2101 or a (freely selectable) value in a record counter, part of 2101 is written as a block to the more recent end (2103) of the stack in 2102. This part is the oldest and thus the least current data (2104). Subsequently, the remaining data in 2101 may be shifted so that the data in 2101 copied to 2102 is overwritten with the remaining data (2105) and thus sufficient free memory (2106) may created for new stack inputs.

If the stack decreases, starting at a certain (freely selectable) point, the data in 2101 may be shifted so that free memory is created after the oldest and least current data. A memory block is copied from 2102 into the freed memory, and is then deleted in 2102.

Thus, 2101 and 2102 may represent a single stack, the current records being located in 2101 and the older and less current records being transferred to 2102. The method represents a quasi-cache for stacks. The data blocks may be transmitted by block operations; therefore, the data transfer between 2101 and 2102 can be performed in the rapid burst operating modes of modern memories (SDRAM, RAMBUS, etc.).

In the example illustrated in FIG. 21 the stack grows upward. It will be appreciated that if the stack grew downward (a frequently used method), the positions top/bottom and the directions in which the data is moved within the memory are exactly reversed.

Internal stack 2101 may be designed as a type of ring memory. The data at one end of the ring may be transmitted between PAEs and 2101 and at the other end of the ring between 2101 and 2102. This has the advantage that data can be easily shifted between 2101 and 2102 without having any effect on the internal addresses in 2101. Only the position pointers of the bottom and top data and the fill status counter have to be adjusted. The data transfer between 2101 and 2102 may by triggered by conventional ring memory flags "almost full"/"full" "almost empty"/"empty."

Example hardware is shown as a block diagram in FIG. 21b. A unit (2110) for managing the pointers and the counter may be associated with internal stack 2101. A unit (2111) for controlling the data transfers may be looped into the bus (2114) between 2101 and 2102. A conventional MMU (2112) having the corresponding test systems and address translations can be associated with this unit.

The connection between the PAEs and 2101 may be implemented by bus system 2113.

Figure 22:
FIG. 22 illustrates an example re-sorting of graphs, according to an example embodiment of the present invention.

FIG. 22 illustrates an example re-sorting of graphs. The left-hand column (22.a) shows an unoptimized arrangement of commands. Pointers A (2207a) and B (2211a) are loaded. One cycle later in each case, the values of the pointers are needed (2208a, 2212a). This dependence may be too short to be executed efficiently, since a certain time (2220a, 2221a) is needed for loading from the memory. The time periods are increased to a maximum (2220b, 2221b) by re-sorting the commands (22..b). Although the value of the pointer of A is needed in 2210 and 2208, 2208 is placed after 2210, since more time is gained in this way for computing B. Computations that are independent of pointers (2203, 2204, 2206) may be inserted between 2211 and 2212, for example, in order to gain more time for memory accesses. A compiler or assembler may perform the corresponding optimization using system parameters which represent the access times.

Figure 23:
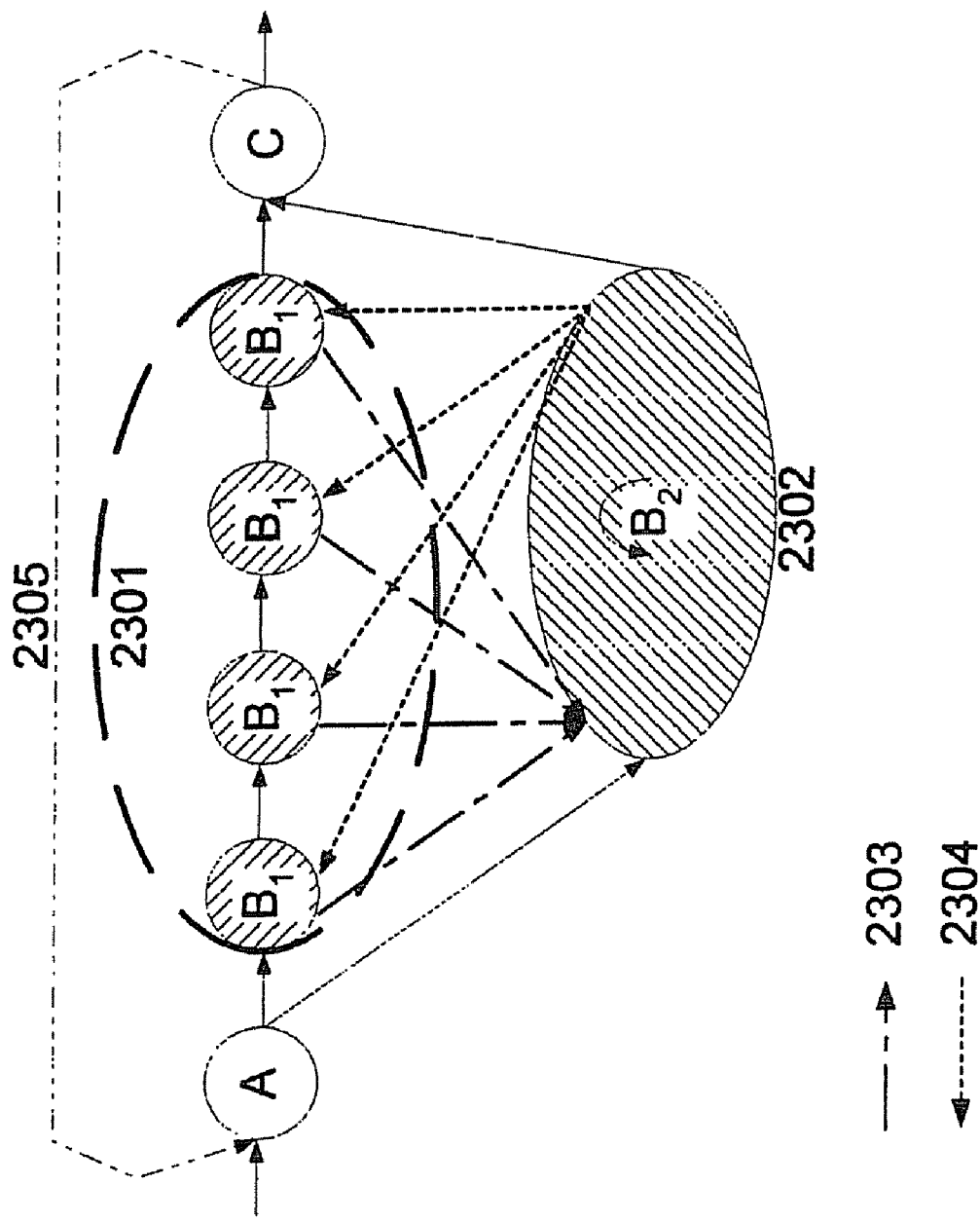
FIG. 23 illustrates a special case of FIGS. 4-7, according to an example embodiment of the present invention.

FIG. 23 illustrates a special case of FIGS. 4-7. An algorithm is often composed of data flow portions and sequential portions even within loops. Such structures may be efficiently constructed according to the above-described method using the bus system described in German Patent Application No. 197 04 742.4, filed on Feb. 11, 1997. For this purpose, the RDY/ACK protocol of the bus system may be initially extended by the REQ/ACK protocol, according to an example embodiment of the present invention. Register contents of individual PAEs may be specifically queried by one or more other PAEs or by the CT. A loop (2305) may be broken down into at least two graphs: a first one (2301) which represents the data flow portion, and a second one (2302), which represents the sequential portion.

A conditional jump chooses one of the two graphs. The special characteristic is that now 2302 needs to know the internal status of 2301 for execution and vice versa, 2301 must know the status of 2302.

This may be implemented by storing the status just once, namely in the registers of the PAEs of the higher-performance data flow graph (2301).

If a jump is performed in 2302, the sequencer may read the states of the respective registers from (2303) using the bus system of German Patent Application No. 197 04 742.4. The sequencer performs its operations and writes all the modified states back (2304) into the registers (again via the bus system of German Patent Application No. 197 04 742.4. Finally, it should be mentioned that the above-mentioned graphs need not necessarily be narrow loops (2305). The method is generally applicable to any subalgorithm which is executed multiple times within a program run (reentrant) and is run either sequentially or in parallel (data flow type). The states may be transferred between the sequential and the parallel portions.

Wave reconfiguration offers considerable advantages regarding the speed of reconfiguration, in particular for simple sequential operations. With wave reconfiguration, the sequencer may also be designed as an external microprocessor. A processor may be connected to the array via the data channels and the processor may exchange local, temporary data with the array via bus systems. All sequential portions of an algorithm that cannot be mapped into the array of PAEs may be run on the processor.

The example system may have three bus systems:
1. Data bus which regulates the exchange of processed data between the VPU and the processor;
2. Register bus which enables access to the VPU registers and thus guarantees the data exchange (2302, 2304) between 2302 and 2301;
3. Configuration data bus, which configures the VPU array.

FIG. 24 illustrates the effects of wave reconfiguration over time, in an example embodiment of the present invention.

Single-hatched areas represent data processing PAEs, 2401 showing PAEs after reconfiguration and 2403 showing PAEs before reconfiguration. Cross-hatched areas (2402) show PAEs which are being reconfigured or are waiting for reconfiguration.

Figure 24A:
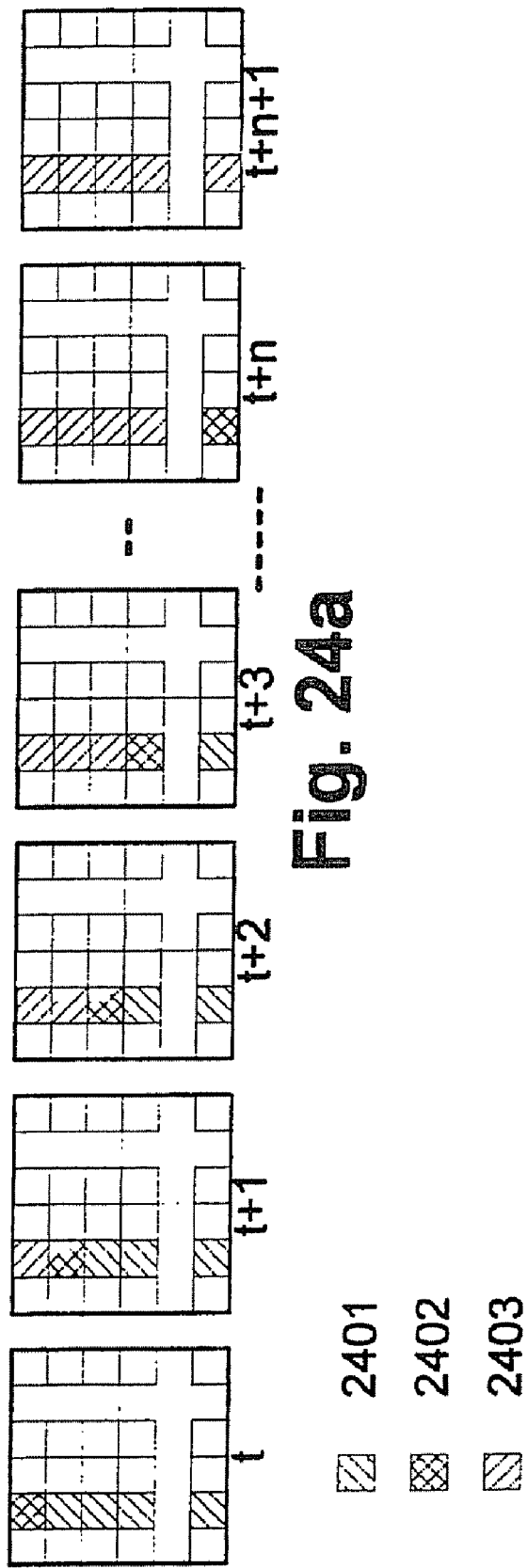
FIG. 24 illustrates the effects of wave reconfiguration over time, in an example embodiment of the present invention.

FIG. 24a illustrates the effect of wave reconfiguration on a simple sequential algorithm. Those PAEs that have been assigned a new task may be reconfigured. This may be performed efficiently, e.g., simultaneously, because a PAE receives a new task in each cycle.

A row of PAEs from the matrix of all PAEs of a VPU is shown as an example. The states in the cycles after cycle t are given with a one-cycle delay.

Figure 24B:
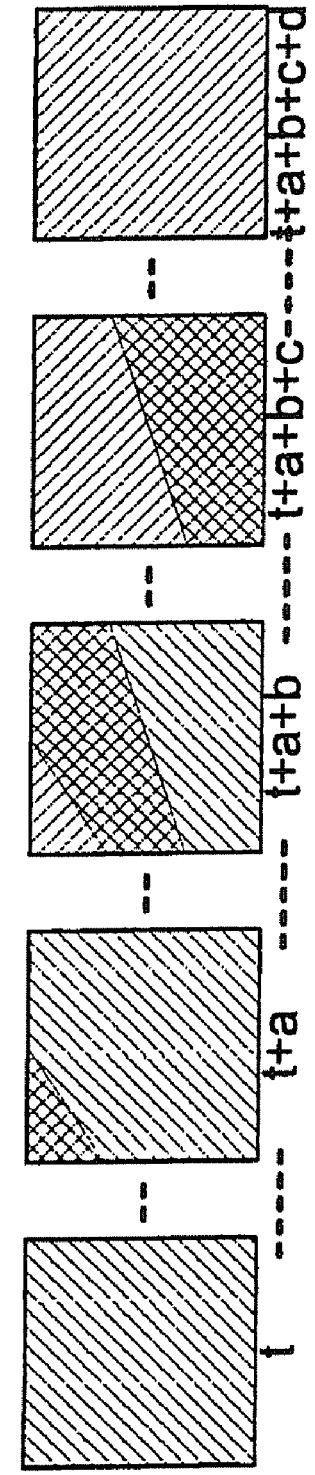

FIG. 24b shows the effect over time of the reconfiguration of large portions. A number of PAEs of a VPU is shown as an example. The states in the cycles after cycle t are given with different delays of a plurality of cycles.

While initially only a small portion of the PAEs are being reconfigured or are waiting for reconfiguration, this area becomes larger over time until all PAEs are reconfigured. The enlarging of the area means that, due to the time delay of the reconfiguration, more and more PAEs will be waiting for reconfiguration (2402), resulting in loss of computing capacity.

A wider bus system may be used between the CT (in particular the memory of the CT) and the PAEs, which may provide sufficient lines for reconfiguring multiple PAEs at the same time within one cycle.

FIG. 25 illustrates the scalability of the VPU technology. Scalability may result from the rollout of a graph without a time sequence separating individual subapplications. The algorithm previously illustrated in FIG. 4 is chosen as an example. In FIG. 25a, the individual subgraphs may be transferred to the VPU consecutively, with either $B_1$ or $B_2$ being loaded. In FIG. 25b, all subgraphs are transferred to a number of VPUs and connected to one another via bus systems. Thus large amounts of data may be processed efficiently without the negative effect of the reconfiguration.

Figure 26:
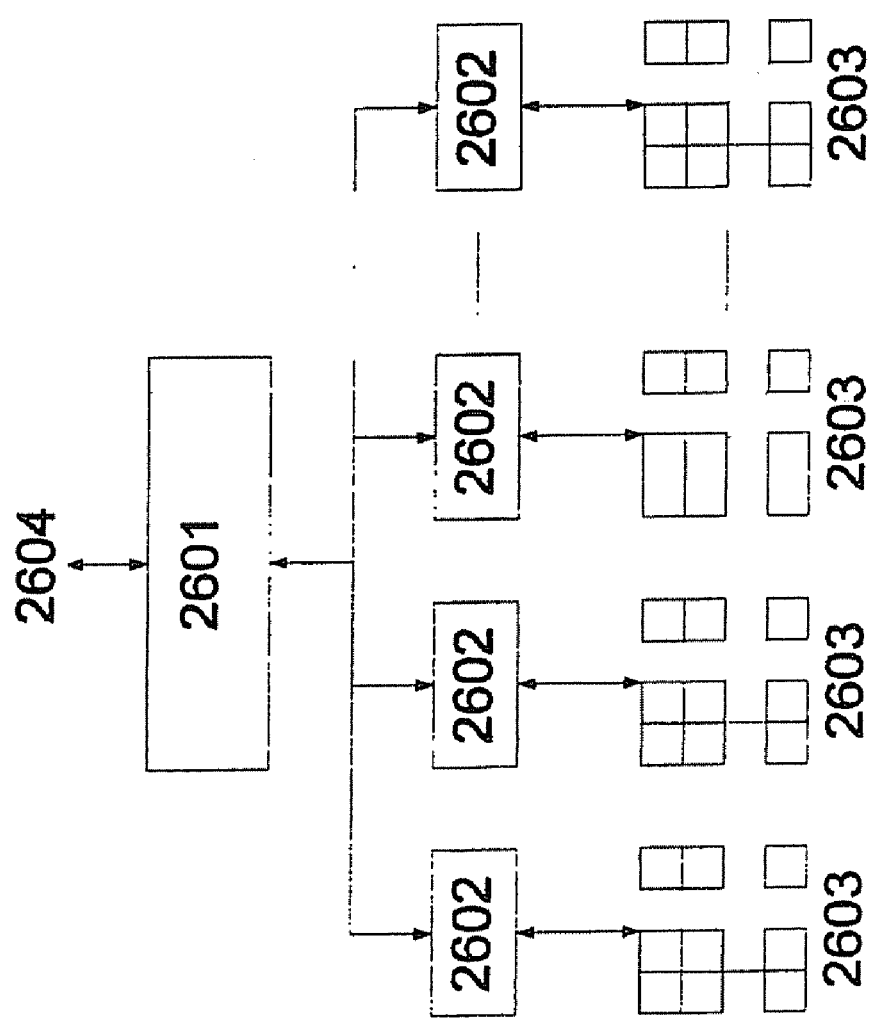
FIG. 26 illustrates a circuit for speeding up the (re)configuration time of PAEs, according to an example embodiment of the present invention.

FIG. 26 illustrates a circuit for speeding up the (re)configuration time of PAEs, according to an example embodiment of the present invention. At the same time, the circuit may be used for processing sequential algorithms. The array of PAEs (2605) may be partitioned into a plurality of portions (2603). An independent unit for (re)configuration (2602) may be associated with each portion. A CT (2601) as described in, for example, German Patent Application No. 198 07 782.2 is at a higher level than these units and may in turn be connected to another CT or a memory (2604). The CT loads the algorithms into the configuration units (2602). The 2602 automatically load the configuration data into the PAEs associated with them.

Figure 27A:
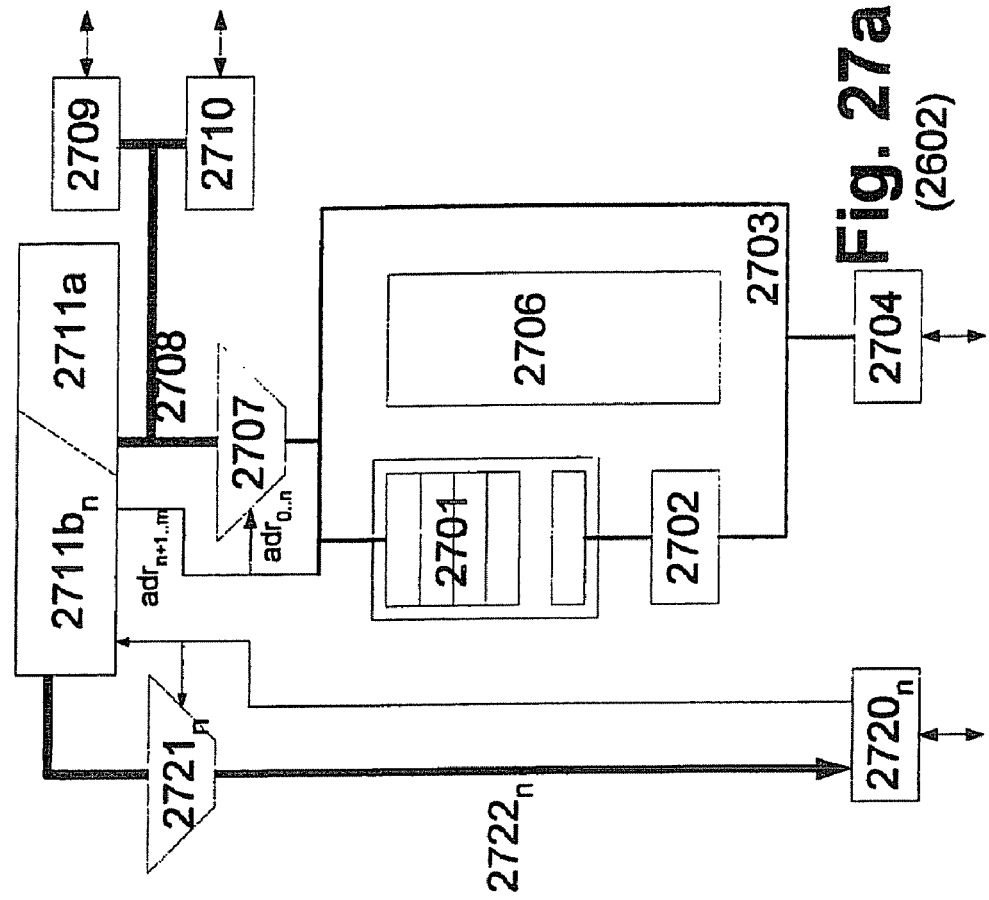
FIG. 27 illustrates the structure of an example configuration unit, according to an example embodiment of the present invention.
Figure 27:
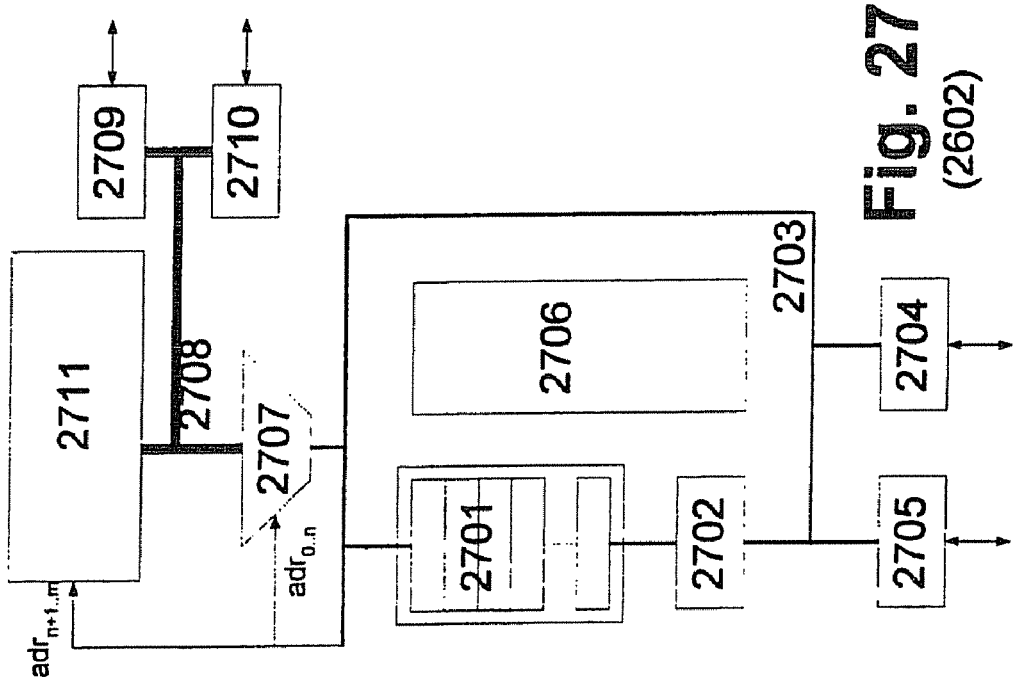

FIG. 27 illustrates the structure of an example configuration unit, according to an example embodiment of the present invention. The core of the unit is a sequencer (2701), which may have a series of commands. The commands include:

wait<trg#>

Wait for the receipt of a certain trigger f(trg#) from the array, which indicates which next configuration should be loaded.

lookup<trg#>

Returns the address of the subprogram called by a trigger received.

jmp<adr>

Jump to address call<adr>

Jump to address. Return jump address may be stored on the stack.

jmp<cond> <adr>

Conditional jump to address call<cond> <adr>

Conditional jump to address. Return jump address is stored on the stack.

ret

Return jump to the return jump address stored on the stack mov<target> <source>

Transfers a data word from source to target. Source and target may each be a peripheral address or in a memory.

The commands may be similar to those described in German Patent Application No. 198 07 782.2, e.g., the description of the CT. The implementation of 2602, may need only very simple commands for data management. A complete micro controller may be omitted.

The command set may include a "pabm" command for configuring the PAEs. Two commands (pabmr, pabmm) are available, which have the following structure:

| a) | | |
|---|---|---|
| pabmr | regno | count |
| pa_$adr_0$ | | pa_$dta_0$ |
| pa_$adr_1$ | | pa_$dta_1$ |
| ... | | ... |
| pa_$adr_{count}$ | | pa_$dta_{count}$ |
| pabmr offset | 0 | count |
| pa_$adr_0$ | | pa_$dta_0$ |
| pa_$adr_1$ | | pa_$dta_1$ |
| ... | | ... |
| pa_$adr_{count}$ | | pa_$dta_{count}$ |

| b) | | |
|---|---|---|
| pabmr memref | regno | count |
| pabmm offset memref | 0 | count |

The commands may copy an associated block of PAE addresses and PAE data from the memory to the PAE array. <count> indicates the size of the data block to be copied. The data block may either be directly appended to the opcode (a) or referenced by specifying the first memory address <memref> (b).

Each pa_$adr_n$-pa_$dta_n$ row represents a configuration for a PAE. pa_$adr_n$ specifies the address and pa_$dta_n$ specifies the configuration word of the PAE.

An example of the RDY/ACK-REJ protocol is described in German Patent Application No. 198 07 782.2. If the configuration data is accepted by a PAE, the PAE acknowledges the transmitted data with an ACK. However, if a PAE cannot accept the configuration data because it is not in a reconfigurable state, it returns a REJ. Thus the configuration of the subalgorithm fails.

The location of the pa_$adr_n$-pa_$dta_n$ row rejected with REJ is stored. The commands may be called again at a later time (as described in German Patent Application No. 198 07 782.2, FILMO). If the command was completely executed, e.g., no REJ occurred, the command performs no further configuration, but terminates immediately. If a REJ occurred, the command jumps directly to the location of the rejected pa_$adr_n$-pa_$dta_n$ row. Depending on the command, the location is stored in different ways:

pabmr: the address is stored in the register named <regno>;
pabmm: the address is stored directly in the command at the memory location <offset>.

The commands can be implemented via DMA structures as memory/IO transfers according to the related art. The DMAs are extended by a logic for monitoring the incoming ACK/REJ. The start address is determined by <regno> or <offset>. The last address of the data block is computed via the address of the command plus its opcode length minus one plus the number of pa_adr$_n$-pa_dta$_n$ rows.

It is also useful to extend the circuit described in German Patent Application No. 198 07 782.2, by the above-mentioned commands.

FIG. 27 shows the structure of a 2602 unit. The unit has a register set 2701 with which a simple ALU is associated for stack operations (2702). The structure contains address registers and stack pointers. Optionally, a full-fledged ALU can be used. A bus system (2703) having a minimum width connects registers and ALU. The width is such that simple control flow commands or simple ALU operations can be represented practically. The above-described PABM commands and the commands described in German Patent Application No. 198 07 782.2, are also supported. Registers and ALU may be controlled by a sequencer 2706, which may represent a complete micro controller by its execution of commands.

A unit 2704, which receives and acknowledges triggers from the associated PAEs and transmits triggers to the PAEs when appropriate, is connected to 2703. Incoming triggers cause an interrupt in sequencer 2706 or are queried by the WAIT command. Optionally, an interface (2705) to a data bus of the associated PAEs is connected to 2703 in order to be able to send data to the PAEs. For example, the assembler codes of a sequencer implemented in the PAEs are transmitted via 2705. The interface contains, when required, a converter for adjusting the different bus widths. Units 2701 through 2706 are connected to a bus system (2708), which is multiple times wider and leads to the memory (2709), via a multiplexer/demultiplexer (2707). 2707 is activated by the lower-value addresses of the address/stack register; the higher-value addresses lead directly to the RAM (2711). Bus system 2708 leads to an interface (2709), which is controlled by the PA commands and leads to the configuration bus of the PAEs. 2708 is designed to be wide enough to be able to send as many configuration bits as possible per cycle unit to the PAEs via 2709. An additional interface (2710) connects the bus to a higher-level CT, which exchanges configuration data and control data with 2602. Examples of interfaces 2710 and 2709 are described in German Patent Application No. 198 07 782.2.

2706 may have a reduced, minimum set of commands that is optimized for the task, mainly for PA commands, jumps, interrupts, and lookup commands. Furthermore, optimized wide bus system 2708, which is transferred to a narrow bus system via 2707 is of particular importance for the reconfiguration speed of the unit.

Figure 38:
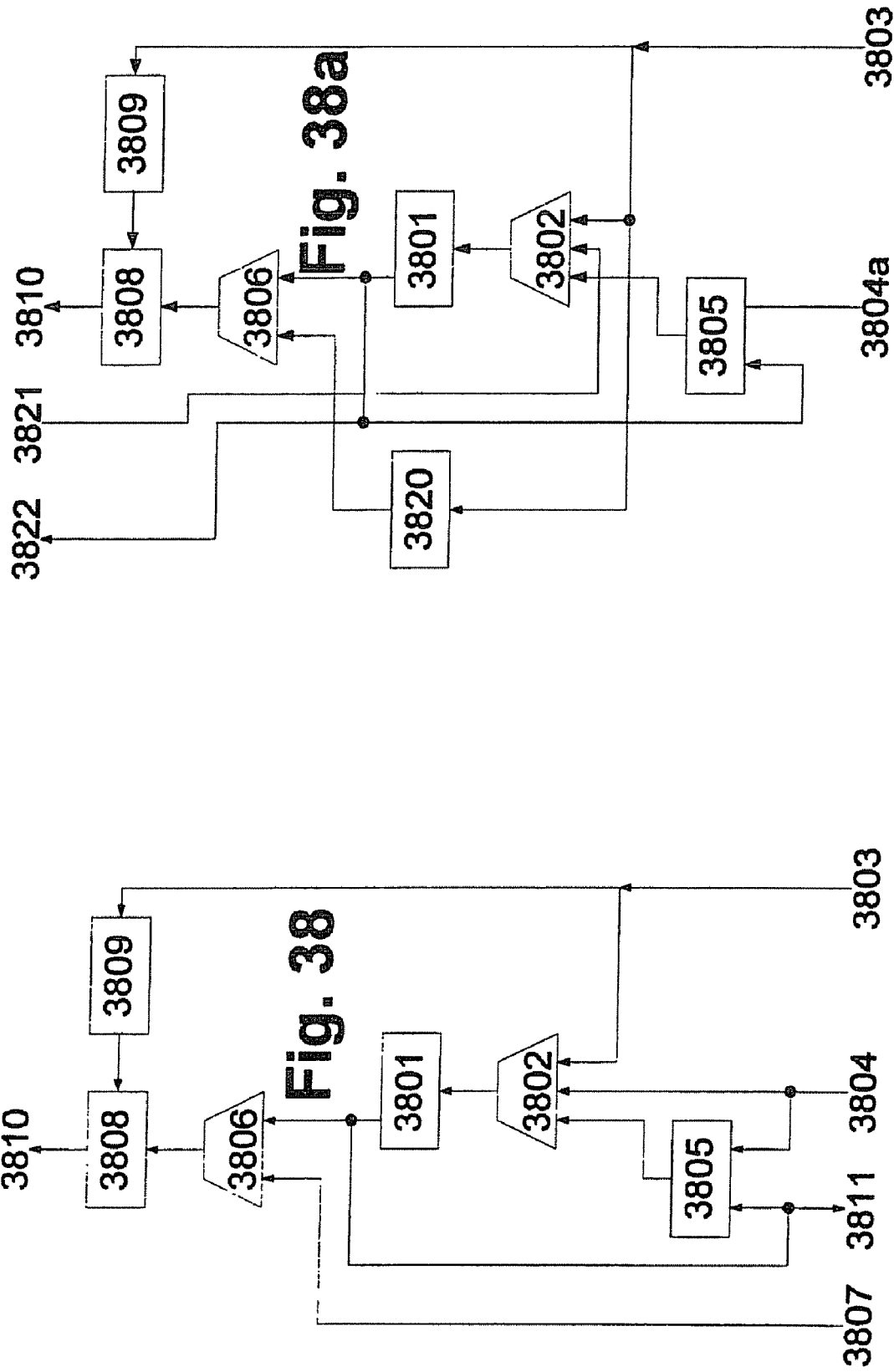
FIG. 38 illustrates an example implementation of a DMA function with direct memory access, according to an example embodiment of the present invention.

FIG. 27a illustrates a special version of the example configuration unit shown in FIG. 27. Interface 2705 may be used for transmitting assembler codes to sequencers configured in the PAE array. The processing capacity of the sequencers may depend on the speed of interface 2705 and of its memory access. In FIG. 27a, 2705 is replaced by a DMA function with direct memory access ($2720_n$). $2720_n$ performs its own memory accesses and has its own bus system($2722_n$) with appropriate adjustment of the bus width ($2721_n$); the bus may be relatively wide for loading wide command sequences (ULIW), so that in the limit case $2721_n$ may not be needed. In order to further increase the speed, memory 2711 may be physically separated into 2711a and $2711b_n$. The address space across 2711a and $2711b_n$ remains linear, but 2701, 2701, and 2706 may access both memory blocks independently and simultaneously; $2720_n$ can only access $2711b_n$. $2720_n$, $2721_n$, and $2711b_n$ can be implemented as multiple units ($_n$), so that more than one sequencer can be managed at the same time. For this purpose, $2711b_n$ can be subdivided again into multiple physically independent memory areas. Example implementations for $2720_n$ are illustrated in FIG. 38.

FIG. 28 illustrates an example structure of complex programs. The basic modules of the programs are the complex configurations (2801) containing the configurations of one or more PAEs and the respective bus and trigger configurations. 2801 are represented by an opcode (2802), which may have additional parameters (2803). These parameters may have constant data values, variable start values or even special configurations. Depending on the function, there may be one parameter, a plurality of parameters, or no parameter.

Multiple opcodes may use a common set of complex configurations to form an opcode group (2805). The different opcodes of a group differ from one another by the special versions of the complex configurations. Differentiation elements (2807) which either contain additional configuration words or overwrite configuration words occurring in 2801 may be used for this purpose.

If no differentiation is required, a complex configuration may be called directly by an opcode (2806). A program (2804) may be composed of a sequence of opcodes having the respective parameters.

A complex function may be loaded once into the array and then reconfigured again by different parameters or differentiations. Only the variable portions of the configuration are reconfigured. Different opcode groups use different complex configurations. (2805a, . . . , 2805n).

The different levels (complex configuration, differentiation, opcode, program) are run in different levels of CTs (see CT hierarchies in German Patent Application No. 198 07 782.2). The different levels are illustrated in 2810, with 1 representing the lowest level and N the highest. CTs with hierarchies of any desired depth can be constructed as described in, for example, German Patent Application No. 198 07 782.2.

A distinction may be made in the complex configurations 2801 between two types of code:
1. Configuration words which map an algorithm onto the array of PAEs. The algorithm may be designed as a sequencer. Configuration may take place via interface 2709. Configuration words may be defined by the hardware.
2. Algorithm-specific codes, which depend on the possible configuration of a sequencer or an algorithm. These codes may be defined by the programmer or the compiler and are used to activate an algorithm. If, for example, a Z80 microprocessor is configured as a sequencer in the PAEs, these codes represent the opcode of the Z80 microprocessor. Algorithm-specific codes may be transmitted to the array of PAEs via 2705.

FIG. 29 illustrates an example basic structure of a PAE, according to an example embodiment of the present invention. 2901 and 2902 represent, respectively, the input and output registers of the data. The complete interconnection logic to be connected to the data bus(es) (2920, 2921) of the array is associated with the registers, as described in, for example, German Patent Application No. 196 51 075.9. The trigger lines as described in, for example, German Patent Application No. 194 04 728, may be tapped from the trigger bus (2922) by 2903 and connected to the trigger bus (2923) via 2904. An ALU (2905) of any desired configuration is connected between 2901 and 2902. A register set (2915) in which local data is stored is associated with the data buses (2906, 2907) and with the ALU. The RDY/ACK synchronization signals of the data buses and trigger buses are supplied (2908) to a state machine (or a sequencer) (2910) or generated by the unit (2909).

The CT may selectively accesses a plurality of configuration registers (2913) via an interface unit (2911) using a bus system (2912). 2910 selects a certain configuration via a multiplexer (2914) or sequences via a plurality of configuration words which then represent commands for the sequencer.

Since the VPU technology operates mainly pipelined, it is of advantage to additionally provide either groups 2901 and 2903 or groups 2902 and 2904 or both groups with FIFOs. This can prevent pipelines from being jammed by simple delays (e.g., in the synchronization).

2920 is an optional bus access via which one of the memories of a CT (see FIG. 27, 2720) or a conventional internal memory may be connected to sequencer 2910 instead of the configuration registers. This allows large sequential programs to be executed in one PAE. Multiplexer 2914 is switched so that it only connects the internal memory.

The addresses may be
a) generated for the CT memory by the circuit of FIG. 38;
b) generated directly by 2910 for the internal memory.

FIG. 30 illustrates an extension of the PAE in order to allow the CT or another connected microprocessor to access the data registers. The address space and the interface of the bus unit (formerly 2911, 3003) may be extended by the additional data buses (3001). A multiplexer (3002), through which 3003 can write data into the register via bus 3001, is connected upstream from each register. The outputs of the registers are looped back to 3003 via 3001. 3003 transmits the data to CT 2912. As an alternative (3003a), the data can be transmitted to a bus (3005) that is independent of CT via an additional interface (3004) in order to transmit the data to CT.

FIG. 31 shows the connection of the array of PAEs (3101) to a higher-level micro controller. The array may contain 3101 all IO channels and memories implemented according to the present invention. The architecture may operate as shown in FIG. 23. 2912 in FIG. 31a provides the bus for the configuration data and register data according to FIG. 30. The data bus is shown separately by 3104. 3102 represents the CT, which in FIG. 31a also represents the microprocessor.

For all bus systems, there are the following connection models to a processor which may be selected depending on the programming model and balancing price and performance.

1. Register Model

In the register model, the respective bus is addressed via a register, which is directly integrated in the register set of the processor and is addressed by the assembler as a register or a group of registers. This model is most efficient when a few registers suffice for the data exchange.

2. IO Model

The respective bus is located in the IO area of the processor. This is usually the simplest and most cost-effective version.

3. Shared Memory Model

Processor and respective bus share one memory area in the data memory storage device. This is an effective version for large amounts of data.

4. Shared Memory-DMA Model

Processor and bus share the same memory as in the previous model. There is a fast DMA to further increase speed (see FIG. 38), which takes on the data exchange between bus and memory.

In order to increase the transmission speed, the respective memories may be physically separable from the other memories (a plurality of memory banks), so that processor and VPU can access their memories independently.

In FIG. 31b, a CT (3102) performs the configuration of the array, while a dedicated processor (3103) guarantees the programming model according to FIG. 23 via 3006 by exchanging register data with the array via 3006 and exchanging conventional data via 3104.

FIGS. 31c/d correspond to FIGS. 31a/b, but a shared memory (3105) is selected for data exchange between the respective processor and 3101.

Figure 32:
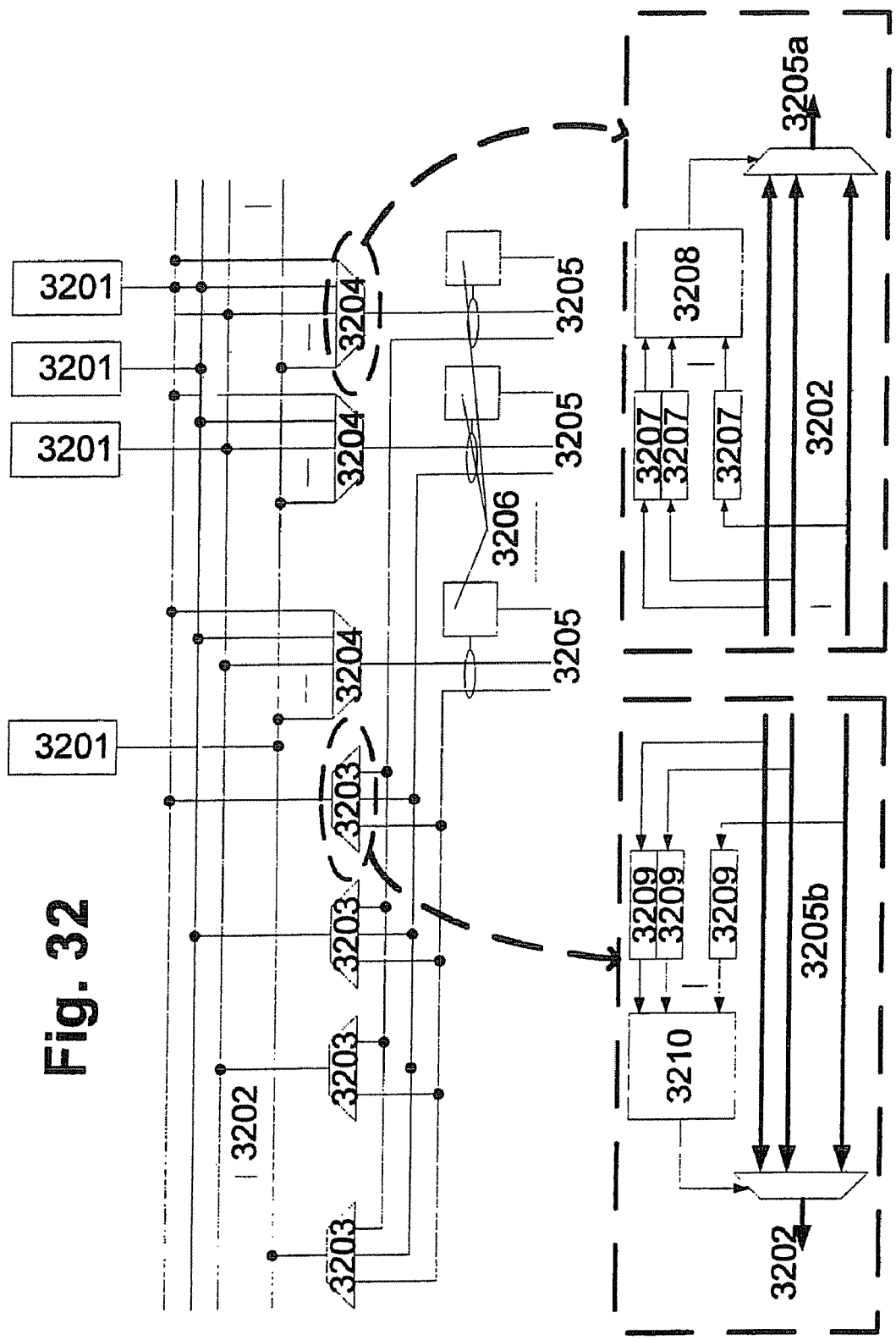
FIG. 32 illustrates an example circuit which allows the memory elements to jointly access a memory or a group of memories, according to an example embodiment of the present invention.

FIG. 32 illustrates an example circuit which allows the memory elements to jointly access a memory or a group of memories, according to an example embodiment of the present invention. Each individual memory of the group may be individually and uniquely addressed. For this purpose, the individual memory elements (3201) may be connected to a bus system, in which each 3201 has its own bus. The bus can be bidirectional or implemented by two unidirectional buses. There is an address/data multiplexer for each memory, which connects a bus to the memory. For this purpose, the adjacent addresses of each bus are decoded (3207) and then one bus per time unit is selected (3204) by an arbiter (3208). The corresponding data and addresses are transferred to the respective memory bus (3205a), with a state machine (3206) generating the required protocols. If the data are received from the memory upon a read request, the respective state machine sends the address of the memory to the bus that requested the data. The addresses of all incoming buses are evaluated by a multiplexer unit for each bus of the bus system (3202) and transferred to the respective bus. The evaluation takes place corresponding to the evaluation of the output data, e.g., a decoder (3209) for each input bus (3205b) conducts a signal to an arbiter (3210) which activates the data multiplexer. Thus, different input buses are connected to the bus system (3202) in each time unit.

Figure 33:
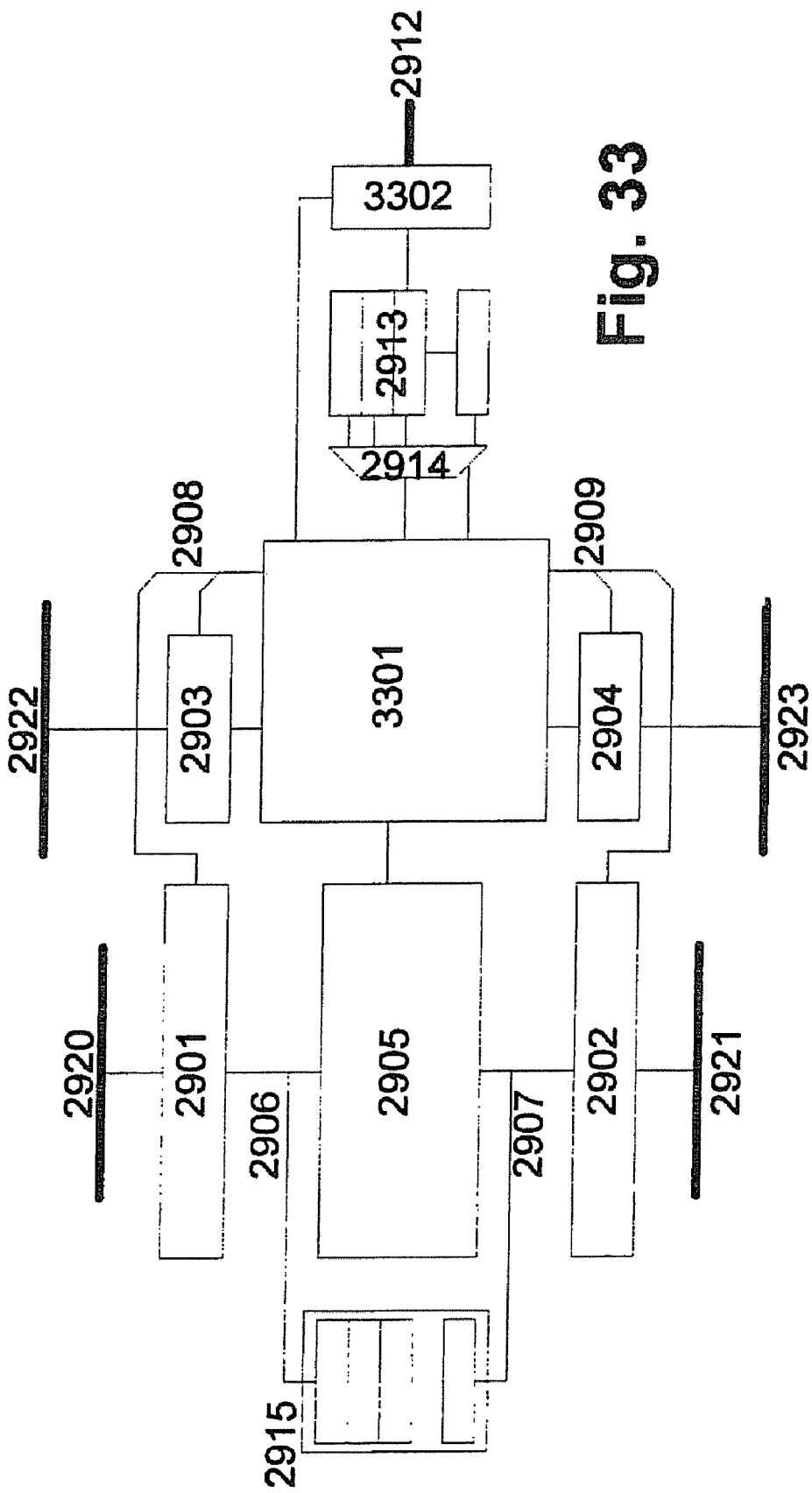
FIG. 33 illustrates the use of a freely programmable sequencer, according to an example embodiment of the present invention.

FIG. 33 illustrates the use of a freely programmable sequencer, according to an example embodiment of the present invention. The rigid state machine/rigid sequencer 2910, previously described, may be replaced by a freely programmable sequencer (3301). This may allow a simpler and more flexible evaluation of the trigger and RDY/ACK signals. The full function of 3301 may be determined by the configuration registers (2913) prior to the execution of algorithms by the CT. Loading of 3301 may be controlled by a CT interface (3302) which has been extended by the management of 3301 with respect to 2911. An advantage of 3301 is that it allows handling of the different trigger and RDY/ACK signals in a much more flexible manner than in fixedly implemented 2910. A possible disadvantage is the potentially larger size of a 3301.

It will be appreciated that a compromise resulting in maximum flexibility and a reasonable size is evaluating the trigger and RDY/ACK signals by a unit according to 3301 and controlling all fixed processes within the PAE by a fixedly implemented unit according to 2910.

Figure 34:
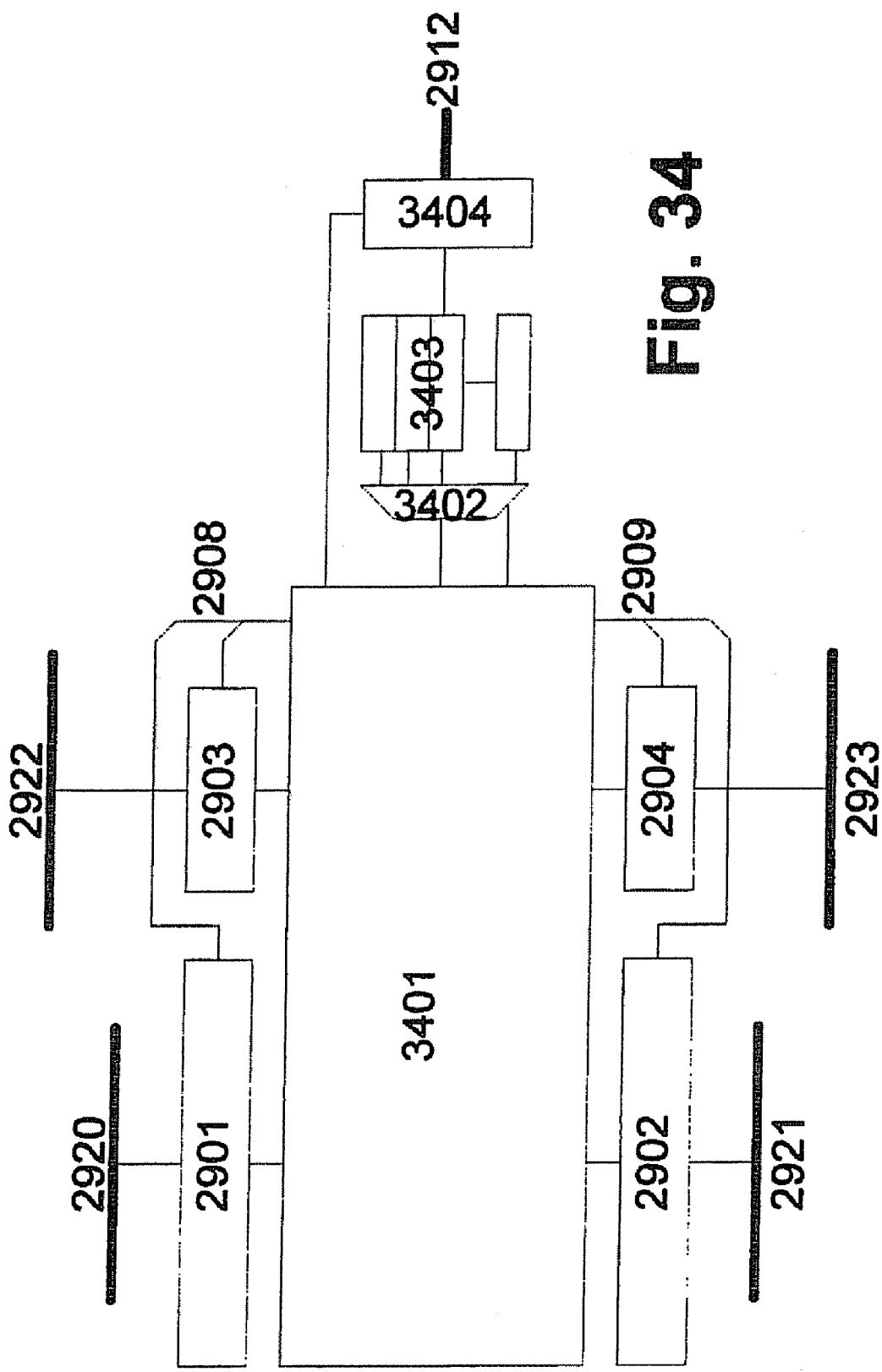
FIG. 34 illustrates a PAE for processing logical functions, according to an example embodiment of the present invention.

FIG. 34 illustrates a PAE for processing logical functions, according to an example embodiment of the present invention. The core of the PAE is a unit described in detail below for gating individual signals (3401). The bus signals are connected to 3401 via the known registers 2901, 2902, 2903, 2904. The registers are extended by a feed mode for this purpose, which selectively exchanges individual signals between the buses and 3401 without storing them (register) in the same cycle. The multiplexer (3402) and the configuration registers (3403) are adjusted to the different configurations of 3401. The CT interface (3404) is also configured accordingly.

FIG. 35 illustrates possible designs of 3401, for a unit according to an example embodiment of the present invention. A global data bus 3504 connects logic cells 3501 and 3502 to registers 2901, 2902, 2903, 2904. 3504 is connected to the logic cells via bus switches, which can be designed as multiplexers, gates, transmission gates, or simple transistors. The logic cells may be designed to be completely identical or may have different functionalities (3501, 3502). 3503 represents a RAM.

Possible designs of the logic cells include:
lookup tables,
logic
multiplexers
registers The selection of the functions and interconnection can be either flexibly programmable via SRAM cells or using read-only ROMs or semistatic Flash ROMs.

Figure 36:
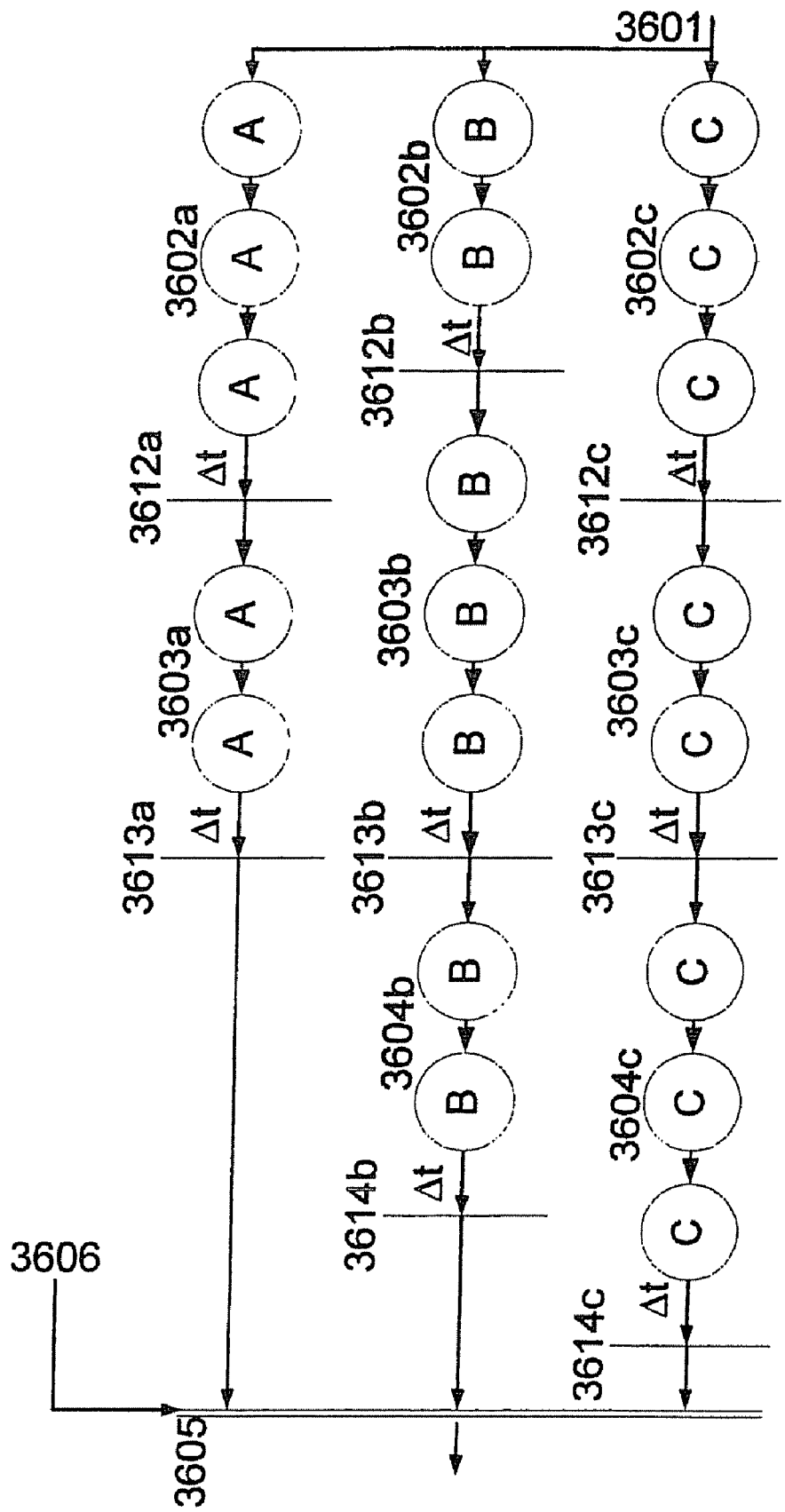
FIG. 36 illustrates speculative design with VPUs, according to an example embodiment of the present invention.

In order to speed up sequential algorithms, which are difficult to parallelize, speculative design may be utilized. FIG. 36 illustrates speculative design with VPUs, according to an example embodiment of the present invention. The operands (3601) may go to a plurality of possible paths of subalgorithms (3602a, 3602b, 3602c) at the same time. The subalgorithms may have different area and time requirements. Depending on the subalgorithms, the data is stored according to the present invention (3612a, 3612b, 3612c) before being processed (3603) by the next subalgorithms after reconfiguration. The times of reconfiguration of the individual subalgorithms are also independent of one another, as is the number of subalgorithms themselves (3603, 3614). As soon as it can be decided which of the paths is to be selected, the paths are combined via a bus or a multiplexer (3605). Trigger signals generated by a condition, e.g., as described in German Patent Application No. 197 04 728.9, (3606) determine which of the paths is selected and forwarded to the next algorithms.

Figure 37:
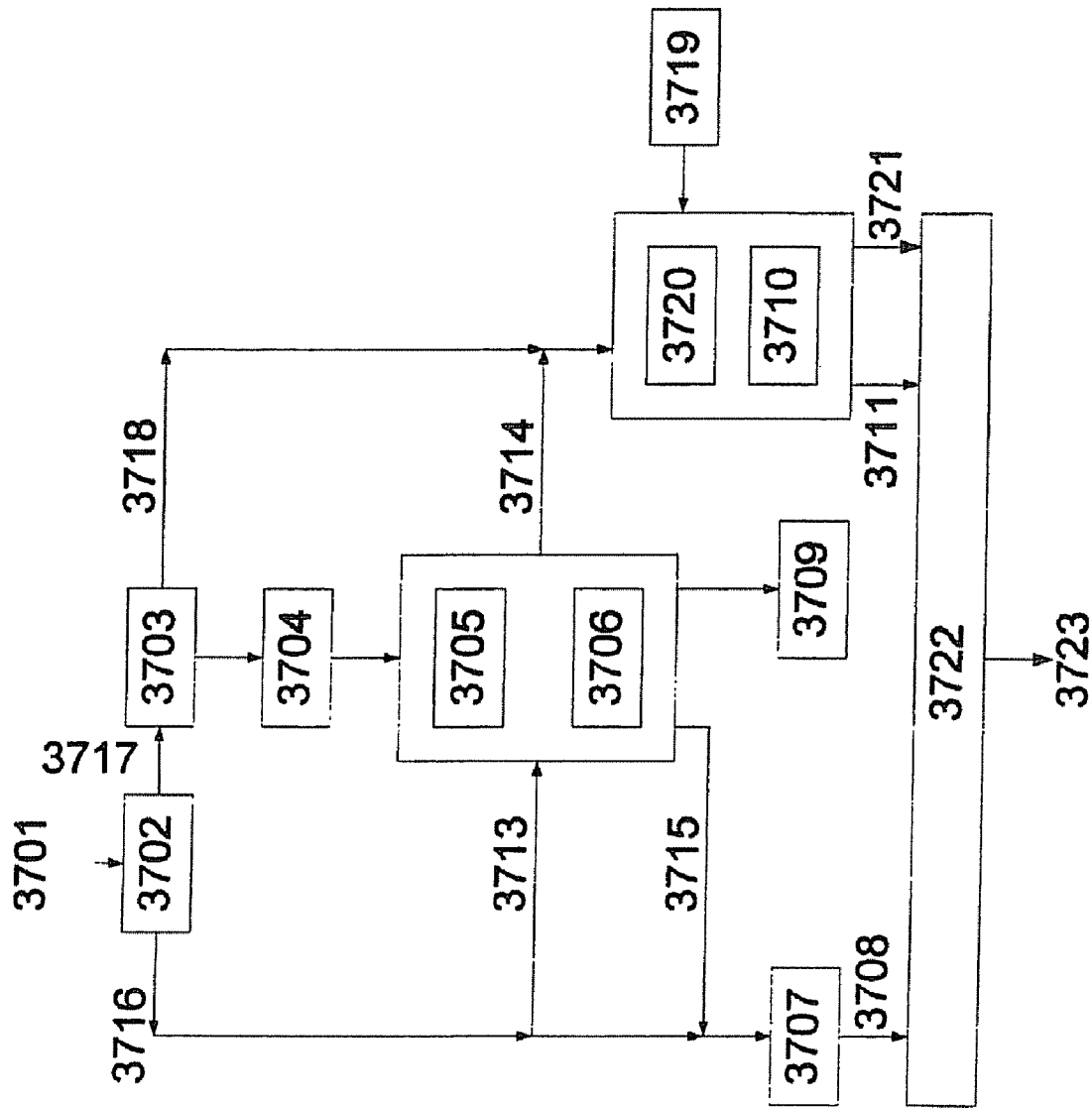
FIG. 37 illustrates the design of an example high-level language compiler, according to an example embodiment of the present invention.

FIG. 37 illustrates the design of an example high-level language compiler. The complier may translate common sequential high-level languages (C, Pascal, Java) to a VPU system. Sequential code (3711) is separated from parallel code (3708), whereby, 3708 is directly processed in the array of PAEs.

There are three design options for sequential code 3711:
1. Within a sequencer of a PAE (2910).
2. Via a sequencer configured in the VPU. To do so, the compiler may generate a sequencer optimized for the task, as well as the algorithm-specific sequencer code (see 2801) directly.
3. On a conventional external processor (3103).

The option selected depends on the architecture of the VPU, of the computer system, and of the algorithm.

The code (3701) may initially be separated in a pre-processor (3702) into data flow code (3716) (written in a special version of the respective programming language and optimized for the data flow), and common sequential code (3717). 3717 is checked for parallelizable subalgorithms (3703), and the sequential subalgorithms are eliminated (3718). The parallelizable subalgorithms are placed temporarily as macros and routed.

In an iterative process, the macros are placed together with the data flow-optimized code (3713), routed, and partitioned (3705). A statistical unit (3706) evaluates the individual macros and their partitioning with regard efficiency, with the time and the resources used for reconfiguration being factored into the efficiency evaluation. Inefficient macros are removed and separated as sequential code (3714).

The remaining parallel code (3715) is compiled and assembled (3707) together with 3716, and VPU object code is output (3708).

Statistics concerning the efficiency of the code generated and of the individual macros (including those removed with 3714) are output (3709); thus, the programmer receives essential information on the speed optimization of the program.

Each macro of the remaining sequential code is checked for complexity and requirements (3720). The appropriate sequencer is selected from a database, which depends on the VPU architecture and the computer system (3719), and output as VPU code (3721). A compiler (3721) generates and outputs (3711) the assembler code of the respective macro for the sequencer selected by 3720. 3710 and 3720 are closely linked. The process may take place iteratively in order to find the most suitable sequencer with the least and fastest assembler code.

A linker (3722) combines the assembler codes (3708, 3711, 3721) and generates the executable object code (3723).

FIG. 38 illustrates the internal structure of an example direct memory access unit, according to an example embodiment of the present invention. The core of the circuit is a loadable up/down counter (3801), which may get its start value from bus 3803 (corresponds to 2703) of the circuit of FIG. 27 via appropriately set multiplexer 3802. The counter may be used as a program counter (PC) for the associated sequencer; the start value is the first address of the program to be executed. The value of 3801 is looped back to the counter via an adder (3805) and 3802. An offset, which is either subtracted from or added to the PC, is sent by the sequencer to 3805 via bus 3804. Thus, relative jumps can be efficiently implemented. The PC is supplied to the PAE array via bus 3811 and can be stored on the stack for call operations. For ret operations, the PC is sent from the stack to 3801 via 3804 and 3802.

Either the PC or a stack pointer (3807) supplied by the PAE array is supplied to an adder (3808) via multiplexer 3806. Here an offset which is stored in register 3809 and written via 3803 is subtracted from or added to the values. 3808 allows the program to be shifted within memory 2711. This enables garbage collector functions to clean up the memory German Patent Application no. 198 07 782.2. The address shift which occurs due to the garbage collector is compensated for by adjustment of the offset in 3809.

FIG. 38a is a variant of FIG. 38 in which the stack pointer (3820) is also integrated. Only the offset is supplied to 3805 via 3804 for relative jumps (3804a). The stack pointer is an up/down counter similar to 3801, whose start value represents the beginning of the stack and is loaded via 3803. The PC is sent directly to the data bus for the memory in order to be written onto the stack via a multiplexer in the event of call operations. The data bus of the memory is looped back to 3801 via 3821 and 3802 to perform ret operations.

Figure 39:
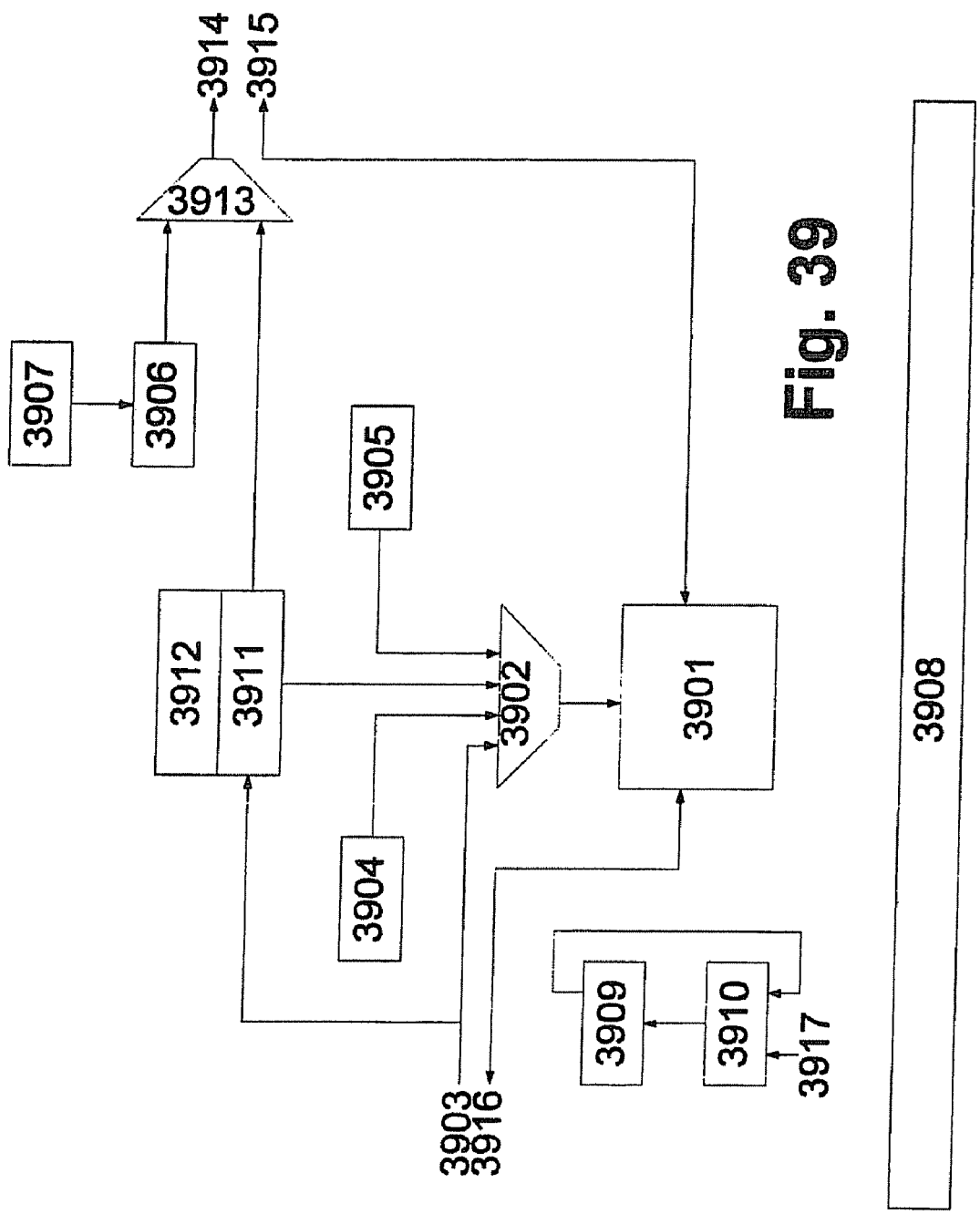
FIG. 39 illustrates the mode of operation of the memories, according to an example embodiment of the present invention.

FIG. 39 illustrates the mode of operation of the memories, according to an example embodiment of the present invention. The memory (3901) is addressed via a multiplexer (3902). In the standard mode, lookup mode, and register mode, the addresses are supplied from the array (3903) directly to 3901. In the stack mode and FIFO mode, the addresses are generated in an up/down counter (3904). In this case, the addresses are supplied to the IO side by another up/down counter (3905). The addresses for the external RAM (or IO) are generated by another up/down counter (3906); the base address is loaded from a register (3907). The register is set by the CT or an external host processor. A state machine (3908) takes over the entire control. 3908 reads the status of the memory (full, empty, half-full, etc.) in an up/down counter (3909), which counts the number of words in the memory. If the memory is modified block by block (write stack onto external stack or read from external stack), the size of the block is supplied as a constant (3917) to an adder/subtracter (3910), to which the count of 3909 is looped back. The result is loaded according to 3909.

Thus, the count can be rapidly adjusted to block-by-block changes. (Of course, it is also possible to modify the counter with each written or read word in a block operation.) For cache operations, a conventional cache controller (3911) is available, which is associated with a tag memory (3912). Depending on the mode of operation, the value of 3911 or 3906 is sent out (3914) via a multiplexer (3913) as an address. The data is sent out via bus 3915, and data is exchanged with the array via bus 3916.

Programming Examples to Illustrate the Subalgorithms

A software module may be declared in the following way, for example:

```
module example1
input (var1, var2 : ty₁; var3 : ty₂).
output (res1, res2 : ty₃).
begin
...
register <regname1> (res1).
register <regname2> (res2).
terminate@ (res1 & res2; 1).
end.
``` module identifies the beginning of a software module.
input/output defines the input/output variables with the types $ty_n$.
begin . . . end mark the body of the software module.
register <regname1/2> transfers the result to the output, the result being temporarily stored in the register specified by <regname1/2>. <regname1/2> is a global reference to a certain register.

The following memory types are available, for example, as additional transfer modes to the output:
fifo <fifoname>, where the data is transmitted to a memory operating by the FIFO principle. <fifoname> is a global reference to a specific memory operating by the FIFO principle.
terminated@ is extended by the "fifofull" parameter, e.g., signal, which shows that the memory is full.
stack <stackname>, where the data is transmitted to a memory operating by the stack principle. <stackname> is a global reference to a specific memory operating in the stack mode.
terminate@ differentiates the programming by the method according to the present invention from conventional sequential programming. The command defines the abort criterion of the software module. The result variables res1 and res2 are not evaluated by terminate@ with their actual values, but only the validity of the variables (e.g., their status signal) is checked. For this purpose, the two signals res1 and res2 are gated with one another logically via an AND, OR, or XOR operation. If both variables are valid, the software module is terminated with the value 1. This means that a signal having value 1 is forwarded to the higher-level load unit, whereupon the higher-level load unit loads the next software module.

```
module example2
input (var1, var2 : ty₃; var3 : ty₂).
output (res1 : ty₄).
begin
register <regname1> (var1, var2).
...
fifo <fifoname1> (res1, 256).
terminate@ (fifofull(<fifoname1>); 1).
end.
``` register is defined via input data in this example. <regname1> is the same here as in example1. This causes the register, which receives the output data in example1, to provide the input data for example2.
fifo defines a FIFO memory, with a depth of 256 for the output data res1. The full flag (fifofull) of the FIFO memory is used as an abort criterion in terminate@.

```
module main
input (in1, in2 : ty₁; in3 : ty₂).
output (out1 : ty₄).
begin
define <regname1> : register(234).
define <regname2> : register(26).
define <fifoname1> : fifo(256,4). //FIFO depth 256
...
(var12, var72) = call example1 (in1, in2, in3).
...
(out1) = call example2 (var12, var72, var243).
...
signal (out1).
terminate@ (example2).
end.
``` define defines an interface for data (register, memory, etc.). The required resources and the name of the interface are specified with the definition. Since each of the resources is only available once, they must be specified unambiguously. Thus the definition is global, e.g., the name is valid for the entire program.
call calls a software module as a subprogram.
signal defines a signal as an output signal without a buffer being used.

The software module main is terminated by terminate@ (example2) as soon as subprogram example2 is terminated.

In principle, due to the global declaration "define . . . " the input/output signals thus defined do not need to be included in the interface declaration of the software modules.

What is claimed is:

1. A processor chip comprising:
   an arrangement of a plurality of processor cores;
   at least one memory controller for external main memory; and
   a plurality of cache elements for caching data, the plurality of cache elements being located between and connected to the processor cores and the at least one memory controller;
   wherein each of at least some of the plurality of processor cores:
      operates as at least one of an accumulator processor, a stack processor, and a load/store processor; and
      includes a unit for loading instructions defining at least one of a function and an interconnection of the respective processor core.

2. The processor chip according to claim 1, wherein the at least one memory controller is adapted to control external Random Access Memory (RAM).

3. The processor chip according to claim 1, wherein at least some of the processor cores are reconfigurable in at least one of function and interconnection.

4. The processor chip according to claim 1, wherein the at least one memory controller supports cache functions.

5. The processor chip according to claim 1, wherein the at least one memory controller has an associated memory management unit (MMU).

6. The processor chip according to claim 1, further comprising:
at least one of interface controller for peripheral devices.

7. The processor chip according to claim 1, wherein the each of the at least some of the plurality of processor cores is reconfigurable in at least one of its function and its interconnection as defined by the instructions and on a hardware level by changing its active circuitry paths.

8. The processor chip according to claim 7, wherein the at least one memory controller is adapted to control external Synchronous Dynamic Random Access Memory (SDRAM).

9. The processor chip according to claim 7, wherein the at least one memory controller is adapted to control external Rambus Dynamic Random Access Memory (RDRAM).

10. The processor chip according to claim 7, wherein the at least one memory controller has an associated cache TAG memory.

11. The processor chip according to claim 7, further comprising:
an Ethernet controller adapted for operating as an interface controller for peripheral devices.

12. The processor chip according to claim 7, further comprising:
a peripheral component interconnect (PCI) controller.

13. The processor chip according to claim 7, wherein the changing of the active circuitry paths is performed using a switching device.

14. The processor chip according to claim 7, wherein the at least one memory controller is adapted to control external Dynamic Random Access Memory (DRAM).

15. A processor chip comprising:
an arrangement of a plurality of processor cores;
at least one memory controller for Dynamic Random Access Memory (DRAM); and
a plurality of cache elements for caching data, the plurality of cache elements being located between and connected to the processor cores and the at least one memory controller;
wherein each of at least some of the processor cores:
operates as at least one of an accumulator processor, a stack processor, and a load/store processor; and
includes a unit for loading instructions defining at least one of a function and an interconnection of the respective processor core.

16. The processor chip according to claim 15, wherein the at least one memory controller is adapted to control external memory.

17. The processor chip according to claim 15, wherein the at least one memory controller is adapted to control external Random Access Memory (RAM).

18. The processor chip according to claim 15, wherein at least some of the processor cores are reconfigurable in at least one of function and interconnection.

19. The processor chip according to claim 15, wherein the at least one memory controller supports cache functions.

20. The processor chip according to claim 15, wherein the at least one memory controller has an associated memory management unit (MMU).

21. The processor chip according to claim 15, further comprising:
at least one interface controller for peripheral devices.

22. The processor chip according to claim 15, wherein the each of the at least some of the processor cores is reconfigurable in at least one of its function and its interconnection as defined by the instructions and on a hardware level by changing its active circuitry paths.

23. The processor chip according to claim 22, wherein the at least one memory controller is adapted to control external Rambus Dynamic Random Access Memory (RDRAM).

24. The processor chip according to claim 22, wherein the at least one memory controller has an associated cache TAG memory.

25. The processor chip according to claim 22, further comprising:
an Ethernet controller adapted for operating as an interface controller for peripheral devices.

26. The processor chip according to claim 22, further comprising:
a peripheral component interconnect (PCI) controller.

27. The processor chip according to claim 22, further comprising:
at least one interface controller for peripheral devices., wherein the at least one memory controller is adapted to control external Rambus Dynamic Random Access Memory (RDRAM).

28. The processor chip according to claim 22, further comprising:
at least one interface controller for peripheral devices, wherein the at least one memory controller has an associated cache TAG memory.

29. The processor chip according to claim 22, wherein the changing of the active circuitry paths is performed using a switching device.

30. The processor chip according to claim 22, wherein the at least one memory controller is adapted to control external Synchronous Dynamic Random Access Memory (SDRAM).

31. The processor chip according to claim 22, further comprising:
at least one interface controller for peripheral devices, wherein the at least one memory controller is adapted to control external Synchronous Dynamic Random Access Memory (SDRAM).

32. The processor chip according to claim 21, wherein the at least one memory controller is adapted to control external memory.

33. The processor chip according to claim 21, wherein the at least one memory controller is adapted to control external Random Access Memory RAM.

34. The processor chip according to claim 21, wherein the at least one memory controller supports cache functions.

35. The processor chip according to claim 21, wherein the at least one memory controller has an associated memory management unit (MMU).

36. A processor chip comprising:
an arrangement of a plurality of processor cores;
at least one interface controller for peripheral devices; and
a plurality of cache elements for caching data, the plurality of cache elements being located between and connected to the processor cores and the at least one memory controller;
wherein each of at least some of the processor cores:
is reconfigurable in at least one of its function and its interconnection, and on a hardware level by changing, via a switching device, its active circuitry paths;

operates as at least one of an accumulator processor, a stack processor, and a load/store processor; and includes a unit for loading instructions defining at least one of the function and the interconnection according to which the respective processor core is configured.

37. The processor chip according to claim 36, wherein at least some of the processor cores are reconfigurable in at least one of function and interconnection.

38. The processor chip according to claim 36, wherein the each of the at least some of the processor cores is reconfigurable in at least one of its function and its interconnection as defined by the instructions and on a hardware level by changing its active circuitry paths.

39. The processor chip according to claim 31, wherein the at least interface controller is an Ethernet controller.

40. The processor chip according to claim 31, wherein the at least one interface controller is a peripheral component interconnect (PCI) controller.

41. The processor chip according to claim 31, wherein the at least one interface controller is a universal serial bus (USB) controller.

42. The processor chip according to claim 38, wherein the changing of the active circuitry paths is performed using a switching device.

* * * * *

UNITED STATES PATENT AND TRADEMARK OFFICE
CERTIFICATE OF CORRECTION

PATENT NO. : 8,312,200 B2
APPLICATION NO. : 12/840477
DATED : November 13, 2012
INVENTOR(S) : Martin Vorbach et al.

Page 1 of 1

It is certified that error appears in the above-identified patent and that said Letters Patent is hereby corrected as shown below:

At column 33, line 11: After "at least one" and before "interface controller for peripheral devices", delete "of".

At column 34, line 62: After "to the processor cores and" and before "at least one memory controller;", delete "the".

At column 36, line 2: After "at least" and before "interface controller is an Ethernet controller", insert --one--.

Signed and Sealed this
Twelfth Day of February, 2013

Teresa Stanek Rea
*Acting Director of the United States Patent and Trademark Office*